US012261007B2

(12) United States Patent
Yoneda

(10) Patent No.: US 12,261,007 B2
(45) Date of Patent: Mar. 25, 2025

(54) PROTECTION ELEMENT

(71) Applicant: DEXERIALS CORPORATION, Shimotsuke (JP)

(72) Inventor: Yoshihiro Yoneda, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 17 days.

(21) Appl. No.: 18/276,310

(22) PCT Filed: Feb. 15, 2022

(86) PCT No.: PCT/JP2022/005926
§ 371 (c)(1),
(2) Date: Aug. 8, 2023

(87) PCT Pub. No.: WO2022/176844
PCT Pub. Date: Aug. 25, 2022

(65) Prior Publication Data

US 2024/0304406 A1 Sep. 12, 2024

(30) Foreign Application Priority Data

Feb. 19, 2021 (JP) ................................ 2021-025651

(51) Int. Cl.
*H01H 85/38* (2006.01)
*H01H 85/00* (2006.01)
(Continued)

(52) U.S. Cl.
CPC ........ *H01H 85/38* (2013.01); *H01H 85/0052* (2013.01); *H01H 85/06* (2013.01);
(Continued)

(58) Field of Classification Search
CPC .... H01H 85/38; H01H 85/0052; H01H 85/06; H01H 85/10; H01H 85/17;
(Continued)

(56) References Cited

U.S. PATENT DOCUMENTS 2,892,061 A * 6/1959 Kozacka ................ H01H 85/38 337/159
5,903,208 A * 5/1999 Sorger ................... H01H 85/38 337/228
(Continued)

FOREIGN PATENT DOCUMENTS

JP 2009032489 A 2/2009

OTHER PUBLICATIONS

International Search Report issued May 17, 2022 in PCT/JP2022/005926 (with English translation), 4 pages.
(Continued)

*Primary Examiner* — Jacob R Crum
(74) *Attorney, Agent, or Firm* — Element IP, PLC

(57) ABSTRACT

A protection element includes: a fuse element configured to be energized in a first direction, which is a direction from a first end portion of the fuse element to a second end portion of the fuse element; a shielding member including a plate-shaped part, configured to rotate around a rotation axis extending in a second direction orthogonal to the first direction, wherein the plate-shaped part viewed from the fuse element is divided to a first portion and a second portion at a contact position between the plate-shaped part and the rotation axis, and an area of the first portion and an area of the second portion are different from each other; and a case having therein a housing portion. Pressure elevation in the housing portion due to an arc discharge causes the shielding member to rotate around the rotation axis and the shielding member divides the housing portion.

22 Claims, 22 Drawing Sheets

(51) Int. Cl.
*H01H 85/06* (2006.01)
*H01H 85/10* (2006.01)
*H01H 85/17* (2006.01)
*H01H 85/175* (2006.01)

(52) U.S. Cl.
CPC ............ *H01H 85/10* (2013.01); *H01H 85/17* (2013.01); *H01H 85/1755* (2013.01); *H01H 2223/044* (2013.01)

(58) Field of Classification Search
CPC ... H01H 2223/044; H01H 85/165–185; H01H 2085/381–383
See application file for complete search history.

(56) References Cited

U.S. PATENT DOCUMENTS 6,160,471 A * 12/2000 Rybka .................. H01H 85/055 337/276
2015/0294828 A1* 10/2015 Burge .................... H01H 85/38 337/274

OTHER PUBLICATIONS

Written Opinion of the International Searching Authority issued May 17, 2022 in PCT/JP2022/005926 (with English translation), 6 pages.

* cited by examiner

PROTECTION ELEMENT

TECHNICAL FIELD

The present invention relates to a protection element. The present application claims priority based on JP 2021-025651 filed in Japan on Feb. 19, 2021, and the contents thereof are incorporated herein by reference in their entirety.

BACKGROUND TECHNOLOGY

Conventionally, there is a fuse element that, when a current exceeding a rating flows in a current path, is heated, which then fuses and interrupts the current path. A protection element (fuse device) provided with a fuse element is used in a wide range of fields such as, for example, electric vehicles.

For example, Patent Document 1 teaches a fuse in which a large overcurrent flows through the fuse and a fuse-element undergoes metal vaporization, pressure elevation in a large space when an arc discharge is generated is utilized to move a blocking member in a direction from the large space to a small space, and the blocking member blocks a connecting hole.

CITATION LIST

Patent Documents

Patent document 1: JP 2009-032489 A

SUMMARY OF INVENTION

Problem to be Solved by Invention

In a protection element for high voltage, an arc discharge may be generated when a fuse element fuses. When an arc discharge is generated, the fuse element may melt over a large area and the vaporized metal may disperse. In this case, there is a risk that the dispersed metal will form a new energizing path, or that the dispersed metal will adhere to surrounding electronic components, such as terminals.

The present invention was made in consideration of the foregoing circumstances, and an object thereof is to provide a protection element wherein an arc discharge generated when the fuse element fuses is quickly suppressed (extinguished).

Means to Solve the Problem

The present invention proposes the following means to resolve the foregoing problem.

[1] A protection element, provided with a fuse element energized in a first direction from a first end portion to a second end portion; a shielding member composed of an insulating material, and having a plate-shaped part wherein a first surface is disposed facing the fuse element and a second surface is disposed in contact with a rotation axis extending in a second direction intersecting the first direction, wherein an area of the plate-shaped part viewed from the fuse element is different between a first area and a second area divided at a contact position between the plate-shaped part and the rotation axis; and a case composed of an insulating material, and provided internally with a housing portion wherein the fuse element and the shielding member are stored; wherein pressure elevation in the housing portion due to an arc discharge generated when the fuse element fuses causes the first surface to be pressed and the shielding member to rotate around the rotation axis, and the shielding member divides the inside of the housing portion.

[2] The protection element according to [1], wherein a surface of the housing portion facing the fuse element has the shielding member housing groove wherein one portion of the rotated shielding member is housed.

[3] The protection element according to [1] or [2], wherein the fuse element has a constricted portion between the first end portion and the second end portion, and a cross-sectional area of the constricted portion in the second direction is narrower than a cross-sectional area of the first end portion and the second end portion in the second direction.

[4] The protection element according to [3], wherein a width of the constricted portion in the second direction is narrower than a width of the first end portion and the second end portion in the second direction.

[5] The protection element according to any of [1] to [4], wherein the fuse element is composed of a laminated body wherein an inner layer composed of a low-melting-point metal and an outer layer composed of a high-melting-point metal are laminated in a thickness direction.

[6] The protection element according to [5], wherein the low-melting-point metal is composed of Sn or a metal containing Sn as a main component, and the high-melting-point metal is composed of Ag or Cu, or a metal containing Ag or Cu as a main component.

[7] The protection element according to any of [1] to [6], wherein the fuse element has a bent portion bent along a direction intersecting the first direction.

[8] The protection element according to any of [1] to [7], wherein either one or both of the shielding member and the case is composed of any one resin material selected from nylon-based resin, fluorine-based resin, and polyphthalamide resin.

[9] The protection element according to [8], wherein the resin material is formed of a resin material having a tracking resistance index CTI of 600 V or more.

[10] The protection element according to [8], wherein the nylon-based resin is a resin not containing a benzene ring.

[11] The protection element according to any of [1] to [10], wherein the first end portion is electrically connected to a first terminal, the second end portion is electrically connected to a second terminal, and one portion of the first terminal and one portion of the second terminal are exposed from the case.

[12] The protection element according to any of [1] to [11], wherein the second surface of the plate-shaped part is provided with pressing means for applying force in a rotation direction of the shielding member.

[13] The protection element according to any of [1] to [12], wherein the shielding member is composed of a first shielding member and a second shielding member having the same shape as the first shielding member, and the first shielding member and the second shielding member are disposed symmetrically in the first direction with respect to a center of the fuse element in the first direction.

[14] The protection element according to [13], wherein the fuse element has a cut portion between the first end portion and the second end portion, the first shielding member and the second shielding member are disposed symmetrically in the first direction with respect to the cut portion, the second shielding member is disposed facing a surface of an opposite side to a surface of the fuse element facing the first shielding member, and a rotation direction of the first shielding member and a rotation direction of the second shielding member are opposite directions.

[15] The protection element according to any of [1] to [14], wherein the case is composed of a first case and a second case having the same shape as the first case, and the first case and the second case are disposed facing the fuse element.

[16] The protection element according to any of [1] to [15], wherein one portion of the case is covered by a cover, an internal pressure buffer space surrounded by an outer surface of the case and an inner surface of the cover is provided, the case has a vent passing through the case and communicating with the housing portion and the internal pressure buffer space, and a volume of the internal pressure buffer space is a volume of the fuse element or greater.

[17] The protection element according to any of [1] to [16], wherein the rotation axis is composed of a step in a concave portion formed in the housing portion, and the shielding member rotates in a direction wherein an end edge far from the rotation axis, from among both ends of the first surface of the plate-shaped part in the first direction, moves away from the fuse element.

[18] The protection element according to any of [1] to [17], wherein a heat generation member for heating the fuse element is installed on the first surface of the plate-shaped part.

[19] The protection element according to [18], wherein the heat generation member is provided with an element-connecting electrode electrically connected to the fuse element.

[20] The protection element according to [19], wherein the heat generation member is provided with a heat generation unit composed of a resistive element, and a respective power supply wire electrode electrically connected to each end portion opposite to each other across a center of the heat generation unit.

[21] The protection element according to [20], wherein the heat generation unit is provided on an insulated substrate, an insulating layer is provided on the heat generation unit, and the element-connecting electrode is provided at a position on the insulating layer wherein at least one portion overlaps the heat generation unit.

[22] The protection element according to [20], wherein the heat generation unit is provided on the insulated substrate, the insulating layer is provided on the heat generation unit, and the element-connecting electrode is provided on a surface of an opposite side to the heat generation unit of the insulated substrate, and at a position wherein at least one portion overlaps the heat generation unit.

Effect of the Invention

In the protection element of the present invention, pressure elevation in the housing portion due to an arc discharge generated when the fuse element fuses causes the first surface of the plate-shaped part of the shielding member to be pressed. The shielding member thereby rotates around the rotation axis extending in a direction intersecting the energizing direction of the fuse element, and the shielding member divides the inside of the housing portion wherein the fuse element and the shielding member are stored. As a result, the shielding member insulates the cut surfaces or fused surfaces of the cut or fused fuse element from each other, and the current path is interrupted. As a result, the arc discharge generated when the fuse element fuses is quickly suppressed (extinguished).

BRIEF DESCRIPTION OF THE DRAWINGS

FIG. 9(*a*) is a plan view looking from the fuse element side, FIG. 9(*b*) is a plan view looking from the housing portion side, and FIGS. 9(*c*) to (*e*) are side views.

FIG. 11(*a*) is a plan view of the inside of the housing portion of the first case 6*a* looking from a side of a second case 6*b*, FIG. 11(*b*) is a plan view of the first case 6*a* looking from the outside, and FIGS. 11(*c*) to (*e*) are side views of the first case 6*a*.

FIG. 23(*c*) is a cross-section view of a heat generation member 53 looking from the X-direction, and FIG. 23(*d*) is a cross-section of a center portion in the Y-direction of the heat generation member 53 illustrated in FIG. 23(*c*) looking from the Y-direction.

DESCRIPTION OF THE EMBODIMENTS

Figure 1:
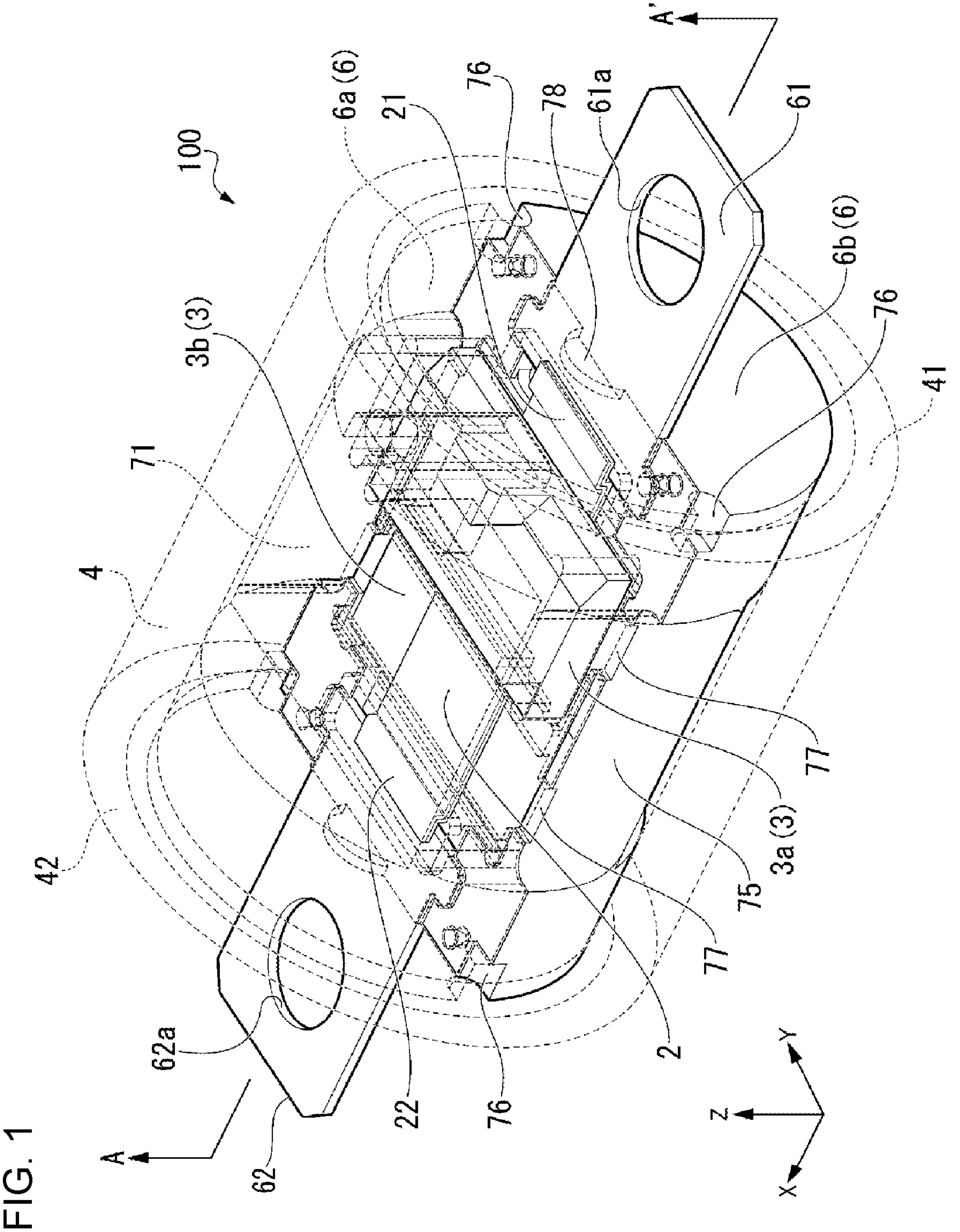
FIG. 1 is a perspective view illustrating an entire structure of a protection element 100 of a first embodiment.

Hereinafter, embodiments will be described in detail with reference to drawings as appropriate. In the drawings used in the following description, characteristic parts may be illustrated in an enlarged manner for convenience to facilitate an understanding thereof, and the dimensional ratio and the like of each constituent element may differ in practice. The materials, dimensions, and the like exemplified in the following description are examples; the present invention is not limited thereto, and can be implemented with appropriate changes within a scope wherein the effect of the present invention is exhibited.

First Embodiment (Protection Element)

FIGS. 1 to 11 are pattern diagrams illustrating a protection element of a first embodiment. In the drawings used in the following description, the direction indicated by an X is an energizing direction (first direction) of a fuse element. The direction indicated by a Y is a direction orthogonal to the X-direction (first direction), and the direction indicated by a Z is a direction orthogonal to the X-direction and the Y-direction.

Figure 2:
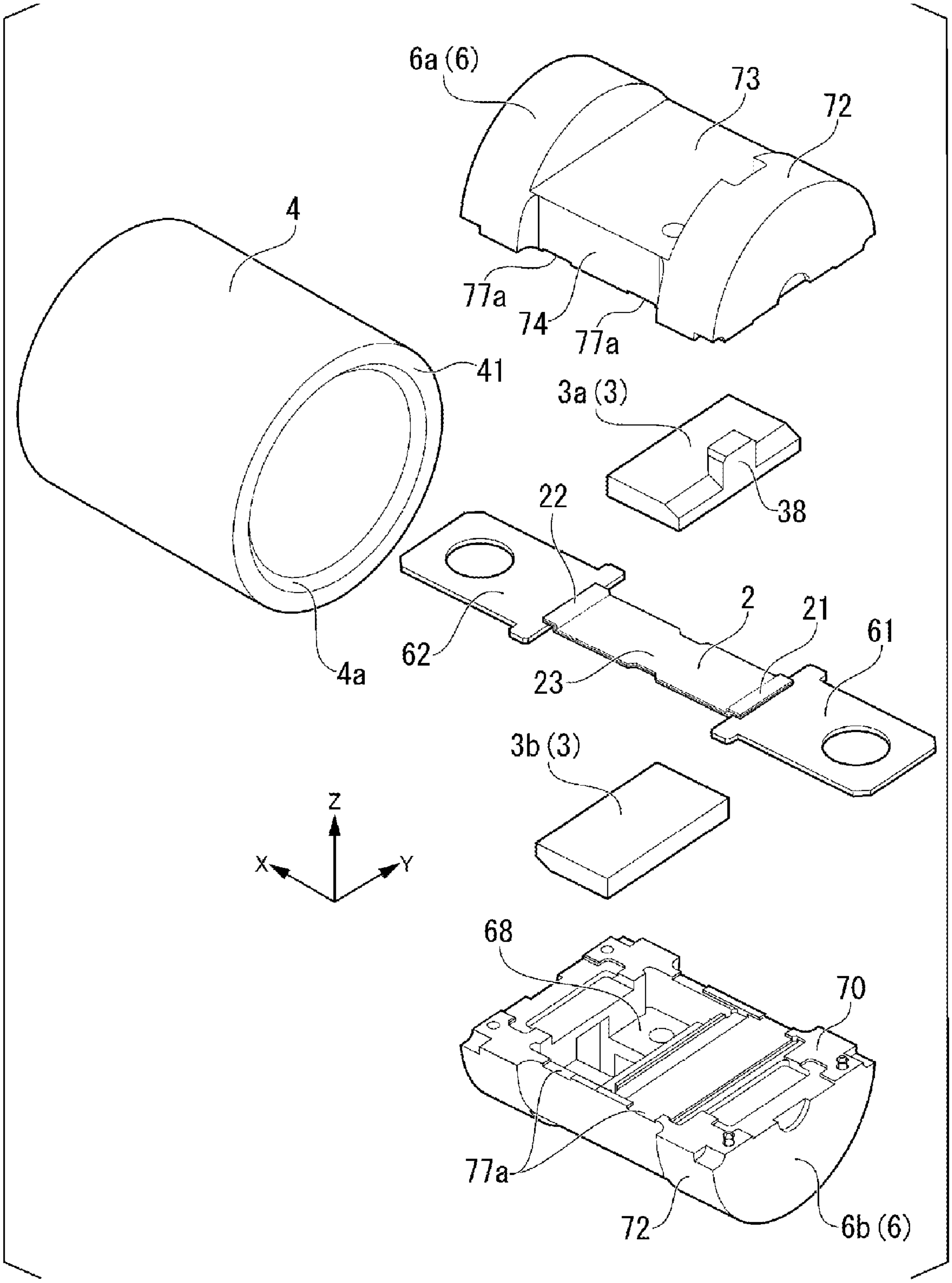
FIG. 2 is an exploded perspective view illustrating the entire structure of the protection element 100 illustrated in FIG. 1.
Figure 3:
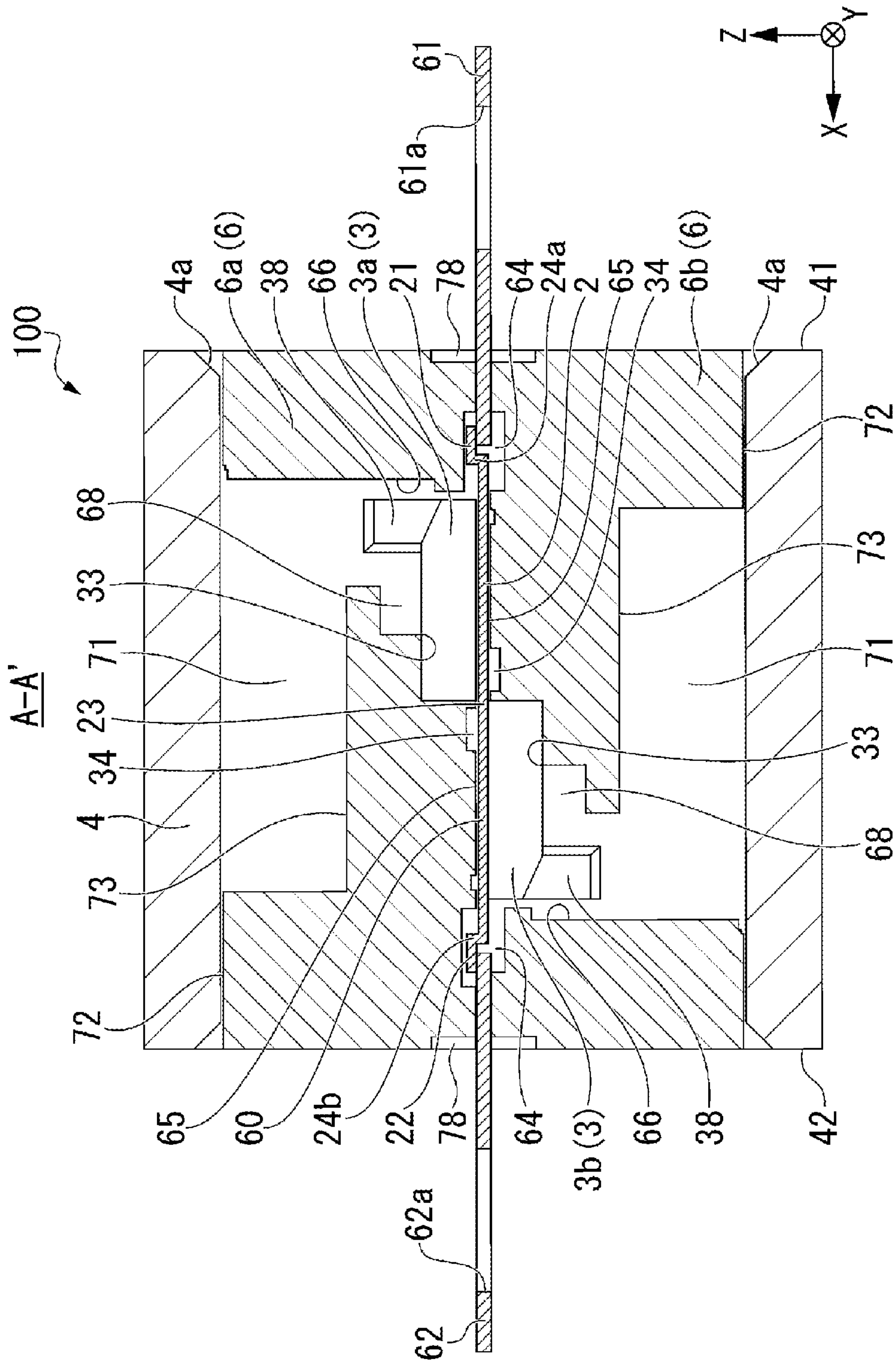
FIG. 3 is a cross-section view of the protection element 100 of the first embodiment, cut along line A-A' illustrated in FIG. 1.
Figure 4:
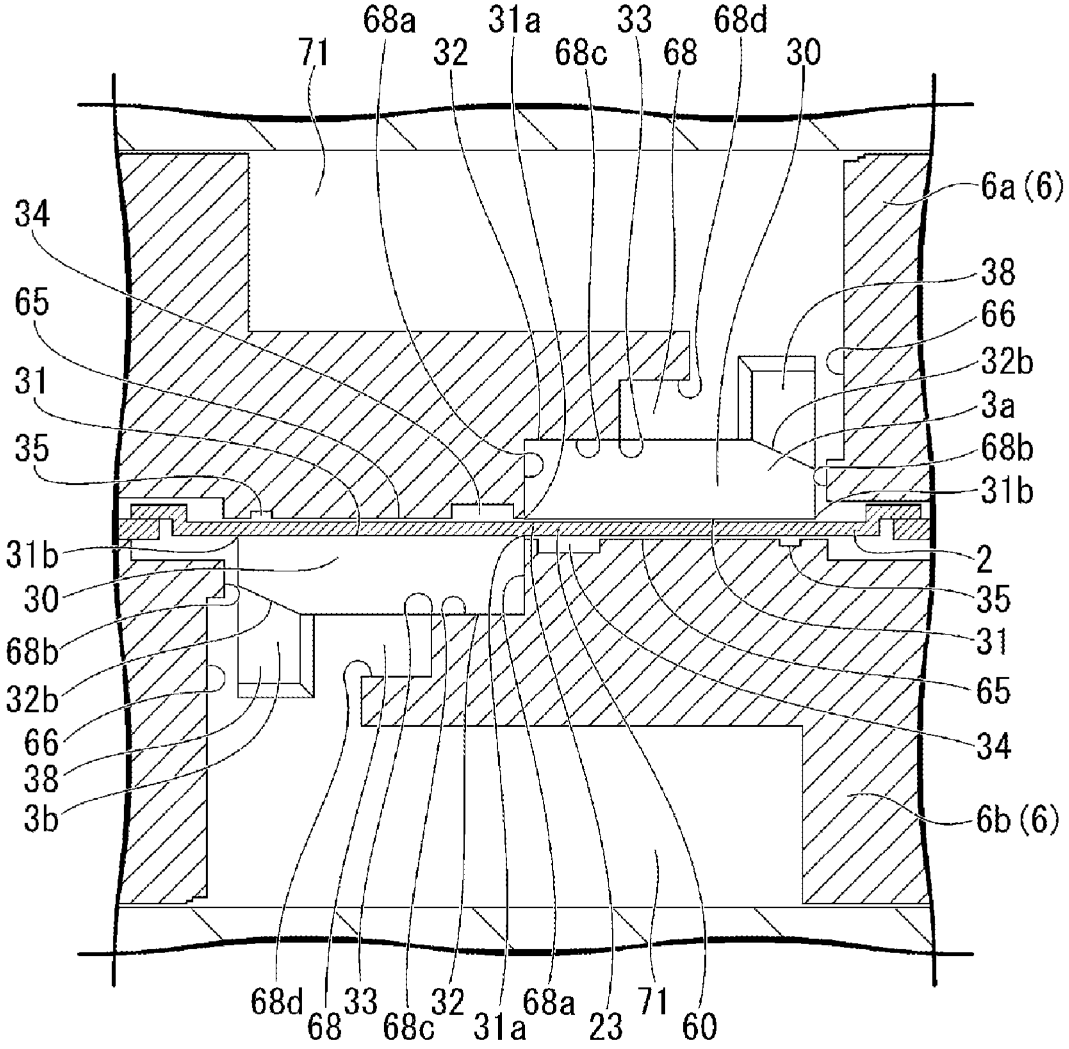
FIG. 4 is an enlarged cross-section view illustrating one portion of FIG. 3 in an enlarged manner.
Figure 5:
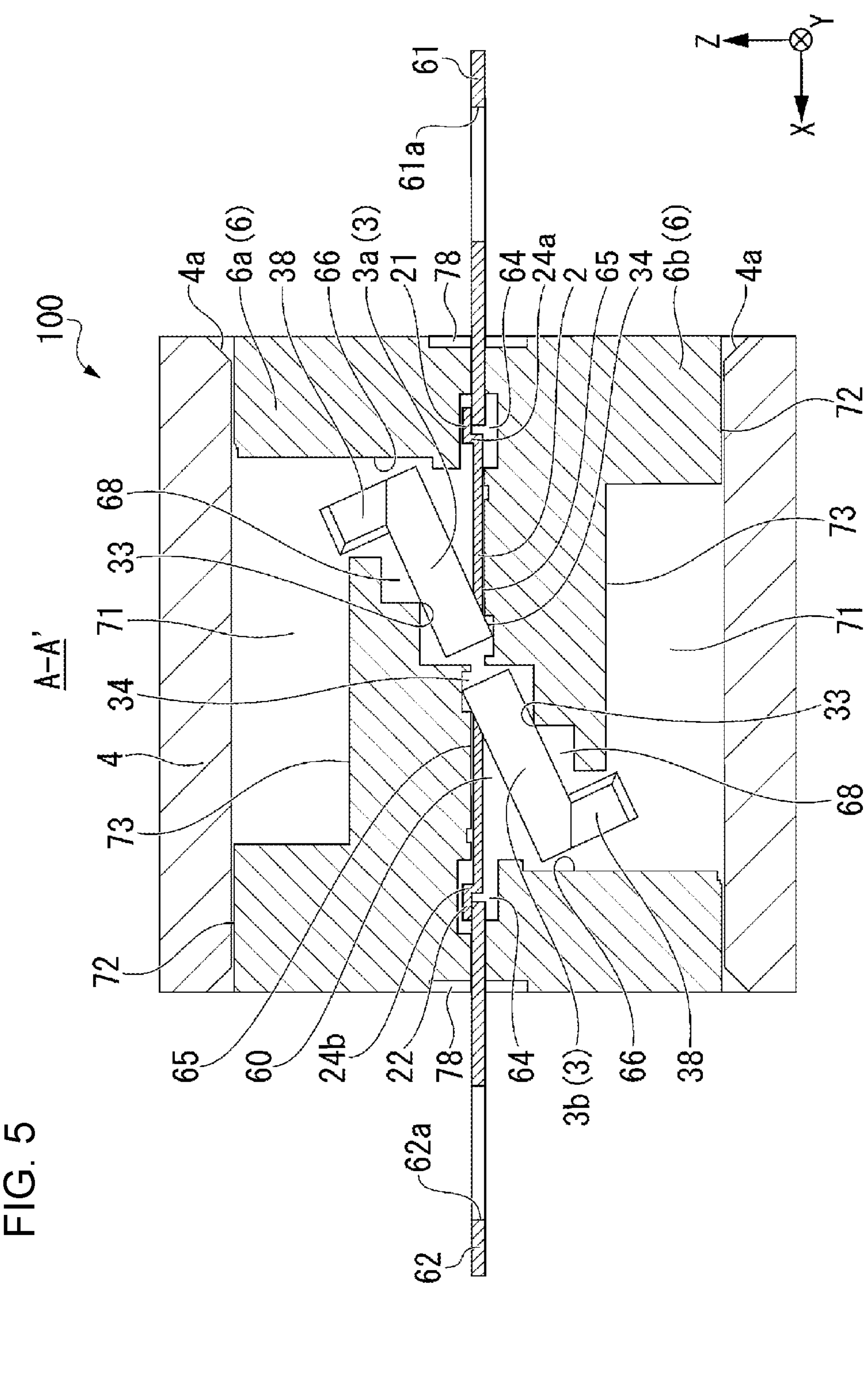
FIG. 5 is a drawing for describing the operation of the protection element 100 of the first embodiment, and is a cross-section view thereof cut along line A-A' illustrated in FIG. 1.
Figure 6:
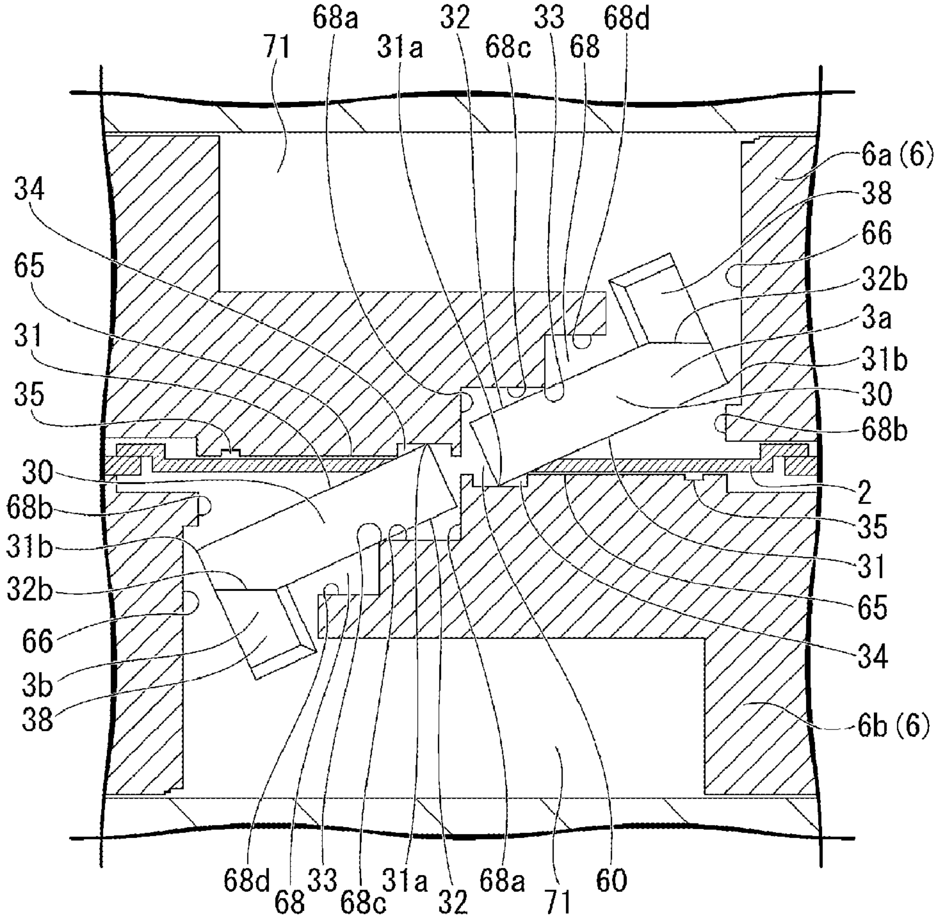
FIG. 6 is an enlarged cross-section view illustrating one portion of FIG. 5 in an enlarged manner.

FIG. 1 is a perspective view illustrating an entire structure of a protection element 100 of the first embodiment. FIG. 2 is an exploded perspective view illustrating the entire structure of the protection element 100 illustrated in FIG. 1. FIG. 3 is a cross-section view of the protection element 100 of the first embodiment, cut along line A-A' illustrated in FIG. 1. FIG. 4 is an enlarged cross-section view illustrating one portion of FIG. 3 in an enlarged manner. FIG. 5 is a drawing for describing the operation of the protection element 100 of the first embodiment, and is a cross-section view thereof cut along line A-A' illustrated in FIG. 1. FIG. 6 is an enlarged cross-section view illustrating one portion of FIG. 5 in an enlarged manner.

The protection element 100 of the present embodiment, as illustrated in FIG. 1 to FIG. 3, is provided with a fuse element 2, a shielding member 3, a case 6 provided internally with a housing portion 60 wherein the fuse element 2 and the shielding member 3 are stored, and a cover 4 covering a side surface of the case 6 in the Y-direction and the Z-direction.

In the protection element 100 of the present embodiment, pressure elevation in the housing portion 60 due to an arc discharge generated when the fuse element 2 fuses causes, as illustrated in FIG. 5 and FIG. 6, the shielding member 3 to rotate around a rotation axis 33, and the shielding member 3 divides the inside of the housing portion 60.

(Fuse Element)

Figure 7:
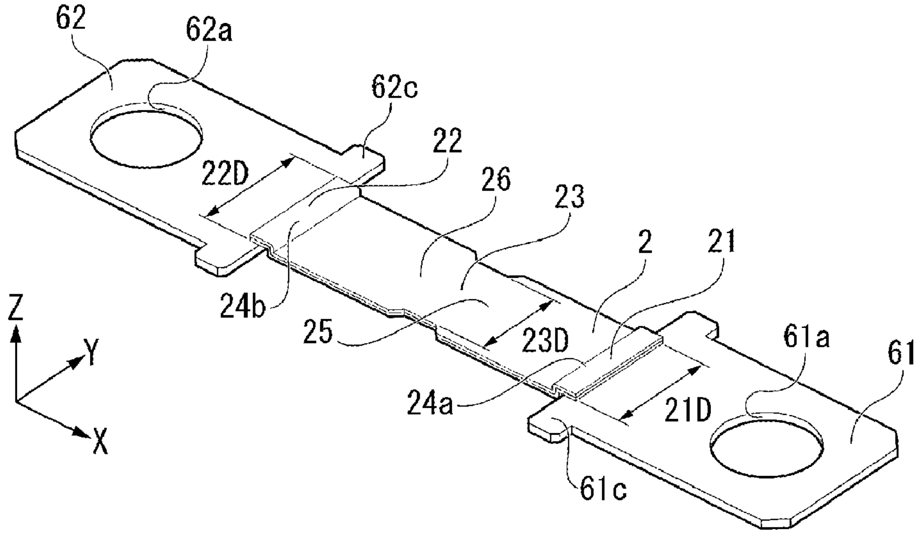
FIG. 7 is an enlarged drawing for describing one portion of the protection element 100 of the first embodiment, and is a perspective view illustrating a fuse element, a first terminal, and a second terminal.

FIG. 7 is an enlarged drawing for describing one portion of the protection element 100 of the first embodiment, and is a perspective view illustrating the fuse element, a first terminal, and a second terminal.

As illustrated in FIG. 7, the fuse element 2 is belt-shaped, and has a first end portion 21, a second end portion 22, and a cut portion 23 composed of a constricted portion provided between the first end portion 21 and the second end portion 22. The fuse element 2 is energized in the X-direction (first direction) from the first end portion 21 to the second end portion 22.

As illustrated in FIG. 3 and FIG. 7, the first end portion 21 is electrically connected to the first terminal 61. The second end portion 22 is electrically connected to the second terminal 62.

The first terminal 61 and the second terminal 62, as illustrated in FIG. 7, may be substantially the same shape or may each be different shapes. A thickness of the first terminal 61 and the second terminal 62 is not particularly limited, but as a guideline, it may be set to 0.3 to 1.0 mm. The thickness of the first terminal 61 and the thickness of the second terminal 62, as illustrated in FIG. 3, may be the same or may be different.

As illustrated in FIG. 1 to FIG. 3 and FIG. 7, the first terminal 61 is provided with an external terminal hole 61*a*. Furthermore, the second terminal 62 is provided with an external terminal hole 62*a*. One from among the external terminal hole 61*a* and the external terminal hole 62*a* is used to connect to a power supply side, and the other is used to connect to a load side. The external terminal hole 61*a* and the external terminal hole 62*a*, as illustrated in FIG. 7, may be through holes that are substantially circular in a plan view.

A material composed of, for example, copper, brass, nickel, or the like may be used as the first terminal 61 and the second terminal 62. From the perspective of strengthening rigidity, it is preferable to use brass as a material of the first terminal 61 and the second terminal 62, and from the perspective of reducing electrical resistance, it is preferable to use copper. The first terminal 61 and the second terminal 62 may be composed of the same material or may be composed of different materials.

The shape of the first terminal 61 and the second terminal 62 may be any, provided that it is capable of engaging with a terminal on the power supply side or a terminal on the load side (not illustrated); for example, it may be a claw shape having a partially open portion, and as illustrated in FIG. 7, it may have a flange portion (indicated by reference signs 61*c*, 62*c* in FIG. 7) at an end portion of a side connected to the fuse element 2, widened on both sides towards the fuse element 2—the shape is not particularly limited. When the first terminal 61 and the second terminal 62 have the flange portion 61*c*, 62*c*, it is difficult for the first terminal 61 and the second terminal 62 to come out of the case 6, resulting in the protection element 100 having good reliability and durability.

The fuse element 2 illustrated in FIG. 7 has a substantially uniform thickness (length in the Z-direction). The thickness of the fuse element 2, as illustrated in FIG. 3, may be uniform or may be partially different. A fuse element having a thickness that gradually increases from the cut portion 23 to the first end portion 21 and the second end portion 22 is given as an example of a fuse element having a partially different thickness. In this kind of fuse element, the cut portion 23 becomes a heatspot when an overcurrent flows, so the cut portion 23 is preferentially heated and softened to ensure it is cut more reliably.

The thickness of the fuse element 2 may be set to, example, 0.03 to 1.0 mm, and preferably, may be set to 0.2 to 0.5 mm.

As illustrated in FIG. 7, the fuse element 2 has a substantially rectangular shape in a plan view. As illustrated in FIG. 7, a width 21D of the first end portion 21 in the Y-direction and a width 22D of the second end portion 22 in the Y-direction are substantially the same. Accordingly, the width of the fuse element 2 in the Y-direction illustrated in FIG. 7 means the widths 21D and 22D of the first end portion 21 and the second end portion 22 in the Y-direction.

As illustrated in FIG. 1, FIG. 3, and FIG. 7, the first end portion 21 of the fuse element 2 is disposed to overlap the first terminal 61 in a plan view. Furthermore, the second end portion 22 of the fuse element 2 is disposed to overlap the second terminal 62 in a plan view.

As illustrated in FIG. 7, a length of the first end portion 21 in the X-direction extends from a region overlapping the first terminal 61 in a plan view toward a side of the cut portion 23. Furthermore, as illustrated in FIG. 7, a length of the second end portion 22 in the X-direction extends from a region overlapping the second terminal 62 in a plan view toward a side of the cut portion 23. In the fuse element 2 illustrated in FIG. 7, the length of the second end portion 22 in the X-direction and the length of the first end portion 21 in the X-direction are substantially the same. In other words, in the present embodiment, the cut portion 23 is disposed around the center of the fuse element 2 in the X-direction.

As illustrated in FIG. 7, a first connecting unit 25 having a substantially trapezoidal shape in a plan view is disposed between the cut portion 23 and the first end portion 21. A longer parallel side of the first connecting unit 25 having a substantially trapezoidal shape in a plan view is coupled to the first end portion 21. Furthermore, a second connecting unit 26 having a substantially trapezoidal shape in a plan view is disposed between the cut portion 23 and the second end portion 22. A longer parallel side of the second connecting unit 26 having a substantially trapezoidal shape in a plan view is coupled to the second end portion 22. The first connecting unit 25 and the second connecting unit 26 are symmetrical with respect to the cut portion 23. As a result, the width of the fuse element 2 in the Y-direction gradually widens from the cut portion 23 to the first end portion 21 and the second end portion 22. As a result, the cut portion 23 becomes a heatspot when an overcurrent flows to the fuse element, so the cut portion 23 is preferentially heated and softened to ensure it is cut or fused easily.

As illustrated in FIG. 7, a width 23D of the cut portion 23 of the fuse element 2 in the Y-direction is narrower than the widths 21D and 22D of the first end portion 21 and the second end portion 22 in the Y-direction. As a result, a cross-sectional area of the cut portion 23 in the Y-direction is narrower than a cross-sectional area of a region of the fuse element 2 other than the cut portion 23. Therefore, the cut portion 23 is cut or fused more easily than a region between the cut portion 23 and the first end portion 21, and a region between the cut portion 23 and the second end portion 22.

In the present embodiment, as illustrated in FIG. 7, a fuse element having the cut portion 23 composed of a constricted portion having a narrower width 23D in the Y-direction than the widths 21D and 22D of the first end portion 21 and the second end portion 22 in the Y-direction is described as an example of the fuse element 2; however, the fuse element may have a cut portion having a width in the Y-direction that is the same as the first end portion and the second end portion, and it is not limited to the case where the fuse element may have a cut portion having a width in the Y-direction that is narrower than the first end portion and the second end portion.

For example, it is also possible to provide a line-shaped or belt-shaped fuse element having a uniform cross-sectional area in the Y-direction in place of the fuse element 2 illustrated in FIG. 7. In this case, the cross-sectional area of the cut portion of the fuse element in the Y-direction (second direction) is the same as the cross-sectional area of a region of the fuse element other than the cut portion.

As illustrated in FIG. 3 and FIG. 7, the fuse element 2 has two bent portions composed of a first bent portion 24*a* and a second bent portion 24*b* wherein a belt-shaped member is bent twice at a substantial right angle along the Y-direction. The first bent portion 24*a* is a step formed so as to cover an end surface of the first terminal 61 along an edge portion of a region where the first end portion 21 and the first terminal 61 overlap in a plan view. The second bent portion 24*b* is a step formed so as to cover an end surface of the second terminal 62 along an edge portion of a region where the second end portion 22 and the second terminal 62 overlap in a plan view. The first bent portion 24*a* and the second bent portion 24*b* alleviate stress associated with thermal expansion and contraction due to heat in the fuse element 2 extending in the X-direction, thereby improving the durability of the fuse element 2.

In the present embodiment, as illustrated in FIG. 3, since the fuse element 2 has the first bent portion 24*a* and the second bent portion 24*b*, a surface of a side whereon the first end portion 21 of the first terminal 61 is not laminated, a surface of a side whereon the second end portion 22 of the second terminal 62 is not laminated, and one surface at a center portion of the fuse element 2 (surface of a lower side in FIG. 3) are disposed on substantially the same plane.

In the present embodiment, as illustrated in FIG. 7, the first bent portion 24*a* and the second bent portion 24*b* wherein a belt-shaped member is bent along the Y-direction are described as examples of the bent portion; however, the direction in which a belt-shaped material forming the bent portion is bent is not limited to the Y-direction—it may be any, provided that it is bent intersecting the X-direction.

Furthermore, in the present embodiment, the first bent portion 24*a* and the second bent portion 24*b* wherein a belt-shaped member is bent twice at a substantial right angle is described as an example of the bent portion; however, the angle at which and the number of times the belt-shaped material forming the bent portion is bent are not particularly limited.

Furthermore, in the present embodiment, a case where the first bent portion 24*a* is provided on a side of the first end portion 21 of the fuse element 2, and the second bent portion 24*b* is provided on a side of the second end portion 22 is described as an example; however, the number of bent portions provided in the fuse element may be one or may be three or more, and the bent portion need not be provided in the fuse element.

A known material used for a fuse element, such as a metal material including an alloy, may be used as a material of the fuse element 2. Specifically, an alloy such as Pb85%/Sn, Sn/Ag3%/Cu0.5%, or the like may be exemplified as a material of the fuse element 2.

It is preferable that the fuse element 2 is composed of a laminated body wherein an inner layer composed of a low-melting-point metal and an outer layer composed of a high-melting-point metal are laminated in a thickness direction. This kind of fuse element 2 is preferable because it has good solderability when soldering the first terminal 61 and the second terminal 62 to the fuse element 2.

When the fuse element 2 is composed of the laminated body wherein the inner layer composed of the low-melting-point metal and the outer layer composed of the high-melting-point layer are laminated in the thickness direction, it is preferable that the volume of the low-melting-point metal is larger than the volume of the high-melting-point metal in terms of the current interrupting characteristic of the fuse element 2.

It is preferable to use Sn or a metal having Sn as a main component as the low-melting-point metal used as a material of the fuse element 2. Since the melting point of Sn is 232° C., a metal having Sn as a main component has a low melting point and becomes soft at low temperatures. For example, the solidus line of Sn/Ag3%/Cu0.5% alloy is 217° C.

Here, it is preferable that the low melting point is within a range of 120° C. to 260° C. Furthermore, "main component" refers to 50 mass % or more of the component contained.

It is preferable to use Ag or Cu, or a metal having Ag or Cu as a main component as the high-melting-point metal used as a material of the fuse element 2. For example, since the melting point of Ag is 962° C., a layer composed of a metal having Ag as a main component maintains rigidity at a temperature whereat the layer composed of a low-melting-point metal softens.

Furthermore, this is preferable as when a metal having Ag as a main component is formed as an outer layer, a resistance value of the fuse element 2 may be efficiently lowered and a rated current of the protection element may be set high. Here, it is preferable that the high melting point be within a range of 800° C. to 1,200° C. Furthermore, "main component" refers to 90 mass % or more of the component contained.

When the fuse element 2 is composed of the laminated body wherein the inner layer composed of the low-melting-point metal and the outer layer composed of the high-melting-point metal are laminated in the thickness direction, and has the cut portion 23 composed of a constricted portion having the narrower width 23D in the Y-direction than the widths 21D and 22D of the first end portion 21 and the second end portion 22 in the Y-direction, the outer layer may be formed on a side surface of the cut portion 23 in the Y-direction, or the outer layer need not be formed.

A melting temperature of the fuse element 2 in the protection element 100 of the present embodiment is preferably equal to or less than 600° C., and more preferably equal to or less than 400° C. When the melting temperature is equal to or less than 600° C., an arc discharge generated when the fuse element 2 fuses is further reduced.

Only one sheet may be used for the fuse element 2, or a plurality of sheets may be laminated and used as necessary. In the present embodiment, a case where two sheets are laminated and used is described as an example of the fuse element 2; however, only one sheet may be used, or three or more laminated sheets may be used.

The fuse element 2 may be manufactured by a known method.

For example, when composed of the laminated body wherein the inner layer composed of the low-melting-point metal and the outer layer composed of the high-melting-point metal are laminated in the thickness direction, and the outer layer is not formed in the Y-direction on a side surface of the cut portion 23 composed of a constricted portion, the fuse element 2 may be manufactured by the method shown below. First, a metal foil composed of the low-melting-point metal is prepared. Next, the high-melting-point metal layer is formed on an entire surface of the metal foil using plating to form a laminate. Thereafter, the laminate is cut to form a predetermined shape having the cut portion 23 composed of a constricted portion. The fuse element 2 composed of a laminated body having a three-layer structure is obtained by the above process.

When manufacturing a material composed of the foregoing laminated body, having the cut portion 23 composed of a constricted portion, and having the outer layer formed on a side surface of the cut portion 23 in the Y-direction, the fuse element 2 may be manufactured by the method shown below. That is, a metal foil composed of the low-melting-point metal is prepared, and the metal foil is cut to form a predetermined shape. Next, the high-melting-point metal layer is formed on an entire surface of the metal foil using plating to form a laminate. The fuse element 2 composed of a laminated body having a three-layer structure is obtained by the above process.

(Shielding Member)

The shielding member 3, as illustrated in FIG. 1 to FIG. 6, is composed of a first shielding member 3*a* and a second shielding member 3*b* having the same shape as the first shielding member 3*a*. In the present embodiment, the first shielding member 3*a* and the second shielding member 3*b* have the same shape; therefore, using the same material for manufacturing is preferable to be able to reduce the types of components to be manufactured. The first shielding member 3*a* and the second shielding member 3*b* may be formed of different materials.

In the present embodiment, a case where both the first shielding member 3*a* and the second shielding member 3*b* are provided is described as an example of the shielding member 3; however, the shielding member 3 may have only one from among the first shielding member 3*a* and the second shielding member 3*b*.

In the present embodiment, since both the first shielding member 3*a* and the second shielding member 3*b* are provided as the shielding member 3, pressure elevation inside the housing portion 60 when the fuse element 2 fuses causes the first shielding member 3*a* and the second shielding member 3*b* to rotate. Also, the first shielding member 3*a* divides the inside of the housing portion 60, the second shielding member 3*b* also divides the inside of the housing portion 60. Therefore, when the shielding member 3 has both the first shielding member 3*a* and the second shielding member 3*b*, an arc discharge generated when the fuse element 2 fuses is suppressed (extinguished) more quickly and reliably in comparison to when there is only one from among the first shielding member 3*a* and the second shielding member 3*b*.

In the present embodiment, as illustrated in FIG. 3 and FIG. 4, the second shielding member 3*b* is disposed at a position of point symmetry with respect to the first shielding member 3*a* and having, as an axis, the center of the fuse element 2 in the X-direction in an A-A' cross-section. That is, the first shielding member 3*a* and the second shielding member 3*b* are disposed symmetrically in the X-direction with respect to the center of the fuse element 2 in the X-direction. Accordingly, in the protection element 100 of the present embodiment, even though pressure elevation in the housing portion 60 when the fuse element 2 fuses causes the first shielding member 3*a* and the second shielding member 3*b* to rotate simultaneously, there is no mutual interference and no hindrance is caused to their mutual rotational movements. Accordingly, the first shielding member 3*a* and the second shielding member 3*b* more reliably divide the inside of the housing portion 60 at two locations in the housing portion 60 in the X-direction. Furthermore, since the first shielding member 3*a* and the second shielding member 3*b* before undergoing rotational movement may be stably disposed at a predetermined position in the housing portion 60 together with the fuse element 2, the protection element 100 has excellent reliability.

Moreover, in the present embodiment, the fuse element 2 has the cut portion 23 between the first end portion 21 and the second end portion 22, and as illustrated in FIG. 5 and FIG. 6, the first shielding member 3*a* and the second shielding member 3*b* rotate, and the first shielding member 3*a* and the second shielding member 3*b* thereby divide the inside of the housing portion 60 at two locations in proximity to the inside of the housing portion 60 in the X-direction interposing the cut portion 23. As a result, an arc discharge generated when the fuse element 2 fuses is more quickly and reliably suppressed (extinguished).

Figure 8A:
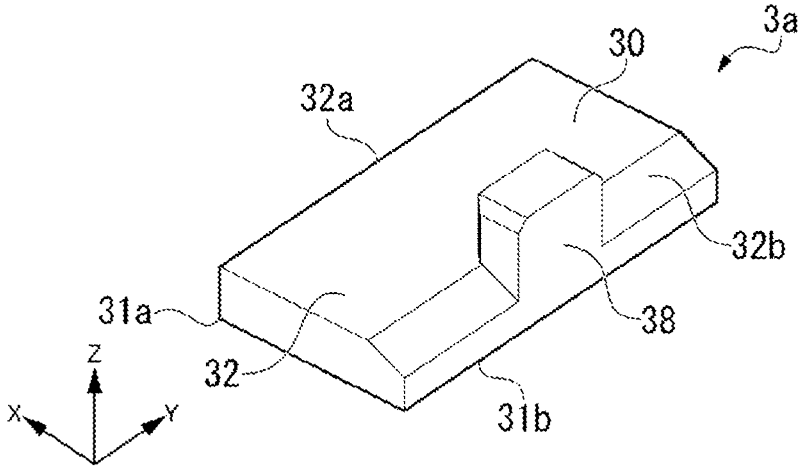
FIG. 8A is a drawing for describing a structure of a first shielding member 3*a* provided in the protection element 100 of the first embodiment, and is a perspective view looking from a housing portion side.
Figure 8B:
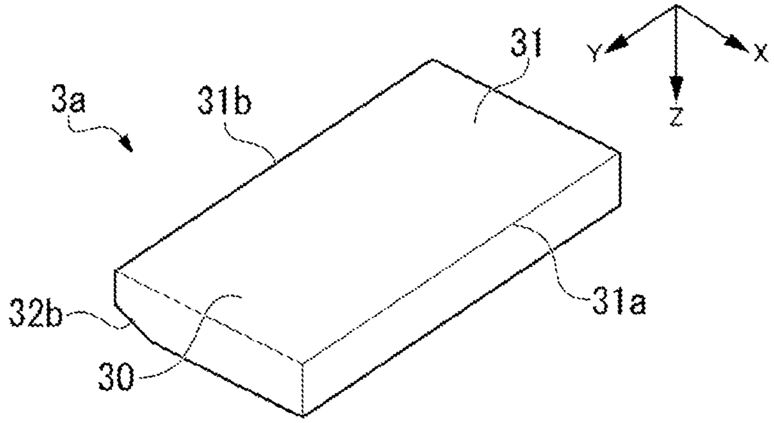
FIG. 8B is a drawing for describing the structure of the first shielding member 3*a* provided in the protection element 100 of the first embodiment, and is a perspective view looking from a fuse element side.
Figure 9:
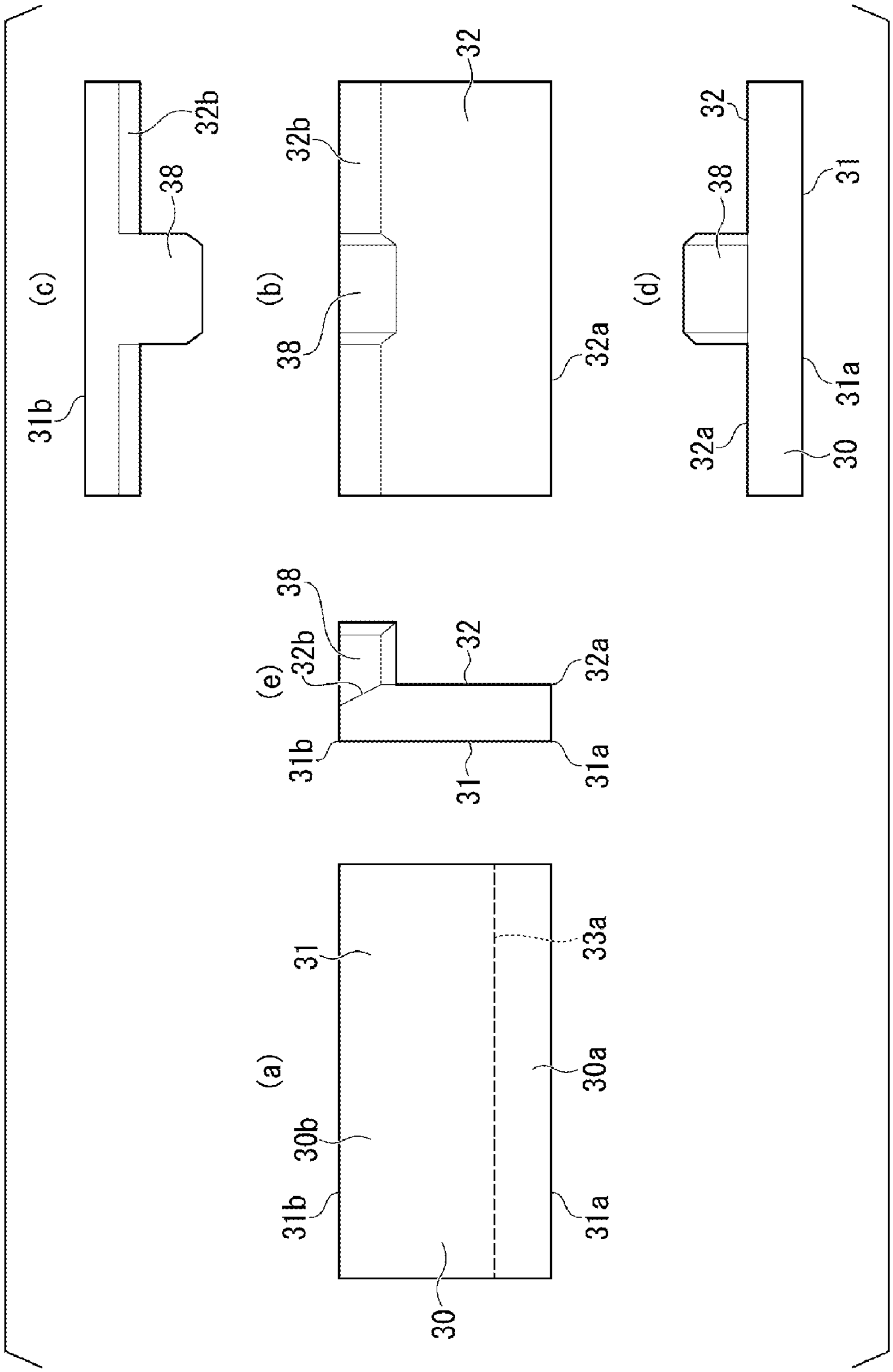
FIG. 9 is a drawing for describing the structure of the first shielding member 3*a* provided in the protection element 100 of the first embodiment.

In the present embodiment, FIG. 8A to FIG. 8B and FIG. 9 will be used to describe a structure of the first shielding member 3*a*. A structure of the second shielding member 3*b* is the same as that of the first shielding member 3*a*; therefore, the description will be omitted.

FIG. 8A to FIG. 8B are drawings for describing the structure of the first shielding member 3*a* provided in the protection element 100 of the first embodiment. FIG. 8A is a perspective view looking from the housing portion side, and FIG. 8B is a perspective view looking from the fuse element side. FIG. 9 is a drawing for describing the structure of the first shielding member 3*a* provided in the protection element 100 of the first embodiment. FIG. 9(*a*) is a plan view looking from the fuse element side, FIG. 9(*b*) is a plan view looking from the housing portion side, and FIGS. 9(*c*) to (*e*) are side views.

The first shielding member 3*a* is interposed between the fuse element 2 and a first case 6*a* containing the housing portion 60. "Fuse element side" refers to a side of the first shielding member 3*a* whereon the fuse element 2 is disposed. "Housing portion side" refers to a side of the first shielding member 3*a* whereon the first case 6*a* containing the housing portion 60 is disposed.

As illustrated in FIG. 1 to FIG. 9, the first shielding member 3*a* has a plate-shaped part 30. The plate-shaped part 30 has a substantially rectangular shape in a plan view, and has, as illustrated in FIG. 4, a first surface 31 disposed facing the fuse element 2, and a second surface 32 disposed facing a bottom surface (a first bottom surface 68*c* or a second bottom surface 68*d*) of a concave portion 68 formed in the housing portion 60 of the case 6.

The first surface 31 of the plate-shaped part 30 is disposed in proximity to or in contact with the fuse element 2, and as illustrated in FIG. 3 and FIG. 4, it is preferable that it be disposed in contact with the fuse element 2, and it is more preferable that the entire surface of the first surface 31 be disposed in contact with the fuse element 2. When the first surface 31 is disposed in contact with the fuse element 2, an arc discharge generated when the fuse element 2 fuses is further reduced.

The second surface 32 of the plate-shaped part 30, as illustrated in FIG. 3 and FIG. 4, is disposed in contact with the rotation axis 33 extending in the Y-direction. In the present embodiment, as illustrated in FIG. 3 and FIG. 4, the rotation axis 33 is composed of a step inside the concave portion 68 formed in the housing portion 60 of the case 6.

In the present embodiment, as illustrated in FIG. 4, from among both ends in the X-direction in the first surface 31 of the plate-shaped part 30 of the first shielding member 3*a* illustrated in FIG. 8B and FIG. 9, a first end edge 31*a* close to the rotation axis 33 is disposed on an inner side of the housing portion 60 in the X-direction, and a second end edge 31*b* far from the rotation axis 33 is disposed on an outer side of the housing portion 60 in the X-direction. As illustrated in FIG. 6, the first shielding member 3*a* rotates, causing the first end edge 31*a* to be pressed onto a bottom surface of a shielding member housing groove 34 provided on an inner surface of the housing portion 60. Furthermore, the first shielding member 3*a* rotates, causing the second end edge 31*b* to be housed in the concave portion 68.

In the present embodiment, as illustrated in FIG. 4, from among both ends in the X-direction in the second surface 32 of the plate-shaped part 30 of the first shielding member 3*a* illustrated in FIG. 8A and FIG. 9, a first end edge 32*a* close to the rotation axis 33 is disposed on an inner side of the housing portion 60 in the X-direction, and a second end surface 32*b* disposed on the second end portion far from the rotation axis 33 is disposed on an outer side of the housing portion 60 in the X-direction.

In the first shielding member 3*a*, as illustrated in FIG. 9(*a*), an area of the plate-shaped part 30 viewed from the fuse element 2 is different between a first area 30*a* and a second area 30*b* divided at a contact position 33*a* between the plate-shaped part 30 and the rotation axis 33. Note that the contact position 33*a* between the plate-shaped part 30 and the rotation axis 33 is not only a position where the second surface 32 of the plate-shaped part 30 contacts the rotation axis 33—a position of the first surface 31 facing the contact position 33*a* of the second surface 32 is also the contact position 33*a*. In the present embodiment, as illustrated in FIG. 9(*a*), the first area 30*a* disposed on the first end edge 31*a* side close to the rotation axis 33 is a narrower area than the second area 30*b* disposed on the second end edge 31*b* side far from the rotation axis 33.

Pressure elevation in the housing portion 60 due to an arc discharge generated when the fuse element 2 fuses causes, as illustrated in FIG. 5 and FIG. 6, the first surface 31 to be pressed and the first shielding member 3*a* rotates around the rotation axis 33. In the present embodiment, as for pressing force on the first surface 31 due to pressure elevation in the housing portion 60, from among the first area 30*a* and the second area 30*b* illustrated in FIG. 9(*a*) the force on the second area 30*b* having a wide area is relatively stronger than the force on the first area 30*a* having a narrow area. Accordingly, pressing force on the second end edge 31*b* side of the first surface 31 is stronger than the pressing force on the first end edge 31*a* side. Therefore, the first shielding member 3*a*, as illustrated in FIG. 6, rotates in a direction in which the second end edge 31*b* side disposed on an outer side of the housing portion 60 in the X-direction is separated from the fuse element 2 (a direction moving away from the fuse element 2), and a direction in which the first end edge 31*a* side disposed on an inner side of the housing portion 60 in the X-direction moves closer to the fuse element 2.

As illustrated in FIG. 8A and FIG. 9(*b*), a convex portion 38 is vertically disposed at a center portion of the second end surface 32*b* of the second surface 32 in the Y-direction. The convex portion 38 has a quadrangular prism shape. One surface of the side surfaces of the convex portion 38 is a flat surface that is continuous with a side surface of the plate-shaped part 30 in the X-direction.

As illustrated in FIG. 5 and FIG. 6, when the fuse element 2 fuses, the convex portion 38 is housed in a guide hole 66 and functions as a guide for causing the first shielding member 3*a* to undergo rotational movement to a predetermined position. Accordingly, since the first shielding member 3*a* has the convex portion 38, the first shielding member 3*a* easily undergoes rotational movement to a predetermined position when the fuse element 2 fuses. As a result, rotation of the first shielding member 3*a* causes the inside of the housing portion 60 to be divided more reliably.

In the present embodiment, the convex portion 38 is disposed at a center portion of the second end surface 32*b* of the second surface 32 in the Y-direction; therefore, misalignment of the first shielding member 3*a* that undergoes rotational movement when the fuse element 2 fuses is more effectively prevented.

In the present embodiment, as illustrated in FIG. 8A, FIG. 9(*b*), and FIG. 9(*e*), the second end surface 32*b* of the second surface 32 is an inclined surface, chamfered at a width corresponding to a dimension of the convex portion 38 in the X-direction. Therefore, as illustrated in FIG. 6, the second end surface 32*b* of the second surface 32 is not brought into contact with the second bottom surface 68*d* of the concave portion 68, which will be described later, preventing entry of the convex portion 38 accompanying the rotational movement of the first shielding member 3*a*-into the guide hole 66 from being hindered. Accordingly, the first shielding member 3*a* easily undergoes rotational movement to a predetermined position when the fuse element 2 fuses. Furthermore, since it is not necessary to deepen the concave portion 68 to avoid contact between the second bottom surface 68*d* and the convex portion 38 accompanying the rotational movement of the first shielding member 3*a*, the protection element 100 may be miniaturized. Moreover, since it is not necessary to deepen the concave portion 68, a thickness of the case 6 may be secured, and a strength of the case 6 may be secured.

A size of the concave portion 38, as illustrated in FIG. 3 and FIG. 4, is of a dimension that may be housed in the convex portion 68 formed in the housing portion 60 in a state prior to the first shielding member 3*a* rotating, and, as illustrated in FIG. 5 and FIG. 6, that may be housed in the guide hole 66 formed in the concave portion 68 when the first shielding member 3*a* has rotated. In the present embodiment, a dimension of the convex portion 38 in the X-direction and a length from the second surface 32 to an apex portion of the convex portion 38 are substantially the same as a thickness of the plate-shaped part 30, and a dimension of the convex portion 38 in the Y-direction is longer than the dimension in the X-direction.

In the present embodiment, a case where the convex portion 38 is provided having the foregoing quadrangular prism shape is given as an example; however, the shape of the convex portion is not limited to the foregoing quadrangular prism shape, and, for example, it may be a square prism shape, and the dimension in the Y-direction may be shorter than the dimension in the X-direction. Furthermore, the shape of the convex portion may be, for example, a columnar shape having a cross-sectional shape such as a circular shape, an oval shape, an elliptical shape, a triangular shape, a hexagonal shape, or the like.

Furthermore, in the present embodiment, a case where the convex portion 38 is disposed at a center portion of the second surface 32 in the Y-direction is described as an example; however, the position of the convex portion in the Y-direction need not be at a center portion on the second surface 32.

Furthermore, in the present embodiment, a case where the shielding member has a convex portion is described as an example; however, the convex portion is provided as necessary so that the shielding member easily undergoes rotational movement to a predetermined position, and need not be provided. Even in the case where the shielding member does not have the convex portion, it is preferable to provide the guide hole 66 in the concave portion 68 so that gas inside the housing portion 60 generated by an arc discharge when the fuse element 2 fuses is discharged to an internal pressure buffer space 71.

The first shielding member 3*a* and the second shielding member 3*b* are composed of an insulating material. A ceramic material, a resin material, or the like may be used as the insulating material.

Alumina, mullite, zirconia, or the like may be exemplified as a ceramic material, and it is preferable to use a material having high thermal conductivity, such as alumina. When the first shielding member 3*a* and the second shielding member 3*b* are formed of a material having high thermal conductivity, such as a ceramic material, the heat generated when the fuse element 2 fuses may be efficiently dissipated to the outside. Accordingly, continuation of an arc discharge generated when the fuse element 2 fuses is more effectively suppressed.

It is preferable to use any one selected from polyphenylene sulfide (PPS) resin, nylon-based resin, fluorine resin such as polytetrafluoroethylene or the like, or polyphthalamide (PPA) resin as a resin material, and using a nylon-based resin is particularly preferable.

An aliphatic polyamide may be used or a semi-aromatic polyamide may be used as the nylon-based resin. When using an aliphatic polyamide that does not contain a benzene ring as a nylon-based resin, even if the first shielding member 3*a* and/or the second shielding member 3*b* are burned by the arc discharge generated when the fuse element 2 fuses, graphite is less likely to be generated compared to when using a semi-aromatic polyamide that does have a benzene ring. Therefore, using aliphatic polyamide to form the first shielding member 3*a* and the second shielding member 3*b* may prevent formation of a new conduction path due to graphite generated when the fuse element 2 fuses.

For example, Nylon 4, Nylon 6, Nylon 46, Nylon 66, or the like may be used as the aliphatic polyamide.

For example, Nylon 6T, Nylon 9T, or the like may be used as the semi-aromatic polyamide.

Among these nylon-based resins, it is preferable to use a resin that does not contain a benzene ring, such as Nylon 4, Nylon 6, Nylon 46, Nylon 66, or the like, which are aliphatic polyamides, and it is more preferable to use Nylon 46 or Nylon 66 due to their excellent heat resistance.

For example, when the shielding member 3 in the protection element 100 and the case 6 and the cover 4 are composed of Nylon 66, which is an aliphatic polyamide, an insulation resistance after current interruption is 10 to 10,000 times higher in comparison to when they are composed of Nylon 9T, which is a semi-aromatic polyamide having a benzene ring.

It is preferable to use a material having a tracking resistance index CTI equal to or more than 400 V as the resin material, and more preferably equal to or more than 600 V. Tracking resistance may be obtained by a test based on IEC 60112.

A nylon-based resin is particularly preferable among the resin materials due to high tracking resistance (resistance against tracking (carbonized conductive path) destruction).

It is preferable to use a material having a high glass transition temperature as the resin material. The glass transition temperature (Tg) of the resin material is the temperature at which the material changes from a soft rubbery state to a hard glassy state. When the resin is heated to equal to or more than the glass transition temperature, the molecules become more mobile and the resin changes to a soft rubbery state. On the other hand, when the resin is cooled, movement of the molecules is restricted and the resin changes to a hard glassy state.

The first shielding member 3*a* and the second shielding member 3*b* may be manufactured by a known method.

(Case)

The case 6, as illustrated in FIG. 1 to FIG. 3, has a substantially cylindrical shape. The case 6 is composed of the first case 6*a* and a second case 6*b*, and the first case 6*a* and the second case 6*b* are disposed facing the fuse element 2. One portion of the first terminal 61 and on portion of the second terminal 62 are sandwiched between the first case 6*a* and the second case 6*b* and fixed by the cover 4.

As illustrated in FIG. 1 to FIG. 3, the first case 6*a* and the second case 6*b* are the same shape, which is a semi-cylindrical shape. In the present embodiment, the first case 6*a* and the second case 6*b* have the same shape; therefore, using the same material for manufacturing is preferable to be able to reduce the types of components to be manufactured. The first case 6*a* and the second case 6*b* may also be formed of different materials.

In the present embodiment, the first case 6*a* and the second case 6*b* have the same shape, and are disposed facing each other via the fuse element 2; therefore, stress caused by pressure elevation in the housing portion 60 when the fuse element 2 fuses is evenly distributed and applied to the first case 6*a* and the second case 6*b*. Thus, the case 6 has excellent strength and may effectively prevent breakage of protection element 100 when the fuse element 2 fuses.

As illustrated in FIG. 1 to FIG. 3, the housing portion 60 is provided on the inside of the case 6. The housing portion 60 is formed by integrating the first case 6*a* and the second case 6*b*. The fuse element 2, the first shielding member 3*a*, and the second shielding member 3*b* are stored in the housing portion 60.

As illustrated in FIG. 3, two insertion holes 64 that open in the housing portion 60 are disposed facing each other in the X-direction in the housing portion 60. The two insertion holes 64 are respectively formed by integrating the second case 6*b* and the first case 6*a*.

As illustrated in FIG. 3, one of the two insertion holes 64 houses the first end portion 21 of the fuse element 2, and the other insertion hole 64 houses the second end portion 22 of the fuse element 2.

As illustrated in FIG. 1 and FIG. 3, one portion of the first terminal 61 and one portion of the second terminal 62 connected to the fuse element 2 are exposed to the outside of the case 6.

In the present embodiment, FIG. 10A to FIG. 10C and FIG. 11 will be used to describe a structure of the first case 6*a*. A structure of the second case 6*b* is the same as that of the first case 6*a*; therefore, the description will be omitted.

Figure 10A:
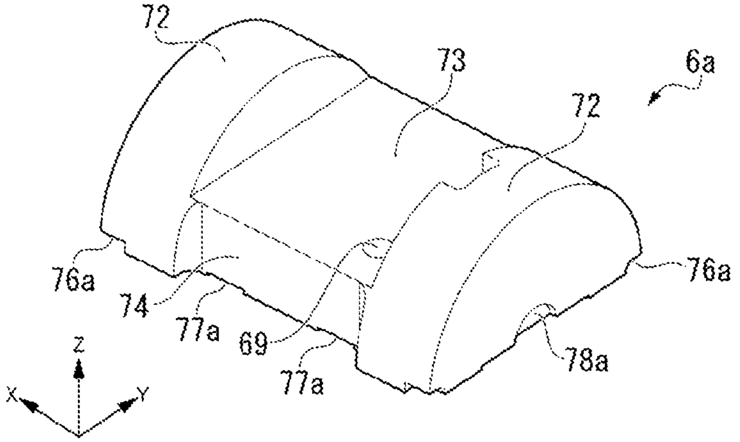
FIG. 10A is a drawing for describing a structure of a first case 6*a* provided in the protection element 100 of the first embodiment, and is a perspective view looking from the outside.
Figure 10B:
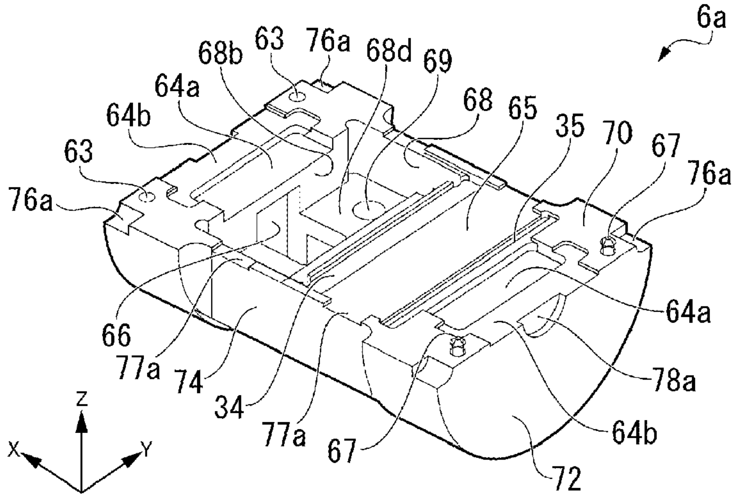
FIG. 10B is a drawing for describing the structure of the first case 6*a* provided in the protection element 100 of the first embodiment, and is a perspective view of an inside of the housing portion.
Figure 10C:
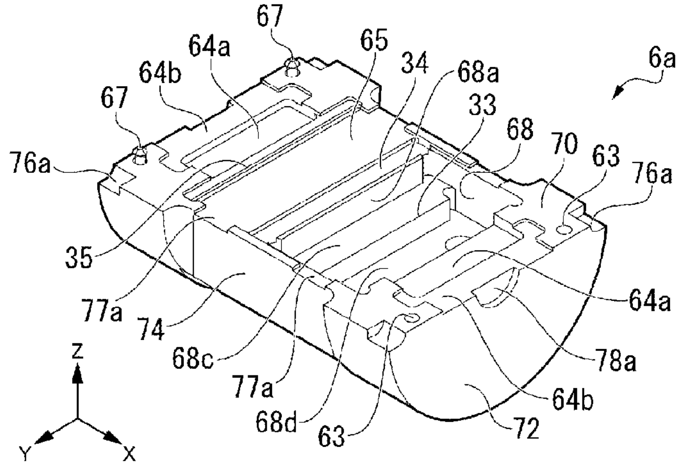
FIG. 10C is a drawing for describing the structure of the first case 6*a* provided in the protection element 100 of the first embodiment, and is a perspective view of the inside of the housing portion.
Figure 11:
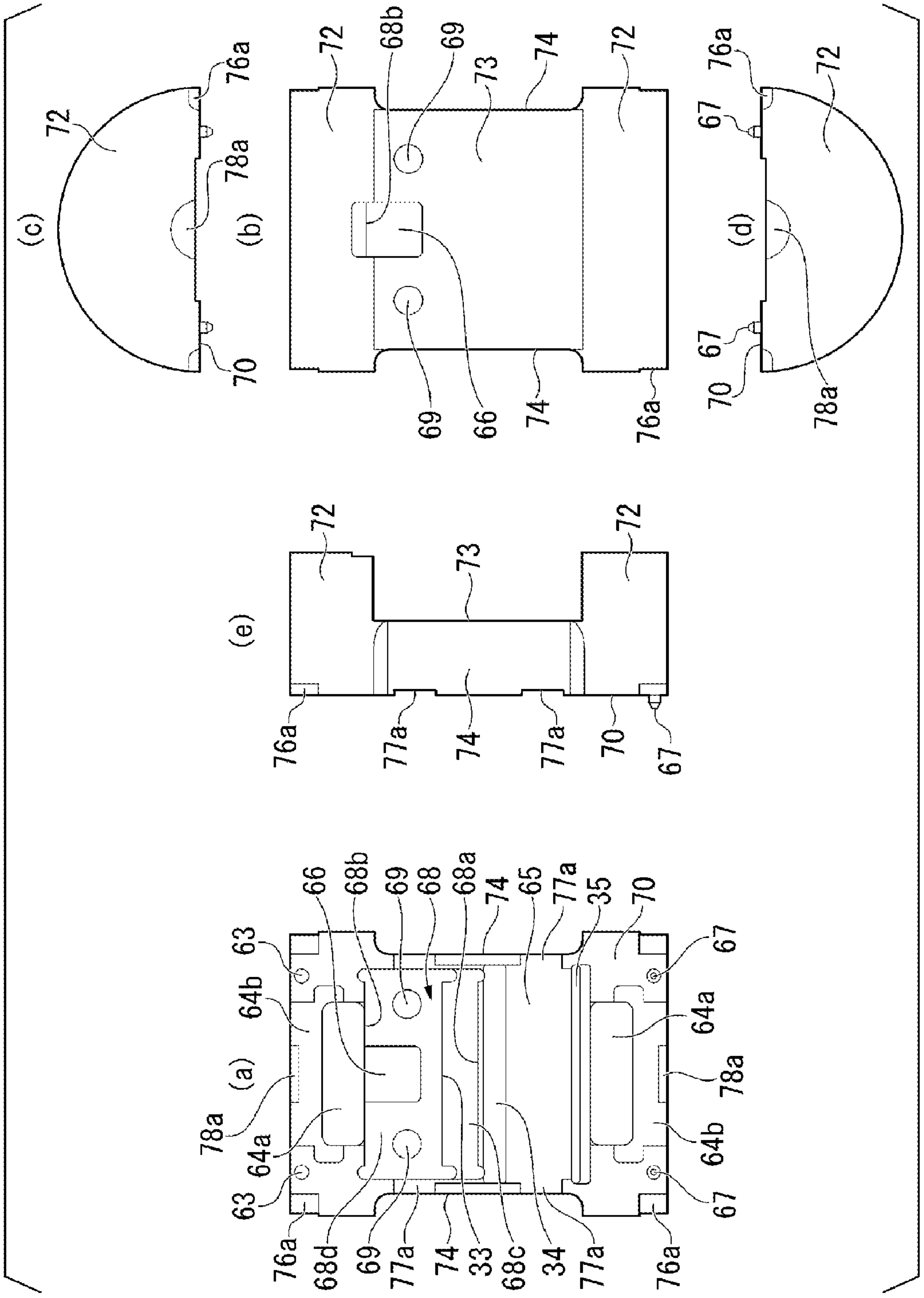
FIG. 11 is a drawing for describing the structure of the first case 6*a* provided in the protection element 100 of the first embodiment.

FIG. 10A to FIG. 10C are drawings for describing the structure of the first case 6*a* provided in the protection element 100 of the first embodiment. FIG. 10A is a perspective view of the first case 6*a* looking from the outside, and FIG. 10B and FIG. 10C are perspective views of the inside of the housing portion of the first case 6*a*. FIG. 11 is a drawing for describing the structure of the first case 6*a* provided in the protection element 100 of the first embodiment. FIG. 11(*a*) is a plan view of the inside of the housing portion of the first case 6*a*, FIG. 11(*b*) is a plan view of the first case 6*a* looking from the outside, and FIGS. 11(*c*) to (*e*) are side surface views of the first case 6*a*.

As illustrated in FIG. 10B, FIG. 10C, and FIG. 11(*a*), an XY surface of the first case 6*a* facing the second case 6*b* has a substantially rectangular shape having a long side in the X-direction and a short side in the Y-direction in a plan view, and has a shape wherein the length in the Y-direction of the X-direction center portion is short. As illustrated in FIG. 10B, FIG. 10C, and FIG. 11(*a*), in the first case 6*a*, by being integrated with the second case 6*b*, the concave portion 68, the shielding member housing groove 34, and a fuse element-mounting surface 65 are provided in a region constituting an inner surface of the housing portion 60.

As illustrated in FIG. 10B, FIG. 10C, and FIG. 11(*a*), the concave portion 68 is a substantially rectangular shape in a plan view. As illustrated in FIG. 4, the first shielding member 3*a* (the second shielding member 3*b* in the case of the second case 6*b*) is housed in the concave portion 68. In the present embodiment, as illustrated in FIG. 4, FIG. 10C, and FIG. 11(*a*), a first wall surface 68*a* disposed on an inner side of the first case 6*a* in the X-direction, from among the inner wall surfaces of the concave portion 68, is disposed substantially at the center of the first case 6*a* in the X-direction. Accordingly, the first wall surface 68*a* is disposed overlapping the cut portion 23 of the fuse element 2 in the Z-direction (see FIG. 4).

As illustrated in FIG. 4, a bottom surface of the concave portion 68 is a surface facing the second surface 32 in the plate-shaped part 30 of the first shielding member 3*a* (the second shielding member 3*b* in the case of the second case 6*b*). The bottom surface of the concave portion 68, as illustrated in FIG. 10B, FIG. 10C, and FIG. 11(*a*), has the first bottom surface 68*c* disposed on the first wall surface 68*a* side, and the second bottom surface 68*d* disposed on a second wall surface 68*b* side facing the first wall surface 68*a*. The first bottom surface 68*c* is provided at a position closer to the surface facing the fuse element 2 in the Z-direction than the second bottom surface 68*d*. As a result, as illustrated in FIG. 4 and FIG. 10C, a step extending in the Y-direction is formed at a boundary portion between the first bottom surface 68*c* and the second bottom surface 68*d*. In the present embodiment, as illustrated in FIG. 4 and FIG. 10C, a step formed in the concave portion 68 of the first case 6*a* functions as the rotation axis 33 of the first shielding member 3*a* (the rotation axis 33 of the second shielding member 3*b* in the case of the second case 6*b*).

As illustrated in FIG. 4 and FIG. 10C, a position in the X-direction of the step (rotation axis 33) formed in the concave portion 68 of the first case 6*a* is at a position closer to the first wall surface 68*a* than the second wall surface 68*b*. As a result, as illustrated in FIG. 9(*a*), among the areas of the plate-shaped part 30 of the first shielding member 3*a* (the second shielding member 3*b* in the case of the second case 6*b*) looking from the fuse element 2, the first area 30*a* disposed on the first end edge 31*a* side closer to the rotation axis 33 than the contact position 33*a* between the plate-shaped part 30 and the rotation axis 33 is narrower than the second area 30*b* disposed on the second end edge 31*b* side farther from the rotation axis 33.

In the present embodiment, a ratio of a length of the first bottom surface 68*c* in the X-direction to a length of the concave portion 68 in the X-direction (length of the first bottom surface 68*c*/concave portion 68 in the X-direction) is substantially the same as a ratio between the area of the plate-shaped part 30 and the first area 30*a* (area of the first area 30*a*/plate-shaped part 30), which is less than 0.5, preferably 0.2 to 0.49, and more preferably 0.3 to 0.4.

Here, the length of the concave portion 68 in the X-direction is the length from the first wall surface 68*a* of the concave portion 68 to the second wall surface 68*b* in the X-direction.

When the ratio of the length of the first bottom surface 68*c* in the X-direction to the length of the concave portion 68 in the X-direction is equal to or less than 0.4, the difference between the first area 30*a* and the second area 30*b* increases sufficiently. As a result, regarding the pressing force on the first surface 31 of the plate-shaped part 30 of the first shielding member 3*a* due to pressure elevation in the housing portion 60, the difference between the second end edge 31*b* side and the first end edge 31*a* side also increases. Therefore, pressing force due to pressure elevation in the housing portion 60 is efficiently converted into driving force for causing the first shielding member 3*a* to undergo rotational movement. As a result, the first shielding member 3*a*, as illustrated in FIG. 6, rotates at a sufficient rotational speed in a direction in which the second end edge 31*b* side disposed on an outer side of the housing portion 60 in the X-direction is separated from the fuse element 2, and a direction in which the first end edge 31*a* side disposed on an inner side of the housing portion 60 in the X-direction moves closer to the fuse element 2. Also, the first end edge 31*a* is pressed by a strong force onto the bottom surface of the shielding member housing groove 34 provided on an inner surface of the housing portion 60. From this, when the ratio of the length of the first bottom surface 68*c* in the X-direction to the length of the concave portion 68 in the X-direction is equal to or less than 0.4, the first end edge 31*a* of the first surface 31 of the plate-shaped part 30, a portion in contact with the rotation axis 33 of the second surface 32, and a side surface of the plate-shaped part 30 more reliably block and divide the inside of the housing portion 60.

When the ratio of the length of the first bottom surface 68*c* in the X-direction to the length of the concave portion 68 in the X-direction is equal to or more than 0.3, the area of the first bottom surface 68*c* may be sufficiently secured. Therefore, the first bottom surface 68*c* may more stably hold the first shielding member 3*a* prior to undergoing rotational movement at a predetermined position in the first case 6*a*. As a result, the protection element 100 is more excellent in reliability.

In the present embodiment, a case where the first bottom surface 68*c* is disposed on the first wall surface 68*a* side of the concave portion 68, and the second bottom surface 68*d* is disposed on the second wall surface 68*b* side is described as an example; however, the second bottom surface 68*d* may be disposed on the first wall surface 68*a* side of the concave portion 68, and the first bottom surface 68*c* may be disposed on the second wall surface 68*b* side. In this case, a position in the X-direction of the step (rotation axis 33) formed in the concave portion 68 of the first case 6*a* is at a position closer to the second wall surface 68*b* than the first wall surface 68*a*. Accordingly, from among both ends in the X-direction of the first surface 31 of the plate-shaped part 30 of the first shielding member 3*a*, the first end edge 31*a* close to the rotation axis 33 is disposed on an outer side of the housing portion 60 in the X-direction, and the second end edge 31*b* far from the rotation axis 33 is disposed on an inner side of the housing portion 60 in the X-direction. Also, a rotation direction of the first shielding member 3*a* is an opposite direction to the protection element 100 of the present embodiment.

In the present embodiment, the first bottom surface 68*c* is disposed on the first wall surface 68*a* side of the concave portion 68, and the second bottom surface 68*d* is disposed on the second wall surface 68*b* side; therefore, in the housing portion 60, a position in the X-direction blocked by the first shielding member 3*a* and a position in the X-direction blocked by the second shielding member 3*b* are in proximity and are also closer to the cut portion 23 (heatspot) in comparison to when the second bottom surface 68*d* is disposed on the first wall surface 68*a* side and the first bottom surface 68*c* is disposed on the second wall surface 68*b* side. Therefore, an arc discharge generated when the fuse element 2 fuses is further reduced, and this is preferable.

In the present embodiment, it is preferable that the length of the concave portion 68 in the Y-direction is such that the plate-shaped part 30 of the first shielding member 3*a* fits inside the concave portion 68 while being in contact with an inner wall surface of the concave portion 68. In this case, pressure elevation inside the housing portion 60 when the fuse element 2 fuses allows the first shielding member 3*a* to rotate. Moreover, the first shielding member 3*a* rotates, causing the first end edge 31*a* of the first surface 31 of the plate-shaped part 30, a portion in contact with the rotation axis 33 of the second surface 32, and a side surface of the plate-shaped part 30 to block and divide the inside of the housing portion 60 more reliably. Moreover, the first shielding member 3*a* prior to undergoing rotational movement may be held more stably at a predetermined position in the first case 6*a*. Specifically, a distance separating the inner wall surface facing the concave portion 68 in the Y-direction and the plate-shaped part 30 is, for example, preferably 0.05 to 0.2 mm, and more preferably 0.05 to 0.1 mm.

As illustrated in FIG. 11(*a*), one guide hole 66 and two bottom surface vents 69 are provided in the second bottom surface 68*d* of the concave portion 68. As illustrated in FIG. 11(*a*) and FIG. 11(*b*), the one guide hole 66 and the two bottom surface vents 69 pass through the first case 6*a* in the Z-direction and open to the second bottom surface 68*d* and an outer surface of the first case 6*a*.

The guide hole 66 discharges gas inside the housing portion 60—generated by an arc discharge when the fuse element 2 fuses—to the internal pressure buffer space 71. When the fuse element 2 fuses, the guide hole 66 also functions together with the convex portion 38 of the first shielding member 3*a* as a guide for causing the first shielding member 3*a* to undergo rotational movement to a predetermined position. The guide hole 66 has a dimension wherein the convex portion 38 of the first shielding member 3*a* may be housed when the first shielding member 3*a* has rotated.

The guide hole 66 has a substantially rectangular shape in a plan view. An inner wall surface on the outer side of the guide hole 66 in the X-direction, as illustrated in FIG. 4, FIG. 10B, and FIG. 11(*b*), is disposed at a position further to the outer side in the X-direction than the second wall surface 68*b* and, as illustrated in FIG. 4 and FIG. 10B, is formed extending to a position closer to the surface facing the fuse element 2 than the second bottom surface 68*d*. Therefore, even if the first shielding member 3*a* undergoes rotational movement when the fuse element 2 fuses and the convex portion 38 is housed in the guide hole 66, the guide hole 66 is not obstructed by the shielding member 3. Accordingly, gas in the housing portion 60 generated by an arc discharge may be reliably discharged to the internal pressure buffer space 71. Furthermore, as illustrated in FIG. 6, the first shielding member 3*a* rotates, causing the second end edge 31*b* of the first surface 31 of the plate-shaped part 30 to be easily housed in the concave portion 68 along the inner wall surface of the guide hole 66. Moreover, since the first case 6*a* has the second wall surface 68*b*, the first case 6*a* may hold the first shielding member 3*a* before the rotational movement at a predetermined position along the second wall surface 68*b* with high accuracy and more stability.

The bottom surface vent 69 has a substantially cylindrical shape. The bottom surface vent 69 controls pressure elevation in the concave portion 68 when the fuse element 2 fuses and thereby controls arc discharge.

In the present embodiment, a case where the bottom surface vent 69 having a substantially cylindrical shape is provided is described as an example; however, the shape of the vent is not limited to a substantially cylindrical shape—for example, it may be a long cylindrical shape, an elliptical cylindrical shape, a polygonal cylindrical shape, or the like.

Two bottom surface vents 69 are disposed symmetrically with respect to the center in the Y-direction, as illustrated in FIG. 11(*a*). Therefore, when the fuse element 2 fuses, gas inside the housing portion 60 is easily discharged to the outside of the housing portion 60 evenly and quickly via the two bottom surface vents 69, which is preferable.

In the present embodiment, a case where two bottom surface vents 69 are provided is described as an example; however, the number of bottom surface vents is not particularly limited—it may be one or may be three or more, and the bottom surface vent 69 need not be provided. When the bottom surface vent 69 is not provided, it is preferable to have the guide hole 66 and/or a side surface vent 77, which will be described later.

As illustrated in FIG. 3, FIG. 10B, FIG. 10C, and FIG. 11(*a*), on a surface on the housing portion 60 side of the first case 6*a*, the shielding member housing groove 34 is provided on an opposite side to the concave portion 68 in a plan view with respect to the substantial center in the X-direction. The shielding member housing groove 34 has a substantially rectangular shape, and is composed of a groove having a flat bottom surface in a plan view. As illustrated in FIG. 5 and FIG. 6, the first shielding member 3*a* rotates, causing one portion of the plate-shaped part 30 to be housed in the shielding member housing groove 34. In the present embodiment, a length of the shielding member housing groove 34 in the Y-direction is longer than the length of the first shielding member 3*a* in the Y-direction. Therefore, the first shielding member 3*a* rotates, causing the entire first end edge 31*a* on the first surface 31 of the plate-shaped part 30 to be disposed in contact with the top of the bottom surface of the shielding member housing groove 34.

In the present embodiment, as illustrated in FIG. 10B, FIG. 10C, and FIG. 11(*a*), an outer side of an edge portion facing the shielding member housing groove 34 in the Y-direction is a joining surface 70 that is joined to the second case 6*b*. Therefore, the first shielding member 3*a* rotates in a state where the first case 6*a* and the second case 6*b* are joined, causing the first end edge 31*a* of the first surface 31 and a portion in contact with the rotation axis 33 of the second surface 32 of the plate-shaped part 30, and a side surface of the plate-shaped part 30 to block and divide the inside of the housing portion 60 more reliably.

A depth of the shielding member housing groove 34 is preferably 0.5 to 2 times and more preferably 0.5 to 1 times the thickness of the fuse element 2. When the depth of the shielding member housing groove 34 is equal to or more than 0.5 times the thickness of the fuse element 2, the inside of the housing portion 60 may be more reliably divided by the first shielding member 3*a* rotating. Furthermore, when the depth of the shielding member housing groove 34 is equal to or less than two times the thickness of the fuse element 2, a function of the shielding member housing groove 34 as a stopper causes a range in which the first shielding member 3*a* undergoes rotational movement to be appropriate. Therefore, to avoid contact between the first shielding member 3*a* and the concave portion 68 accompanying the rotational movement of the first shielding member 3*a*, it is not necessary that a size of the concave portion 68 is excessively increased, and that miniaturization of the protection element 100 is not hindered.

Furthermore, it is preferable that a distance in the Z-direction between a surface of the fuse element 2 and an inner wall of the housing portion 60 is short to effectively control continuation of an arc discharge generated when the fuse element 2 fuses. As illustrated in FIG. 4, a distance in the Z-direction between a surface of the fuse element 2 and the bottom surface of the fuse element-mounting surface 65 is shorter than the distance in the Z-direction between a surface of the fuse element 2 and the bottom surface of the shielding member housing groove 34. Accordingly, it is preferable to shorten the length of the shielding member housing groove 34 in the X-direction to increase a region—from among the surfaces of the fuse element 2—facing the fuse element-mounting surface 65.

When the depth of the shielding member housing groove 34 is equal to or less than two times the thickness of the fuse element 2, even if the length of the shielding member housing groove 34 in the X-direction is short, the first end edge 31*a* on the first surface 31 of the plate-shaped part 30 may be disposed in contact with the top of the bottom surface of the shielding member housing groove 34 without excessive rotational movement of the first shielding member 3*a*. Accordingly, from among the surfaces of the fuse element 2, the ratio of the region facing the fuse element-mounting surface 65 may be increased, and an arc discharge generated when the fuse element 2 is cut may be controlled.

As illustrated in FIG. 10B, FIG. 10C, and FIG. 11(*a*), on a surface on the housing portion 60 side of the first case 6*a*, the fuse element-mounting surface 65 composed of a concave portion is provided on an outer side of the shielding member housing groove 34 in the X-direction in a plan view. A step is formed at a boundary portion between the fuse element-mounting surface 65 and the shielding member housing groove 34, and at a boundary portion between the fuse element-mounting surface 65 and the joining surface 70 joined to the second case 6*b*. In the present embodiment, a depth of the concave portion forming the fuse element-mounting surface 65 is preferably equal to or less than the thickness dimension of the fuse element 2, and, for example, may be a dimension half the thickness of the fuse element 2.

The bottom surface of the fuse element-mounting surface 65 is disposed in proximity to or in contact with the fuse element 2, and as illustrated in FIG. 4, it is preferable that it be disposed in contact with the fuse element 2. When the bottom surface of the fuse element-mounting surface 65 is disposed in contact with the fuse element 2, an arc discharge generated when the fuse element 2 fuses is further reduced.

In the present embodiment, the distance between the bottom surface of the fuse element-mounting surface 65 of the first case 6*a* (second case 6*b*) and the second shielding member 3*b* (first shielding member 3*a*) disposed facing via the fuse element 2 in the Z-direction is preferably equal to or less than ten times the thickness of the fuse element 2, more preferably equal to or less than five times, and even more preferably equal to or less than two times; it is particularly preferable that the fuse element 2 is in contact with the bottom surface of the fuse element-mounting surface 65 of the first case 6*a* (second case 6*b*) and/or the second shielding member 3*b* (first shielding member 3*a*). When the foregoing distance in the Z-direction is equal to or less than ten times the thickness of the fuse element 2, the number of lines of electric force generated by an arc discharge is reduced, and an arc discharge generated when the fuse element 2 is fused is reduced. Furthermore, since the foregoing distance in the Z-direction is short, the protection element 100 may be miniaturized.

As illustrated in FIG. 10B, FIG. 10C, and FIG. 11(*a*), a leak prevention groove 35 extending in the Y-direction is provided at a position on an outer side in the X-direction on the bottom surface of the fuse element-mounting surface 65. When the fuse element 2 fuses, and the melted fuse element 2 disperses and dispersed matter attaches to the inside of the housing portion 60, the leak prevention groove 35 divides a conduction path formed by the adhered matter to prevent a leak current.

It is preferable that a length of the leak prevention groove 35 in the Y-direction is longer than the width 21D in the Y-direction in the first end portion 21 and the width 22D in the Y-direction in the second end portion 22 of the fuse element 2. In this case, it is possible to prevent dispersed matter adhered to the inside of the housing portion 60 when the fuse element 2 fuses from being electrically connected to the first terminal 61 or the second terminal 62 more effectively, and it is possible to prevent generation of a leak current more effectively.

The leak prevention groove 35 is formed at a substantially fixed width and depth. The width and depth of the leak prevention groove 35 are not particularly limited, provided that the leak prevention groove 35 is able to divide a conduction path formed by adhered matter dispersed when the fuse element 2 fuses and prevent a leak current.

In the protection element 100 of the present embodiment, it is preferable that the leak prevention groove 35 is provided; however, the leak prevention groove 35 need not be provided. Furthermore, it is preferable that the leak prevention groove 35 be provided extending in the Y-direction to a position on an outer side in the X-direction on the bottom surface of the fuse element-mounting surface 65; however, it may be at another position on the bottom surface of the fuse element-mounting surface 65, or it need not extend in the Y-direction.

As illustrated in FIG. 10A to FIG. 10C and FIG. 11(*a*), a side surface concave portion 77*a* composed of a concave portion is respectively provided at an edge portion of the concave portion 68 facing in the Y-direction, where the position in the X-direction is within a range where the second bottom surface 68*d* is formed. As illustrated in FIG. 10B and FIG. 10C, a step is formed at a boundary portion between the side surface concave portion 77*a* disposed at an edge portion of the concave portion 68 and the joining surface 70 joined to the second case 6*b*.

As illustrated in FIG. 10A to FIG. 10C and FIG. 11(*a*), the side surface concave portion 77*a* composed of a flat surface continuous from the bottom surface of the fuse element-mounting surface 65 is respectively provided at an edge portion of the fuse element-mounting surface 65 facing in the Y-direction, at which the position in the X-direction is further to the center side than the leak prevention groove 35. As illustrated in FIG. 10B and FIG. 10C, a step is formed at a boundary portion between the side surface concave portion 77*a* disposed at an edge portion of the fuse element-mounting surface 65 and the joining surface 70 joined to the second case 6*b*.

Four side surface concave portions 77*a* provided at the edge portions of the concave portion 68 of the first case 6*a* are each integrated with the second case 6*b* to form four side surface vents 77 passing through the case 6 together with four side surface concave portions 77*a* provided in the second case 6*b* (see FIG. 1). The side surface vent 77 controls pressure elevation in the housing portion 60 when the fuse element 2 fuses and thereby controls arc discharge.

In the present embodiment, two side surface concave portions 77*a* disposed on the edge portions of the concave portion 68 and two side surface concave portions 77*a* disposed on the edge portions of the fuse element-mounting surface 65 all have a depth of a dimension that is half the thickness of the fuse element 2. Furthermore, the two side surface concave portions 77*a* disposed on the edge portions of the concave portion 68 and two side surface concave portions 77*a* disposed on the edge portions of the fuse element-mounting surface 65 have the same shape, and are disposed symmetrically with respect to the center of the housing portion 60 in the X-direction. Therefore, the four side surface vents 77 formed by integration of the first case 6*a* and the second case 6*b* are disposed at a position where gas in the housing portion 60 generated when the fuse element 2 fuses is easily discharged outside of the housing part 60 evenly and quickly, and this is preferable.

In the present embodiment, a case where the depth of the side surface concave portion 77*a* is a dimension that is half the thickness of the fuse element 2 is described as an example; however, the depth of the side surface concave portion 77*a* is not particularly limited. Furthermore, in the present embodiment, a case where four side surface concave portions 77*a* have the same shape is described as an example; however, of the four side surface concave portions 77*a*, one part or all may have a different shape.

In the present embodiment, a case where four side surface vents 77 are provided is described as an example; however, the number of side surface vents is not particularly limited—it may be equal to or less than three or equal to or less than five, and a side surface vent need not be provided. When the side surface vent 77 is not provided, it is preferable to have the guide hole 66 and/or the bottom surface vent 69.

As illustrated in FIG. 10B, FIG. 10C, and FIG. 11(*a*), on a surface on the housing portion 60 side of the first case 6*a*, an insertion hole-forming surface 64*a* composed of a concave portion is respectively provided on an outer side of the concave portion 68 and the fuse element-mounting surface 65 in the X-direction in a plan view. A step is formed at a boundary portion between each insertion hole-forming surface 64*a* and the joining surface 70 joined to the second case 6*b*. The step between the insertion hole-forming surface 64*a* and the joining surface 70 has a dimension capable of forming the insertion hole 64 that is able to house a laminated portion of the first terminal 61 (or second terminal 62) and the fuse element 2 by the first case 6*a* and second case 6*b* being integrated.

A length of the insertion hole-forming surface 64*a* in the Y-direction is longer than the width 21D in the Y-direction in the first end portion 21 and the width 22D in the Y-direction in the second end portion 22 of the fuse element 2. Therefore, the widths 21D and 22D direction entire surface of the first end portion 21 and the second end portion 22 of the fuse element 2 are disposed on the insertion hole-forming surface 64*a*.

As illustrated in FIG. 10B, FIG. 10C, and FIG. 11(*a*), a terminal-mounting surface 64*b* composed of a concave portion is respectively provided so as to surround in a plan view an outer side of two insertion hole-forming surfaces 64*a* in the X-direction and one portion of an outer side of the insertion hole-forming surfaces 64*a* in the Y-direction. The terminal-mounting surface 64*b* has an external shape corresponding to a planar shape of the first terminal 61 and the second terminal 62. As a result, the first case 6*a* may be easily aligned with the first terminal 61 and the second terminal 62. Furthermore, it is difficult for the first terminal 61 and the second terminal 62 to come out of the case 6.

For example, in the present embodiment, it is preferable that the terminal-mounting surface 64*b* has an external shape corresponding to a substantial T-shape, which is the planar shape of the first terminal 61 having the flange portion 61*c* and the second terminal 62 having the flange portion 62*c*. According to the present structure, the protection element 100 is obtained having favorable reliability and durability, wherein the flange portion 61*c* and the flange portion 62*c* are unlikely to come out.

As illustrated in FIG. 10B and FIG. 10C, the terminal-mounting surface 64*b* is provided at a position closer to the joining surface 70 joined to the second case 6*b* in the Z-direction than a surface of the insertion hole-forming surface 64*a*. As a result, a step is formed at a boundary portion between the terminal-mounting surface 64*b* and the insertion hole-forming surface 64*a*. Furthermore, a step is also formed at a boundary portion between the terminal-mounting surface 64*b* and the joining surface 70 joined to the second case 6*b*. The step between the terminal-mounting surface 64*b* and the joining surface 70 has a dimension capable of housing the first terminal 61 (or second terminal 62) by integration of the first case 6*a* and the second case 6*b*.

As illustrated in FIG. 10B, FIG. 10C, and FIG. 11(*a*), a notch 78*a* composed of a concave portion having a substantially semicircular-shaped bottom surface is respectively formed at a center portion in the Y-direction on an edge portion of an outer side of the two terminal-mounting surfaces 64*b* in the X-direction. A first adhesive inlet 78 (see FIG. 1 and FIG. 3) having a substantially cylindrical shape looking from the X-direction is formed from each notch 78*a* by integration of the first case 6*a* and the second case 6*b*.

As illustrated in FIG. 10A to 10C and FIG. 11(*a*) to FIG. 11(*d*), a notch 76*a* is respectively formed at a position on each of the four corners of the first case 6*a* in a plan view on the joining surface 70—of the first case 6*a*—joined to the second case 6*b*. A second adhesive inlet 76 (see FIG. 1) that is hollow and having a semicircular columnar shape in a cross section looking from the X-direction is formed from each notch 76*a* by integration of the first case 6*a* and the second case 6*b*.

As illustrated in FIG. 10B and FIG. 10C, a fitting concave portion 63 that is substantially circular in a plan view is respectively formed between the terminal-mounting surface 64*b* and two notches 76*a* formed on the concave portion 68 side from among the four notches 76*a* formed on the joining surface 70—of the first case 6*a*—joined to the second case 6*b*.

Furthermore, as illustrated in FIG. 10B, FIG. 10C, and FIG. 11(*a*), a fitting convex portion 67 that is substantially circular in a plan view is respectively formed between the terminal-mounting surface 64*b* and two notches 76*a* formed on the fuse element-mounting surface 65 side from among the four notches 76*a* formed on the joining surface 70—of the first case 6*a*—joined to the second case 6*b*. Each fitting concave portion 63 is fitted to each fitting convex portion 67 by integrating the first case 6*a* and the second case 6*b*.

As illustrated in FIG. 10A, FIG. 11(*b*), and FIG. 11(*e*), a first buffer concave portion 73 formed on a surface of an opposite side to the joining surface 70 joined to the second case 6*b* is provided on an outer surface of the first case 6*a*. Furthermore, as illustrated in FIG. 10A to FIG. 10C and FIG. 11(*a*), a second concave portion 74 is respectively provided on both side surfaces of the first case 6*a* in the Y-direction. The second concave portion 74 is formed as a second buffer concave portion 75 (see FIG. 1) by integrating the first case 6*a* and the second case 6*b*. Furthermore, as illustrated in FIG. 10A to FIG. 10C and FIG. 11(*b*) to FIG. 11(*e*), an end member 72 having a semi-cylindrical external shape is respectively provided at both end portions of an outer surface of the first case 6*a* in the X-direction. The end member 72 is formed in a cylindrical shape by integrating the first case 6*a* and the second case 6*b*.

The first buffer concave portion 73 and the second concave portion 74 (second buffer concave portion 75) form the internal pressure buffer space 71 surrounded by an inner surface of the cover 4 and an outer surface of the case 6 formed by integration of the first case 6*a* and the second case 6*b*. The internal pressure buffer space 71 is provided in an annular shape along an inner surface of the cover 4 at a center portion of the cover 4 in the X-direction.

In the present embodiment, a length (thickness) of the end member 72 in the X-direction is sufficiently secured so as to be able to withstand stress caused by pressure elevation in the internal pressure buffer space 71 when the fuse element 2 fuses. Specifically, it is preferable that the length of the end member 72 in the X-direction is, for example, one to three times the thickness of the cover 4.

As illustrated in FIG. 11(*a*) and FIG. 11(*b*), the guide hole 66 and the two bottom surface vents 69 passing through the first case 6*a* and communicating between the housing portion 60 and the internal pressure buffer space 71 are opened in the first buffer concave portion 73. Furthermore, as illustrated in FIG. 1, two side surface vents 77 passing through the case 6 and communicating between the housing portion 60 and the internal pressure buffer space 71, formed by integration of the side surface concave portion 77*a* provided in the first case 6*a* and the side surface concave portion 77*a* provided in the second case 6*b*, are open in two second buffer concave portions 75 formed by integrating the first case 6*a* and the second case 6*b*.

Gas in the housing portion 60 generated when the fuse element 2 fuses flows into the internal pressure buffer space 71 from inside the housing portion 60 via the side surface vent 77, the guide hole 66, and the bottom surface vent 69. As a result, pressure elevation in the housing portion 60 when the fuse element 2 fuses is suppressed and arc discharge is suppressed. A volume of the internal pressure buffer space 71 is preferably equal to or more than a volume of the fuse element 2, more preferably equal to or more than 100 times the volume of the fuse element 2, and even more preferably equal to or more than 1,000 times the volume of the fuse element 2 since this may effectively suppress pressure elevation in the housing portion 60.

It is preferable that an upper limit of the volume of the internal pressure buffer space 71 is 2,000 times the volume of the fuse element 2.

The first case 6*a* and the second case 6*b* are composed of an insulating material. The same material that may be used for the first shielding member 3*a* and the second shielding member 3*b* may be used as the insulating material. The first case 6*a* and the second case 6*b* and the first shielding member 3*a* and the second shielding member 3*b* may be composed of the same material or may be composed of different materials.

The first case 6*a* and the second case 6*b* may be manufactured by a known method.

(Cover)

The cover 4, as illustrated in FIG. 1, fixes the first case 6*a* and the second case 6*b* while also covering a side surface along the case 6 in the X-direction. The cover 4, as illustrated in FIG. 1 and FIG. 3, exposes one portion of the first terminal 61 from a first end 41 and exposes one portion of the second terminal 62 from a second end 42.

The cover 4, as illustrated in FIG. 2, has a cylindrical shape of a substantially uniform thickness, and as illustrated in FIG. 3, has an inner diameter corresponding to a substantially cylindrical shape in which the end member 72 of the first case 6*a* and the end member 72 of the second case 6*b* are integrated. As illustrated in FIG. 2 and FIG. 3, an edge portion on an inner side in an open portion of the cover 4 is a chamfered inclined surface 4*a*.

In the present embodiment, an outer surface of the case 6 and an inner surface of the cover 4 seals a spatial region composed of the housing portion 60 and the internal pressure buffer space 71.

In the present embodiment, the cover 4 has a cylindrical shape. Therefore, pressure on the cover 4 when the fuse element 2 fuses is distributed and applied substantially evenly over an entire inner surface of the cover 4 via the internal pressure buffer space 71 provided in an annular shape along an inner surface of the cover 4 at a center portion of the cover 4 in the X-direction, and the end member 72 housed along an inner surface of the cover 4 at an edge portion of the cover 4 in the X-direction. As a result, the cover 4 exhibits excellent strength and effectively prevents breakage of the protection element 100 when the fuse element 2 fuses. Furthermore, the cover 4 has a cylindrical shape and therefore, may be easily manufactured and has excellent productivity.

The cover 4 is composed of an insulating material. The same material that may be used for the first shielding member 3*a* and the second shielding member 3*b* and the first case 6*a* and the second case 6*b* may be used as the insulating material. The cover 4, the first case 6*a* and the second case 6*b*, and the first shielding member 3*a* and the second shielding member 3*b* may all be composed of different materials, or one part or all portions may be composed of the same material.

The cover 4 may be manufactured by a known method.

(Method of Manufacturing the Protection Element)

Next, a method of manufacturing the protection element 100 of the present embodiment will be described.

First, the fuse element 2, the first terminal 61, and the second terminal 62 are prepared to manufacture the protection element 100 of the present embodiment. Also, as illustrated in FIG. 7, the first terminal 61 is connected on the first end portion 21 of the fuse element 2 by soldering. Furthermore, the second terminal 62 is connected on the second end portion 22 by soldering.

A known material may be used as a binder material used for soldering in the present embodiment, and it is preferable to use a material containing Sn as a main component from the perspective of resistivity and melting point, and being free from lead for the environment.

The first end portion 21 and the second end portion 22 of the fuse element and the first terminal 61 and the second terminal 62 may be connected by a joint made by welding, and a known joining method may be used.

Next, the first shielding member 3*a* and the second shielding member 3*b* illustrated in FIG. 8A to FIG. 8B and FIG. 9 and the first case 6*a* and the second case 6*b* illustrated in FIG. 10A to FIG. 10C and FIG. 11 are prepared.

Figure 12A:
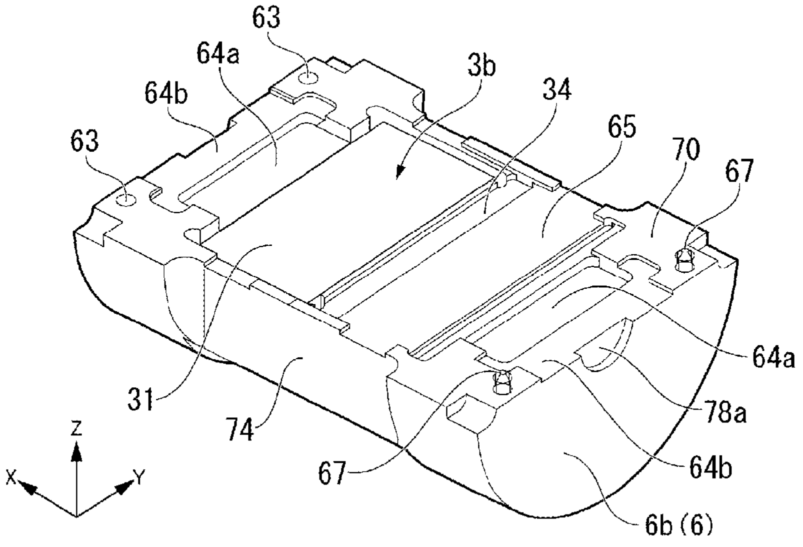
FIG. 12A is a drawing for describing a manufacturing process of the protection element 100 of the first embodiment, and is a perspective view of the second case 6*b* wherein a second shielding member 3*b* is installed looking from a side constituting a housing portion 60.

Then, the first shielding member 3*a* is installed inside the concave portion 68 of the first case 6*a*. During this, as illustrated in FIG. 4, the second surface 32 on the plate-shaped part 30 of the first shielding member 3*a* is disposed in contact with the step (rotation axis 33) formed inside the concave portion 68 of the first case 6*a*. Furthermore, the second shielding member 3*b* is installed inside the concave portion 68 of the second case 6*b*. During this, as illustrated in FIG. 4, the second surface 32 on the plate-shaped part 30 of the second shielding member 3*b* is disposed in contact with the step (rotation axis 33) formed inside the concave portion 68 of the second case 6*b*. FIG. 12A is a perspective view of the second case 6*b* wherein the second shielding member 3*b* is installed, looking from a side constituting the housing portion 60.

Figure 12B:
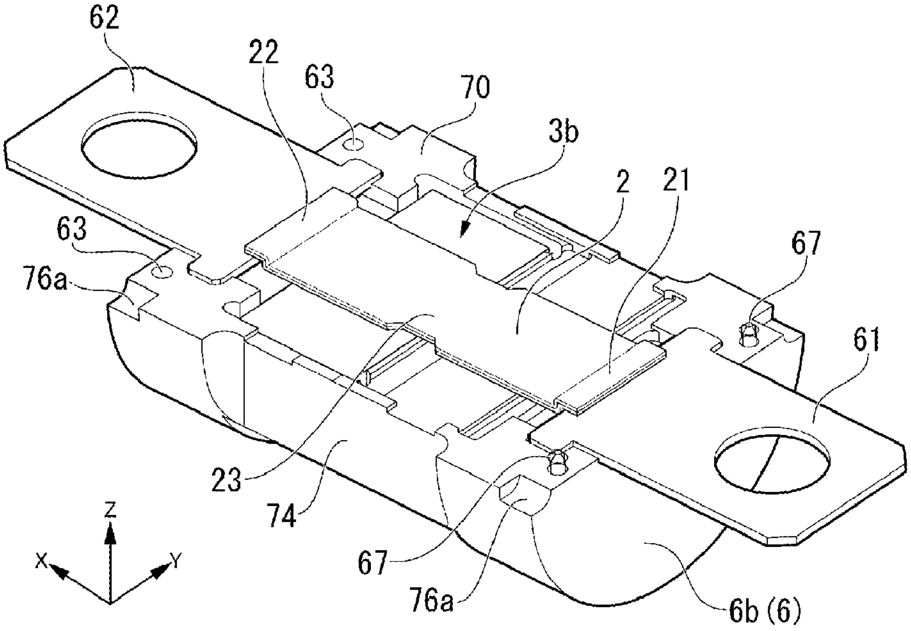
FIG. 12B is a drawing for describing the manufacturing process of the protection element 100 of the first embodiment, and is a perspective view illustrating a state wherein a fuse element 2 integrated with a first terminal 61 and a second terminal 62 on the second case 6*b* wherein the second shielding member 3*b* is installed.

Next, as illustrated in FIG. 12B, a member wherein the fuse element 2 is integrated with the first terminal 61 and the second terminal 62 is installed on the second case 6*b* wherein the second shielding member 3*b* is installed. In the present embodiment, mounting the first terminal 61 and the second terminal 62 to the two terminal-mounting surfaces 64*b*, respectively, allows the fuse element 2, the first terminal 61, and the second terminal 62 to be aligned with respect to the second case 6*b*.

In the present embodiment, as illustrated in FIG. 12B, a case where a surface of the first terminal 61 and the second terminal 62 side at a connecting portion between the first terminal 61 and the second terminal 62 and the first end portion 21 and the second end portion 22 of the fuse element, respectively, is installed to face the second case 6*b* is described; however, a surface of the fuse element 2 side may be installed to face the second case 6*b*.

Figure 13A:
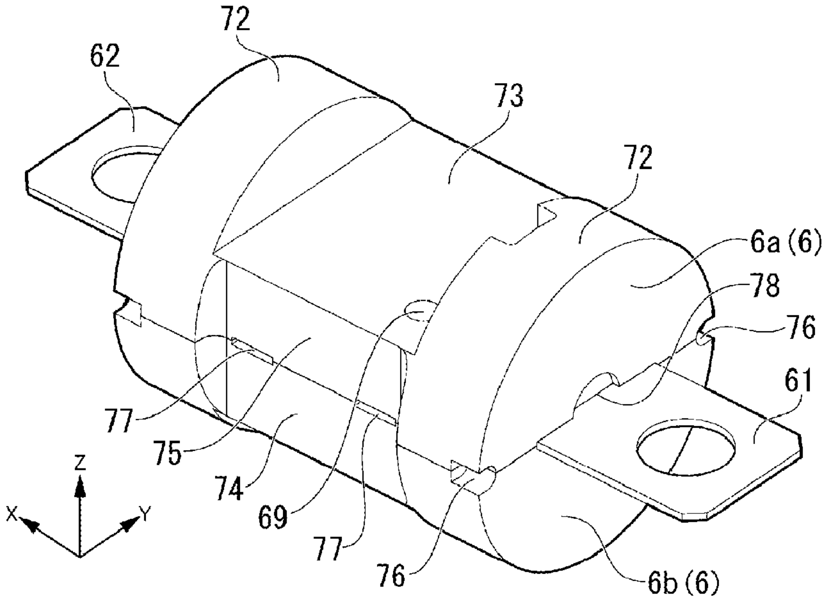
FIG. 13A is a drawing for describing the manufacturing process of the protection element 100 of the first embodiment, and is a perspective view illustrating a state wherein the first case 6*a* is installed on the second case 6*b* via the fuse element 2.

Next, the first case 6*a*, wherein the first shielding member 3*a* is installed, is installed on the second case 6*b*, wherein the second shielding member 3*b* and the member in which the fuse element 2, the first terminal 61 and the second terminal 62 are integrated. During this, the fitting concave portion 63 included in the first case 6*a* and the fitting convex portion 67 included in the second case 6*b* are fitted together, and the fitting convex portion 67 included in the first case 6*a* and the fitting concave portion 63 included in the second case 6*b* are fitted together. As a result, the first case 6*a* and the second case 6*b* are aligned. FIG. 13A is a perspective view illustrating a state wherein the first case 6*a* is installed on the second case 6*b* via the fuse element 2.

As illustrated in FIG. 13A, the first case 6*a* is installed on the second case 6*b*, forming the second buffer concave portion 75, the side surface vent 77, the first adhesive inlet 78, and the second adhesive inlet 76. Furthermore, as illustrated in FIG. 3, one of the insertion holes 64 houses the first end portion 21 of the fuse element 2, the other insertion hole 64 houses the second end portion 22 of the fuse element 2, and a state is formed where one portion of the first terminal 61 and one portion of the second terminal 62 connected to the fuse element 2 are exposed to the outside of the case 6.

Figure 13B:
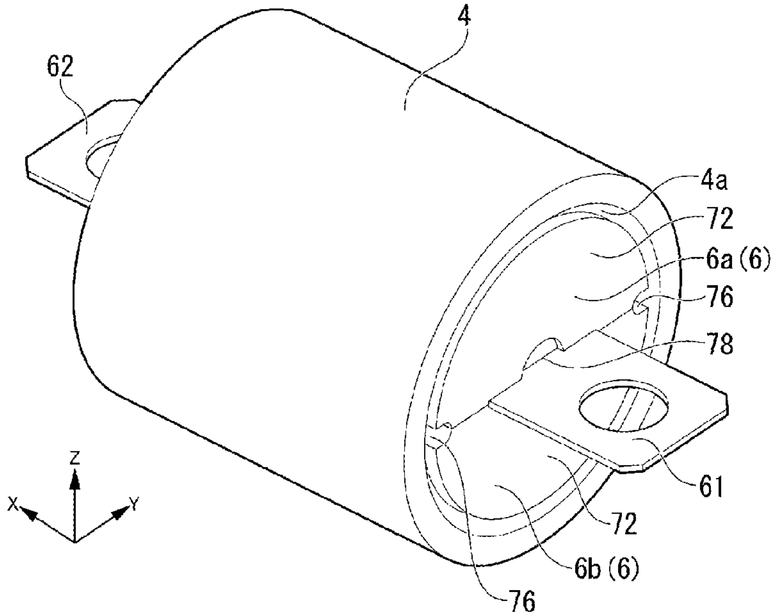
FIG. 13B is a drawing for describing the manufacturing process of the protection element 100 of the first embodiment, and is a perspective view illustrating a state wherein the first case 6*a* and the second case 6*b* are integrated and housed in a cover 4.

Next, as illustrated in FIG. 13B, the first case 6*a* and the second case 6*b* are housed in the cover 4 while in an integrated state. As a result, the cover 4 covers the end member 72 forming a side surface along the case 6 in the X-direction, the first buffer concave portion 73, and the second buffer concave portion 75, and also fixes the first case 6*a* and the second case 6*b*.

Thereafter, an adhesive is injected into the inclined surface 4*a* of the cover 4, the first adhesive inlet 78, and the second adhesive inlet 76, respectively. An adhesive containing thermosetting resin, for example, may be used as the adhesive. As a result, the inside of the cover 4 is sealed, and as illustrated in FIG. 1 and FIG. 3, an outer surface of the case 6 and an inner surface of the cover 4 seal a spatial region composed of the housing portion 60 and the internal pressure buffer space 71.

The protection element 100 of the present embodiment is obtained by the foregoing process.

(Operation of the Protection Element)

Next, the operation of the protection element 100 will be described in a case where a current exceeding a rated current flows through the fuse element 2 of the protective element 100 of the present embodiment.

When a current exceeding a rated current flows through the fuse element 2 of the protection element 100 of the present embodiment, the temperature of the fuse element 2 rises due to heat generated by the overcurrent. Also, when the cut portion 23 of the fuse element 2 melts due to a temperature rise, it is fused or cut. During this time, a spark is generated between the cut surfaces or fused surfaces of the cut portion 23, and an arc discharge is generated.

In the protection element 100 of the present embodiment, among the areas of the plate-shaped part 30 looking from the fuse element 2 of the first shielding member 3*a* and the second shielding member 3*b*, the first area 30*a* disposed on the first end edge 31*a* side close to the rotation axis 33 is narrower than the second area 30*b* disposed on the second end edge 31*b* side far from the rotation axis 33. Therefore, when pressure elevation in the housing portion 60 due to an arc discharge generated when the fuse element 2 fuses causes the first surface 31 on the plate-shaped part 30 included in the first shielding member 3*a* and the second shielding member 3*b* to be pressed, as illustrated in FIG. 5 and FIG. 6, the first shielding member 3*a* rotates around the rotation axis 33 and the second shielding member 3*b* rotates around the rotation axis 33.

In the present embodiment, the first shielding member 3*a* and the second shielding member 3*b*, as illustrated in FIG. 6, rotate in a direction in which the second end edge 31*b* side disposed on an outer side of the housing portion 60 in the X-direction is separated from the fuse element 2, and a direction in which the first end edge 31*a* side disposed on an inner side of the housing portion 60 in the X-direction moves closer to the fuse element 2. Also, the first end edge 31*a* is pressed onto the bottom surface of the shielding member housing groove 34 provided on an inner surface of the housing portion 60. Furthermore, the second end edge 31*b* is housed in the concave portion 68.

As described above, the protection element 100 of the present embodiment is provided with the fuse element 2 energized in the X-direction; the first shielding member 3*a* and the second shielding member 3*b* composed of an insulating material, and having the plate-shaped part 30 wherein the first surface 31 is disposed facing the fuse element 2 and the second surface 32 is disposed in contact with the rotation axis 33 extending in the Y-direction, wherein the area of the plate-shaped part 30 viewed from the fuse element 2 is different between the first area 30*a* and the second area 30*b* divided at the contact position 33*a* between the plate-shaped part 30 and the rotation axis 33; and the case 6 composed of an insulating material, and provided internally with the housing portion 60 wherein the fuse element 2 and the first shielding member 3*a* and the second shielding member 3*b* are stored.

Also, in the protection element 100 of the present embodiment, pressure elevation in the housing portion 60 due to an arc discharge generated when the fuse element 2 fuses causes the first surface 31 of the first shielding member 3*a* and the second shielding member 3*b* to be pressed. Thus, as illustrated in FIG. 5 and FIG. 6, the first shielding member 3*a* and the second shielding member 3*b* each rotate around the rotation axis 33. As a result, the first shielding member 3*a* and the second shielding member 3*b* block and divide the inside of the housing portion 60 at two locations in the X-direction.

During this, in the present embodiment, a space interposed between the first shielding member 3*a* and the second shielding member 3*b* is formed. This space is surrounded by a bottom surface of the shielding member housing groove 34, the concave portion 68, the first end edge 31*a* of the first surface 31 of the plate-shaped part 30 provided with both the first shielding member 3*a* and the second shielding member 3*b*, a portion in contact with the rotation axis 33 of the second surface 32, and a side surface of the plate-shaped part 30.

Accordingly, in the present embodiment, the first shielding member 3*a* and the second shielding member 3*b* divide the inside of the housing portion 60, causing the fused surfaces or the cut surfaces of the cut or fused fuse element 2 to be insulated, the two insertion holes 64 open in the housing portion 60 to be separated from each other, and the current path to be interrupted. As a result, the arc discharge generated when the fuse element 2 fuses is quickly suppressed (extinguished).

That is, in the protection element 100 of the present embodiment, an arc discharge generated when the fuse element 2 fuses is reduced. Accordingly, in the protection element 100 of the present embodiment, the housing portion 60 may be prevented from breaking due to pressure elevation in the housing portion 60, resulting in excellent safety.

The protection element 100 of the present embodiment may be preferably installed in a current path of, for example, a high voltage equal to or greater than 100 V and a large current equal to or greater than 100 A, and may also be installed on a current path of a high voltage equal to or greater than 400 V and a large current equal to or greater than 120 A.

Furthermore, the protection element 100 of the present embodiment has the case 6 composed of an insulating material, that exposes one portion of the first terminal 61 and one portion of the second terminal 62 electrically connected to the fuse element 2 energized in the X-direction, and for storing the fuse element 2; and the cover 4 composed of an insulating material having a cylindrical shape, for covering a side surface along the case 6 in the X-direction, that exposes one portion of the first terminal 61 from the first end 41, and that exposes one portion of the second terminal 62 from the second end 42. Accordingly, in the protection element 100 of the present embodiment, stress caused by pressure elevation in the case 6 when the fuse element 2 fuses is applied to the case 6 and the cover 4 covering a side surface along the case 6 in the X-direction. Therefore, excellent strength against pressure elevation in the case 6 is obtained in comparison to when there is no cover 4, for example. Thus, the protection element 100 of the present embodiment is unlikely to break when the fuse element 2 fuses and therefore has excellent safety.

In the protection element 100 of the present embodiment, it is more preferable that the fuse element 2 is composed of a laminated body wherein an inner layer composed of Sn or a metal containing Sn as a main component and an outer layer composed of Ag or Cu or a metal containing Ag or Cu as a main component are laminated in a thickness direction, and that the shielding member 3, the case 6, and the cover 4 are formed of a resin material. In this kind of protection element, an arc discharge generated when the fuse element 2 fuses is further reduced and further miniaturization is also possible due to the following reasons.

That is, when the fuse element 2 is composed of the foregoing laminated body, a fusing temperature of the fuse element 2 is as low as 300 to 400° C., for example. Accordingly, even if the shielding member 3, the case 6, and the cover 4 are composed of a resin material, sufficient heat resistance is obtained. Furthermore, since the fusing temperature of the fuse element 2 is low, even if the shielding member 3 and/or an inner surface of the housing portion 60 and the cut portion 23 of the fuse element 2 are disposed in contact with each other, the fuse element 2 reaches the fusing temperature in a short time. Accordingly, a distance in the Z-direction between the shielding member 3 and/or an inner surface of the housing portion 60 and the fuse element 2 may be made sufficiently short without hindering the function of the fuse element 2.

Moreover, in this kind of protection element, the resin material forming the shielding member 3, the case 6, and the cover 4 is decomposed by the heat accompanying the fusing of the fuse element 2 to generate pyrolysis gas, and the vaporization heat thereof cools the inside of the housing portion 60 (ablation effect of resin). As a result, arc discharge is further reduced. Therefore, in a protection element wherein the fuse element 2 is composed of the foregoing laminated body and the shielding member 3, the case 6, and the cover 4 are formed of a resin material, the distance in the Z-direction between the shielding member 3 and/or an inner surface of the housing portion 60 and the fuse element 2 is shortened, and arc discharge may be further reduced while further miniaturization is possible.

Examples of resin materials that easily obtain an ablation effect due to the heat associated with fusing of the fuse element 2 include Nylon 46, Nylon 66, polyacetal (POM), polyethylene terephthalate (PET), and the like. It is preferable to use Nylon 46 or Nylon 66 as the resin material forming the shielding member 3, the case 6, and the cover 4 from the perspective of heat resistance and flame resistance.

The ablation effect of resin is more effectively obtained when the distance in the Y-direction of the concave portion 68 forming an inner surface of the housing portion 60, the shielding member housing groove 34, and the fuse element-mounting surface 65 and the distance in the Y-direction of the first surface 31 of the shielding member 3 is equal to or greater than 1.5 times the length of the fuse element 2 in the Y-direction (widths 21D and 22D). This is presumed to be because the surface area of the shielding member 3 and/or the surface area in the housing portion 60 is sufficiently wide, and decomposition of the resin material due to the heat accompanying the fuse element 2 fusing is accelerated, even when the shielding member 3 and/or an inner surface of the housing portion 60 and the cut portion 23 of the fuse element 2 are disposed in contact with each other.

On the other hand, for example, a protection element having a fuse element composed of Cu and a case composed of a ceramic material may be difficult to miniaturize due to the following reasons.

That is, when the fuse element is composed of Cu, the fusing temperature of the fuse element is a high temperature equal to or greater than 1,000° C. Therefore, when a resin material is used as the material of the case, there is a possibility that the heat resistance of the case will be insufficient. Accordingly, a ceramic material having excellent heat resistance is used as a material of the case.

In this protection element, the fusing temperature of the fuse element is high and a ceramic material is used as a material of the case; therefore, when the distance between the cut portion of the fuse element and an inner surface of the case is reduced, the heat generated at the cut portion is dissipated via the case, making it difficult for the fuse element to reach the fusing temperature. Therefore, it is necessary to secure a sufficient distance between the cut portion and an inner surface of the case. Thus, in a protection element wherein the fuse element is composed of Cu and the case is composed of a ceramic material, a wide housing portion must be provided in the case.

Moreover, when a sufficient distance is secured between the cut portion and an inner surface of the case, the number of lines of electric force generated by an arc discharge is increased; therefore, an arc discharge generated when the fuse element fuses is large. Therefore, it may be necessary to put an arc-extinguishing agent into the housing portion in the case to quickly suppress (extinguish) arc discharge. When the arc-extinguishing agent is put into the case, it is necessary to secure a space for housing the arc-extinguishing agent in the case. Therefore, it may be necessary to provide a wider housing portion in the case, which may make miniaturization even more difficult.

Second Embodiment (Protection Element)

Figure 14:
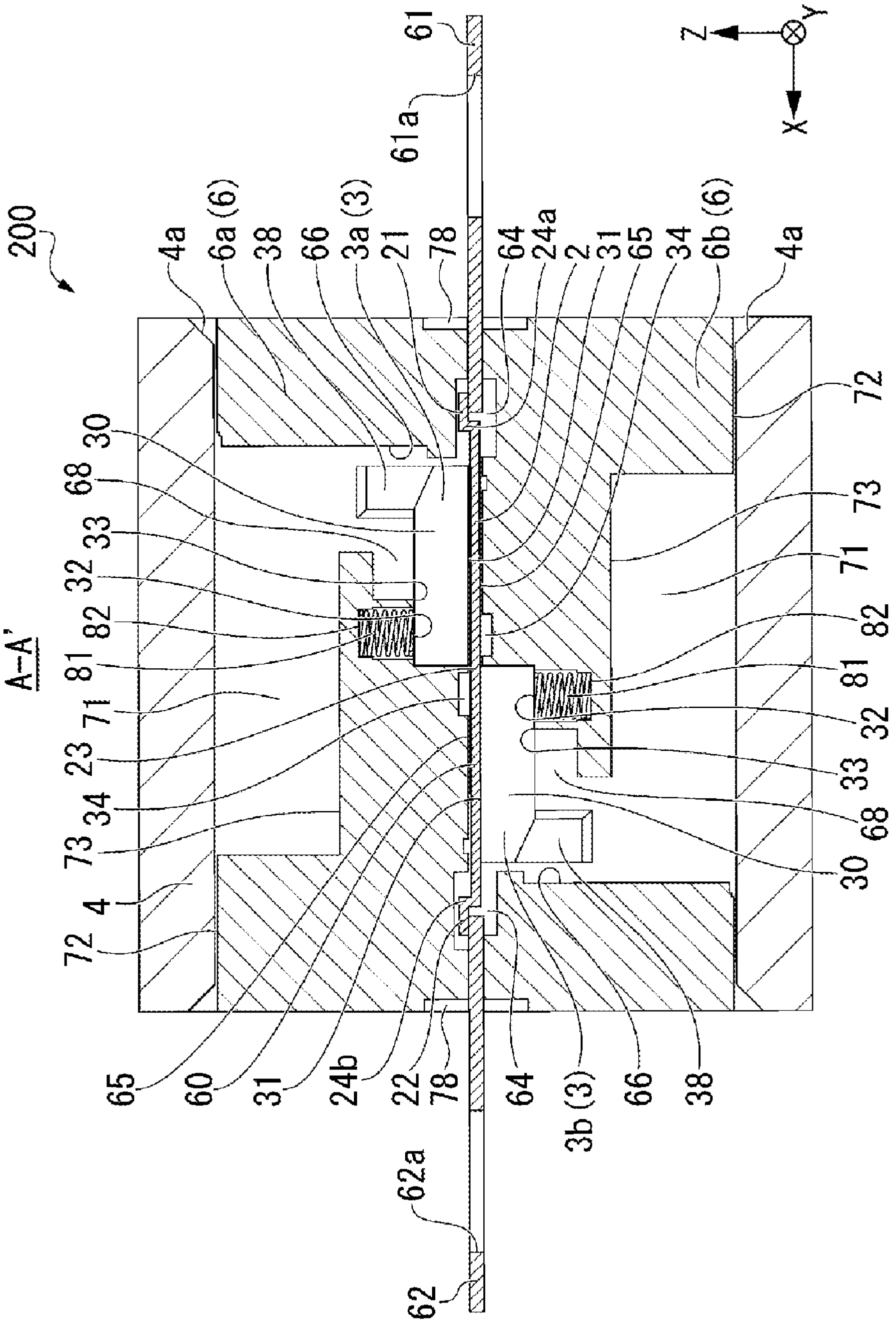
FIG. 14 is a cross-section view for describing a protection element 200 of a second embodiment, and is a cross-section view corresponding to a position at which the protective element 100 of the first embodiment is cut along line A-A' illustrated in FIG. 1.
Figure 15:
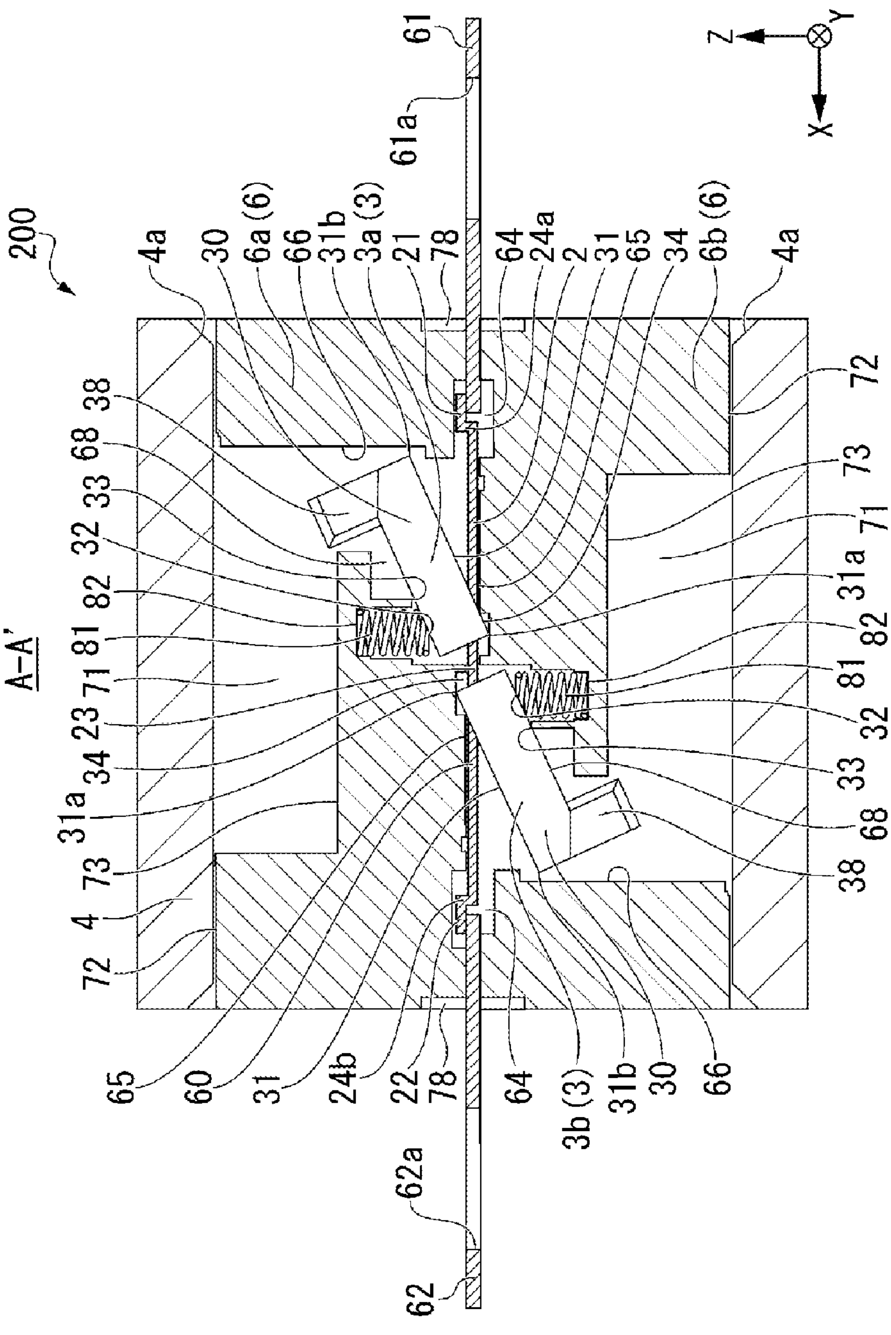
FIG. 15 is a drawing for describing the operation of the protection element 200 of the second embodiment, and is a cross-section view of a position corresponding to the cross-section view illustrated in FIG. 14.
Figure 16A:
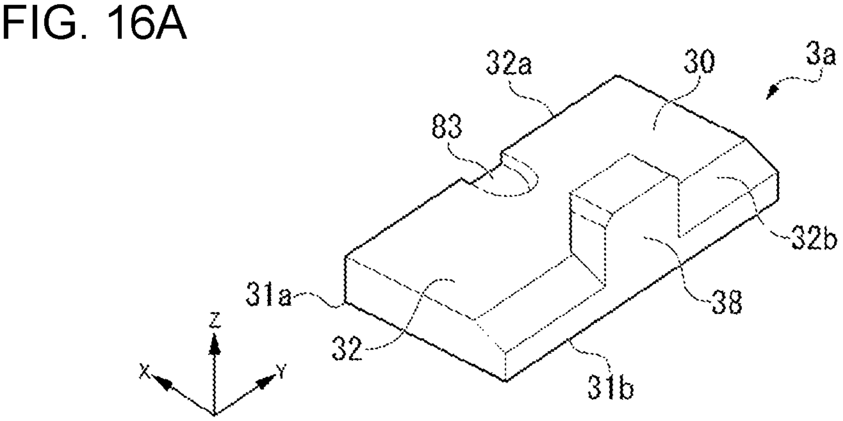
FIG. 16A is a drawing for describing a structure of a first shielding member 3*a* provided in the protection element 200 of the second embodiment, and is a perspective view looking from a housing portion side.
Figure 16B:
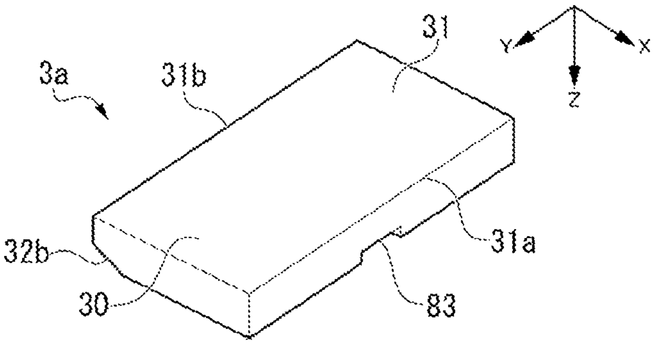
FIG. 16B is a drawing for describing the structure of the first shielding member 3*a* provided in the protection element 200 of the second embodiment, and is a perspective view looking from a fuse element side.
Figure 17:
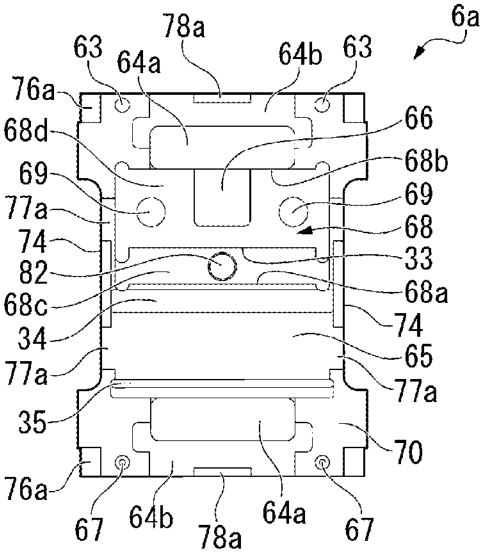
FIG. 17 is a plan view of an inside of the housing portion of a first case 6*a* provided in the protection element 200 of the second embodiment looking from a side of a second case 6*b*.

FIG. 14 is a cross-section view for describing a protection element 200 of a second embodiment, and is a cross-section view corresponding to a position at which the protective element 100 of the first embodiment is cut along line A-A' illustrated in FIG. 1. FIG. 15 is a drawing for describing the operation of the protection element 200 of the second embodiment, and is a cross-section view of a position corresponding to the cross-section view illustrated in FIG. 14. FIG. 16A and FIG. 16B are drawings for describing a structure of a first shielding member 3*a* provided in the protection element 200 of the second embodiment. FIG. 16A is a perspective view looking from a housing portion side, and the FIG. 16B is a perspective view looking from the fuse element side. FIG. 17 is a plan view of an inside of the housing portion of a first case 6*a* provided in the protection element 200 of the second embodiment looking from a second case 6*b* side.

The first shielding member 3*a* is interposed between the fuse element 2 and the first case 6*a* containing the housing portion 60. "Fuse element side" refers to a side of the first shielding member 3*a* whereon the fuse element 2 is disposed. "Housing portion side" refers to a side of the first shielding member 3*a* whereon the first case 6*a* containing the housing portion 60 is disposed.

In the protection element 200 according to the second embodiment, the same members as those of the protective element 100 according to the first embodiment described above are denoted by the same reference signs, and descriptions thereof are omitted.

The protection element 200 according to the second embodiment illustrated in FIG. 14 differs from the protection element 100 according to the first embodiment in that it is included in two springs 81, a spring guide hole 82 respectively provided to the first case 6*a* and the second case 6*b*, and a spring-receiving groove 83 respectively provided to the first shielding member 3*a* and a second shielding member 3*b* (see FIG. 16A and FIG. 16B).

In FIG. 14, the spring 81 disposed in contact with the first shielding member 3*a* is pressing means for applying force in a rotation direction of the first shielding member 3*a* against a second surface 32 of a plate-shaped part 30 included in the first shielding member 3*a*. Furthermore, the spring 81 disposed in contact with the second shielding member 3*b* is pressing means for applying force in a rotation direction of the second shielding member 3*b* against the second surface 32 of the plate-shaped part 30 included in the second shielding member 3*b*.

In the present embodiment, a case where the spring 81 is used as pressing means is described as an example; however, it is sufficient to apply force in a rotation direction of the shielding member against the second surface 32 of the plate-shaped part 30 as the pressing means-any known means capable of imparting elastic force may be used, and the pressing means is not limited to a spring.

As illustrated in FIG. 14, the spring 81 that applies force in the rotation direction of the first shielding member 3*a* is housed in a compressed state in the spring guide hole 82 provided in the first case 6*a*. The spring 81 that applies force in the rotation direction of the second shielding member 3*b* is housed in a compressed state in the spring guide hole 82 provided in the second case 6*b*.

The spring guide hole 82 is substantially circular in a plan view, and is respectively provided at a center portion in a Y-direction on a first bottom surface 68*c* of a concave portion 68 included in the first case 6*a* and the second case 6*b* (see FIG. 17). The spring guide hole 82 has a depth corresponding to a length of the spring 81 in a compressed state. The spring guide hole 82 expands and contracts the spring 81 along an inner wall surface of the spring guide hole 82 to expand and contract the spring 81 in a Z-direction with high precision.

The second surface 32 of the plate-shaped part 30 included in the first shielding member 3*a* and the second shielding member 3*b* is provided with the spring-receiving groove 83 wherein the end portions of each spring 81 in the expansion and contraction direction come into contact (see FIG. 16A and FIG. 16B). The spring-receiving groove 83 is a concave portion having a planar shape coupling a semicircle and a rectangle wherein one side has a diameter of the semicircle, and is provided at a center portion in the Y-direction at an end edge 32*a* of the second surface 32 in an X-direction.

A bottom surface of the spring-receiving groove 83 may be a flat surface, may be an inclined surface whose depth gradually increases toward a center portion of the first shielding member 3*a* or the second shielding member 3*b* in the X-direction, or may have a flat surface and the foregoing inclined surface formed continuously with the flat surface. When the bottom surface of the spring-receiving groove 83 has the foregoing inclined surface, the bottom surface of the spring-receiving groove 83 on the first shielding member 3*a* or the second shielding member 3*b* undergoing rotational movement moves closer to a plane perpendicular to the Z-direction in comparison to when it has a flat surface. Therefore, pressing force in the Z-direction due to a restoring force of the spring 81 may be applied more reliably and sufficiently to the second surface 32 of the plate-shaped part 30 on the first shielding member 3*a* or the second shielding member 3*b* undergoing rotational movement, which is preferable.

(Operation of the Protection Element)

Next, the operation of the protection element 200 will be described in a case where a current exceeding a rated current flows through the fuse element 2 in the protective element 200 according to the second embodiment.

When a current exceeding a rated current flows through the fuse element 2 of the protective element 200 of the present embodiment, the fuse element 2 fuses and an arc discharge is generated in the same manner as the protection element 100 according to the first embodiment.

In the protection element 200 of the present embodiment, pressure elevation in the housing portion 60 due to an arc discharge generated when the fuse element 2 fuses causes a first surface 31 on the plate-shaped part 30 included in the first shielding member 3*a* and the second shielding member 3*b* to be pressed in the same manner as the protection element 100 according to the first embodiment. In addition thereto, in the protection element 200 of the present embodiment, as illustrated in FIG. 15, a restoring force of the compressed spring 81 presses the second surface 32 of the plate-shaped part 30, and force is applied in the rotation direction of the first shielding member 3*a* and the second shielding member 3*b*. Thus, in the protection element 200 of the present embodiment, the first shielding member 3*a* and the second shielding member 3*b* rotate around a rotation axis 33 at a rotational force stronger than the protection element 100 according to the first embodiment. Also, a first end edge 31*a* is pressed onto a bottom surface of a shielding member housing groove 34 provided on an inner surface of the housing portion 60 in the same manner as the protection element 100 according to the first embodiment. Furthermore, a second end edge 31*b* is housed in the concave portion 68.

In the protection element 200 of the present embodiment, pressure elevation in the housing portion 60 due to an arc discharge generated when the fuse element 2 fuses causes the first surface 31 of the first shielding member 3*a* and the second shielding member 3*b* to be pressed in the same manner as the protection element 100 according to the first embodiment. In addition thereto, in the protection element 200 of the present embodiment, the spring 81 presses the second surface 32 of the plate-shaped part 30, and force is applied in the rotation direction of the first shielding member 3*a* and the second shielding member 3*b*. Due to the synergistic effects thereof, as illustrated in FIG. 15, the first shielding member 3*a* and the second shielding member 3*b* each rotate around the rotation axis 33. As a result, the first shielding member 3*a* and the second shielding member 3*b* more reliably block and divide the inside of the housing portion 60 at two locations in the X-direction. Accordingly, in the protection element 200 of the present embodiment, an arc discharge generated when the fuse element 2 fuses is more quickly suppressed (extinguished).

In the protection element 200 of the present embodiment, a case where there are two springs 81 are provided is described as an example; however, only one spring 81 need be provided.

Furthermore, in the protection element 200 of the present embodiment, a case where one spring 81 each is provided for applying force in the rotation direction against the first shielding member 3*a* and the second shielding member 3*b*, one spring guide hole 82 is provided at a center portion in the Y-direction on the first bottom surface 68*c* of the concave portion 68, and one spring-receiving groove 83 is provided at a center portion of the second surface 32 in the Y-direction is described as an example; however, the number of springs 81 and the positions of the spring guide hole 82 and the spring-receiving groove 83 are not limited to the foregoing example. For example, two springs each may be provided for applying force in the rotation direction against the first shielding member 3*a* and/or the second shielding member 3*b*, and two spring guide holes and spring-receiving grooves may be disposed symmetrically with respect to the center in the Y-direction. In this case, force is applied from the two springs in the rotation direction to both the first shielding member 3*a* and the second shielding member 3*b*.

Third Embodiment (Protection Element)

Figure 18:
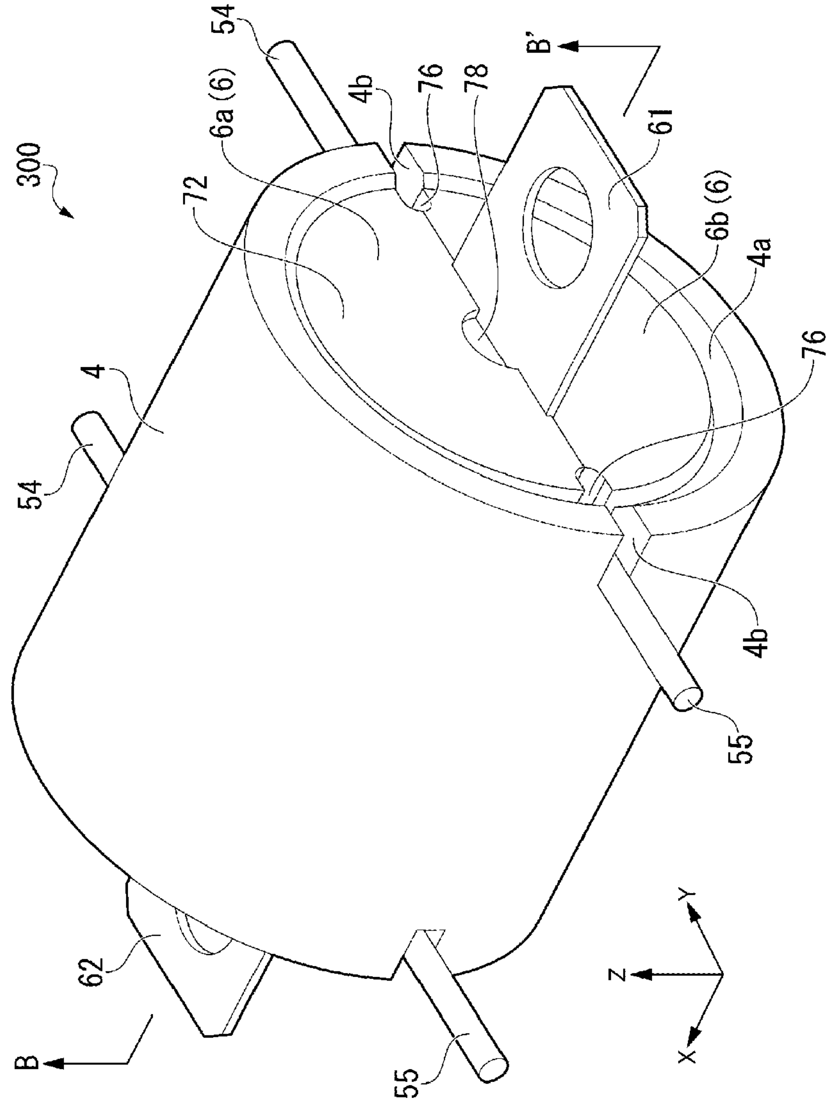
FIG. 18 is a perspective view illustrating an entire structure of a protection element 300 of a third embodiment.
Figure 19:
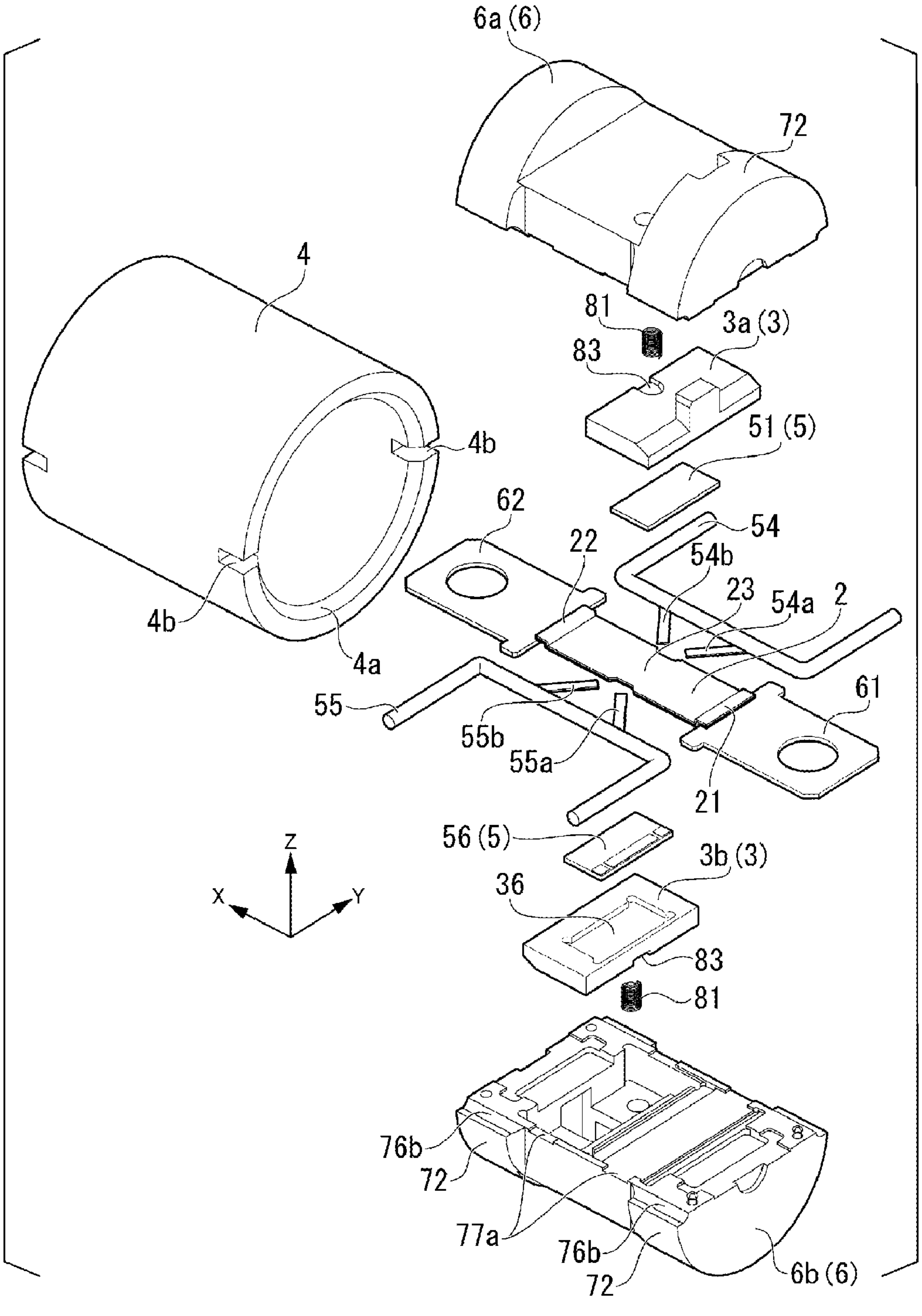
FIG. 19 is an exploded perspective view illustrating the entire structure of the protection element 300 illustrated in FIG. 18.
Figure 20:
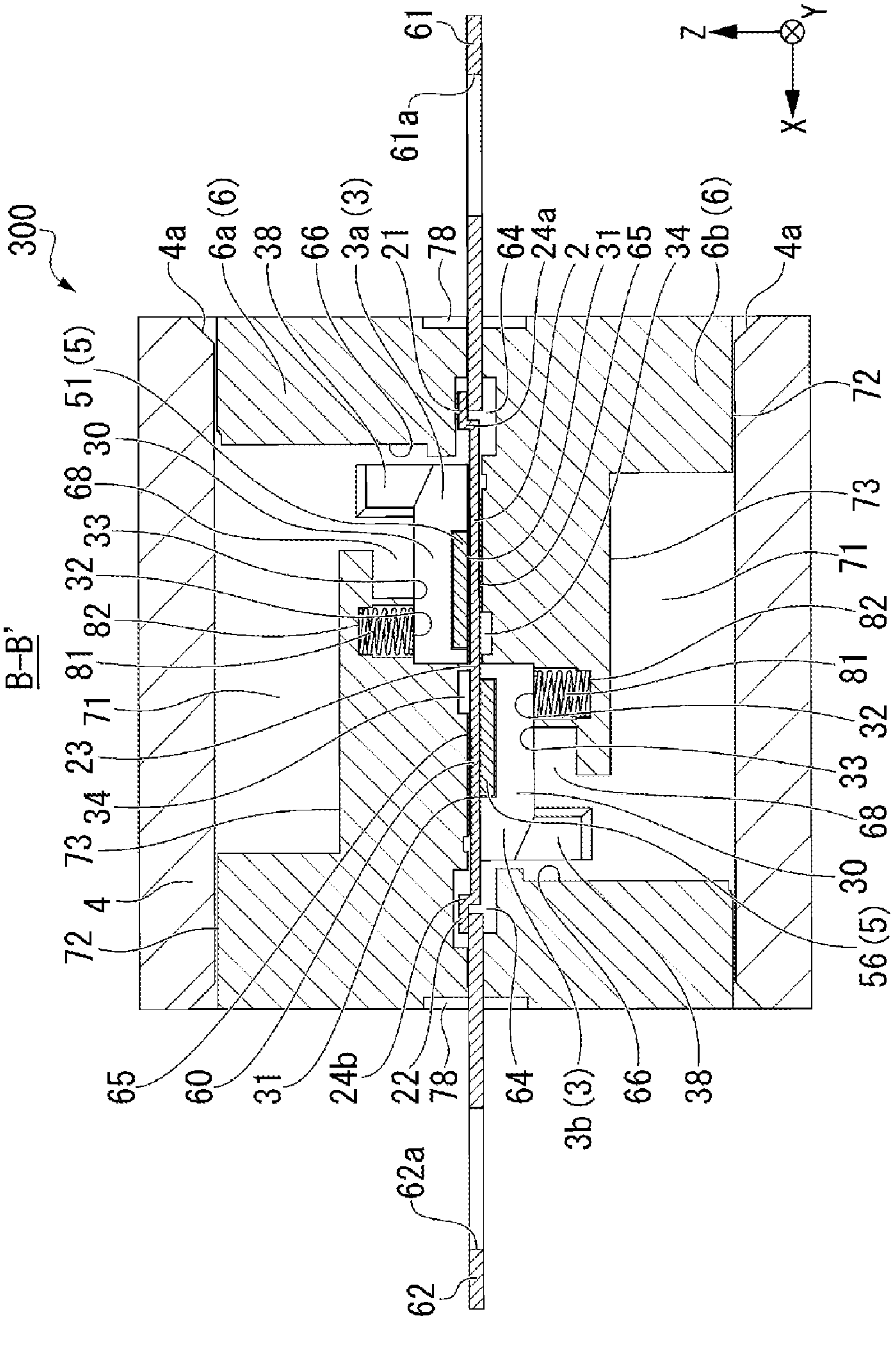
FIG. 20 is a cross-section view of the protection element 300 of the third embodiment, cut along line B-B' illustrated in FIG. 18.
Figure 21:
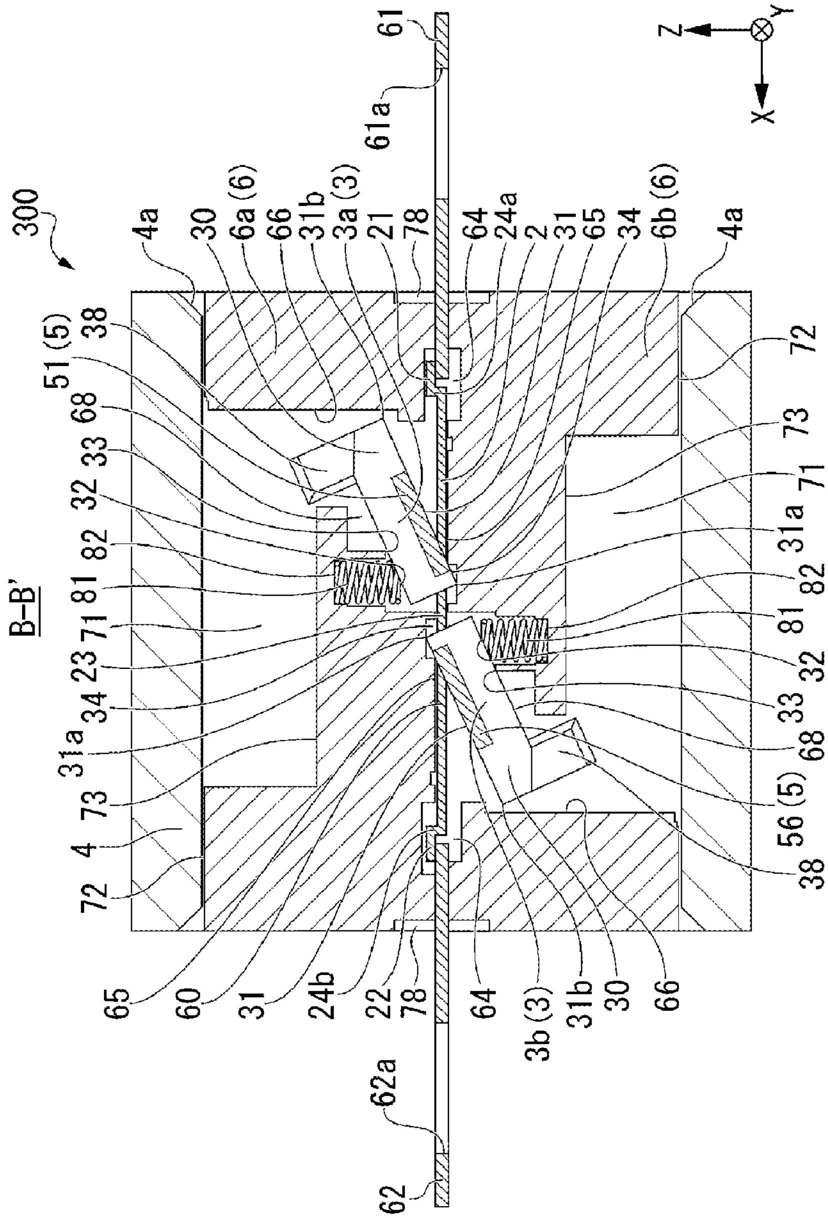
FIG. 21 is a drawing for describing the operation of the protection element 300 of the third embodiment, and is a cross-section view of a position corresponding to the cross-section view illustrated in FIG. 20.

FIG. 18 is a perspective view illustrating an entire structure of a protection element 300 of a third embodiment. FIG. 19 is an exploded perspective view illustrating the entire structure of the protection element 300 illustrated in FIG. 18. FIG. 20 is a cross-section view of the protection element 300 of the third embodiment, cut along line B-B' illustrated in FIG. 18. FIG. 21 is a drawing for describing the operation of the protection element 300 of the third embodiment, and is a cross-section view of a position corresponding to the cross-section view illustrated in FIG. 20.

In the protection element 300 according to the third embodiment, the same members as those of the protective element 200 according to the second embodiment described above are denoted by the same reference signs, and descriptions thereof are omitted.

The protection element 300 according to the third embodiment illustrated in FIG. 18 differs from the protection element 200 according to the second embodiment in that, as illustrated in FIG. 19, it is provided with two heat generation members 5, power supply wires 54*a*, 54*b*, 55*a*, and 55*b*, and power supply lead-out wires 54 and 55; a heat generation member housing concave portion 36 is respectively provided for a first shielding member 3*a* and a second shielding member 3*b*; a notch 76*b* wherein each power supply lead-out wire 54 and 55 is installed is provided on a first case 6*a* and a second case 6*b*; and a lead-out wire groove 4*b* is provided on a cover 4.

In the present embodiment, as illustrated in FIG. 20, a case where two heat generation members 5 of a first heat generation member 51 and a second heat generation member 56 are provided is described as an example; however, only one of the two heat generation members 5 need be provided.

As illustrated in FIG. 20, the first heat generation member 51 is installed on a first surface 31 of a plate-shaped part 30 of the first shielding member 3*a*. Furthermore, the second heat generation member 56 is installed on the first surface 31 of the plate-shaped part 30 of the second shielding member 3*b*. As illustrated in FIG. 20, the first heat generation member 51 and the second heat generation member 56 are each disposed facing each other at a position in proximity to a cut portion 23 of a fuse element 2. Also, the first heat generation member 51 and the second heat generation member 56 are disposed symmetrically in an X-direction with respect to the cut portion 23. Therefore, the first heat generation member 51 and the second heat generation member 56 efficiently heat the cut portion 23 of the fuse element 2.

Next, a structure of the first heat generation member 51 will be described using FIG. 22. A structure of the second heat generation member 56 is the same as that of the first heat generation member 51; therefore, a description will be omitted.

Figure 22:
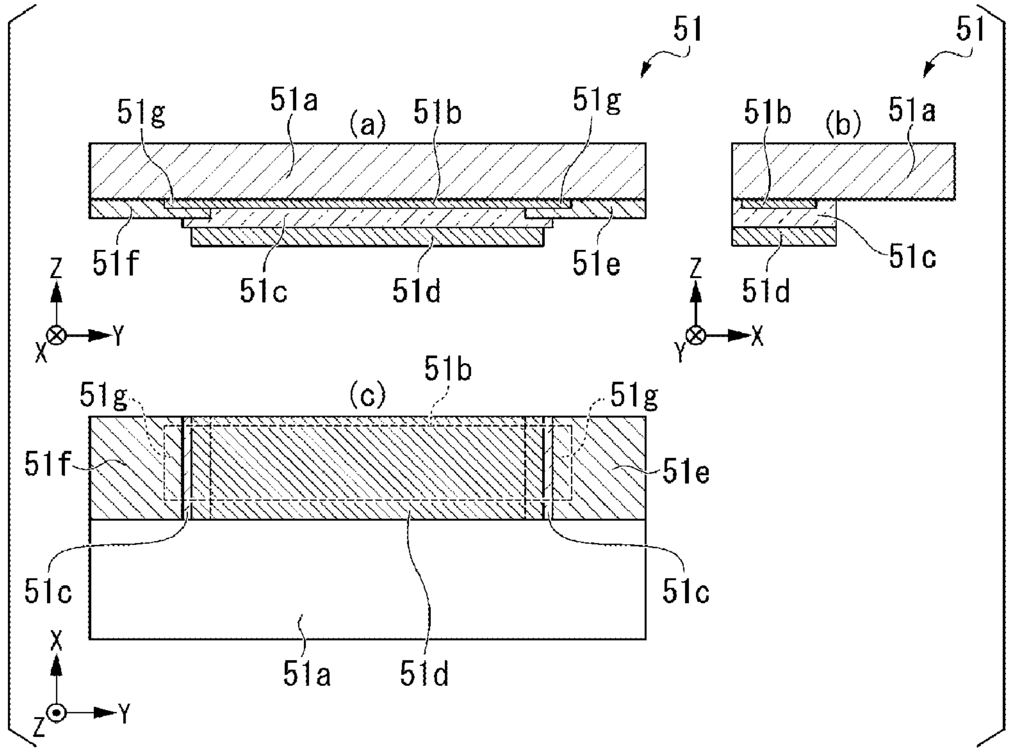
FIG. 22 is a drawing for describing a structure of a first heat generation member 51 provided in the protection element 300 of the third embodiment, FIG. 22(*a*) is a cross-section view looking from an X-direction, FIG. 22(*b*) is a cross-section view looking from a Y-direction, and FIG. 22(*c*) is a plan view.

FIG. 22 is a drawing for describing the structure of the first heat generation member 51 provided in the protection element 300 of the third embodiment, FIG. 22(*a*) is a cross-section view looking from the X-direction, FIG. 22(*b*) is a cross-section view looking from a Y-direction, and FIG. 22(*c*) is a plan view.

As illustrated in FIG. 22(*a*) to FIG. 22(*c*), the first heat generation member 51 is a plate-shaped member. A width of the first heat generation member 51 in the X-direction is equal to or less than a width of the first shielding member 3*a* in the X-direction. Furthermore, it is preferable that a width of the first heat generation member 51 in the Y-direction is wider than a width of the fuse element 2 in the Y-direction.

In the present embodiment, a case where the first heat generation member 51 is a plate-shaped member is described as an example; however, the heat generation member is not limited to a plate-shaped member, and it may be, for example, a wire having a meander pattern (meandering pattern).

The first heat generation member 51 has an insulated substrate 51*a*, a heat generation unit 51*b*, an insulating layer 51*c*, an element-connecting electrode 51*d*, and power supply wire electrodes 51*e* and 51*f*. The first heat generation member 51 has a function of heating the cut portion 23 of the fuse element 2 to cause it to soften. When an abnormality occurs in an external circuit serving as an energizing path for the protection element 300 and the energizing path needs to be interrupted, the first heat generation member 51 is energized by a current control element provided in the external circuit to generate heat. Furthermore, when the power supply wires 54*a*, 54*b*, 55*a*, and 55*b* fuse after the fuse element 2 is cut, a power supply to the first heat generation member 51 is interrupted, and heat generation of the first heat generation member 51 stops.

The insulated substrate 51*a*, as illustrated in FIG. 22(*a*) to FIG. 22(*c*), has a substantially rectangular shape in a plan view wherein the long sides extend in the Y-direction.

A substrate having a known insulating property may be used as the insulated substrate 51*a*, and examples thereof include those composed of alumina, glass ceramic, mullite, zirconia, and the like.

As illustrated in FIG. 22(*a*) to FIG. 22(*c*), the heat generation unit 51*b* is formed on a surface of the insulated substrate 51*a* facing the fuse element 2 (a lower surface in FIG. 22(*a*) to FIG. 22(*c*)). As illustrated in FIG. 22(*c*), the heat generation unit 51*b* is provided in a belt shape extending in the Y-direction along one long side edge portion of the insulated substrate 51*a* that has a substantially rectangular shape in a plan view. A width of the heat generation unit 51*b* in the X-direction and the Y-direction is determined as appropriate according to a width of the cut portion 23 in the X-direction and the Y-direction so that the cut portion 23 of the fuse element 2 may be efficiently heated. It is preferable that the heat generation unit 51*b* is a resistive element composed of a conductive material that generates heat when energized via the power supply wires 54*a* and 54*b*. A material containing a metal such as nichrome, W, Mo, Ru, or the like may be given as an example of a material of the heat generation unit 51*b*.

As illustrated in FIG. 22(*a*) to FIG. 22(*c*), the power supply wire electrodes 51*e* and 51*f* are provided at an end portion of the insulated substrate 51*a* in the Y-direction, and one portion each is provided at a position overlapping both end portions 51*g*, 51*g* facing each other across a center of the heat generation unit 51*b* in a plan view. The power supply wire electrodes 51*e* and 51*f* are respectively electrically connected to both end portions 51*g*, 51*g* of the heat generation unit 51*b*. The power supply wire electrodes 51*e* and 51*f* may be formed of a known electrode material.

The power supply wire electrode 51*e* is electrically connected to the power supply lead-out wire 55 via the power supply wire 55*a* (see FIG. 19). The power supply wire electrode 51*f* is electrically connected to the power supply lead-out wire 54 via the power supply wire 54*a* (see FIG. 19).

When an abnormality occurs in an external circuit serving as an energizing path for the protection element 300 and the energizing path needs to be interrupted, the power supply wire electrodes 51*e* and 51*f* are for energizing the heat generation unit 51*b* by means of a current control element provided in the external circuit.

As illustrated in FIG. 22(*a*) to FIG. 22(*c*), the insulating layer 51*c* is provided on the heat generation unit 51*b*. The insulating layer 51*c* is provided at a center portion of the insulated substrate 51*a* in the Y-direction so as to cover the heat generation unit 51*b* and a connection portion between the heat generation unit 51*b* and the power supply wire electrodes 51*e* and 51*f*. The insulating layer 51*c* is not provided at an end portion of the insulated substrate 51*a* in the Y-direction. As a result, one portion of the power supply wire electrodes 51*e* and 51*f* is not covered by the insulating layer 51*c* and is exposed.

The insulating layer 51*c* protects the heat generation unit 51*b*, efficiently transmits the heat generated by the heat generation unit 51*b* to the fuse element 2, and also seeks to insulate the heat generation unit 51*b* and the element-connecting electrode 51*d*. The insulating layer 51*c* may be formed of a known insulating material, such as glass.

As illustrated in FIG. 22(*a*) to FIG. 22(*c*), the element-connecting electrode 51*d* is provided at a position whereat at least one portion is overlapping the heat generation unit 51*b* via the insulating layer 51*c*. The element-connecting electrode 51*d* may be formed of a known electrode material. The element-connecting electrode 51*d* is electrically connected to the fuse element 2.

In the first heat generation member 51 illustrated in FIG. 22(*a*) to FIG. 22(*c*), the heat generation unit 51*b*, the insulating layer 51*c*, the element-connecting electrode 51*d*, and the power supply wire electrodes 51*e* and 51*f* are provided along one long side edge portion of the insulated substrate 51*a* that has a substantially rectangular shape in a plan view; however, these need not be provided along both long side edge portions of the insulated substrate 51*a*. In this case, for example, when electrically connecting the first heat generation member 51 and the power supply wires 54*a* and 55*a*, it is possible to prevent a reduction in yield due to mistaking the end portions on which the power supply wire electrodes 51*e* and 51*f* are not provided and the power supply wire electrodes 51*e* and 51*f*.

The first heat generation member 51 illustrated in FIG. 22(*a*) to FIG. 22(*c*) is disposed so that a surface of the element-connecting electrode 51*d* side faces the fuse element 2. Accordingly, the insulated substrate 51*a* is not disposed between the heat generation unit 51*b* and the fuse element 2. Therefore, heat generated by the heat generation unit 51*b* is efficiently transmitted to the fuse element 2 in comparison to a case where the insulated substrate 51*a* is disposed between the heat generation unit 51*b* and the fuse element 2.

The first heat generation member 51 illustrated in FIG. 22(*a*) to FIG. 22(*c*) may be manufactured by the following method, for example. First, the insulated substrate 51*a* is prepared. Furthermore, a paste-like composition containing a material serving as the heat generation unit 51*b* and a resin binder is produced. Thereafter, the foregoing composition is screen-printed on the insulated substrate 51*a* to form a predetermined pattern, followed by firing. As a result, the heat generation unit 51*b* is formed.

Next, the power supply wire electrodes 51*e* and 51*f* are formed by a known method, and are each electrically connected to both end portions 51*g*, 51*g* of the heat generation unit 51*b*. Next, the insulating layer 51*c* is formed by a known method, so that the insulating layer 51*c* covers the heat generation unit 51*b*, and also covers a connection portion between the heat generation unit 51*b* and the power supply wire electrodes 51*e* and 51*f*.

Thereafter, the element-connecting electrode 51*d* is formed on the insulating layer 51*c* by a known method.

The first heat generation member 51 illustrated in FIG. 22(*a*) to FIG. 22(*c*) is obtained by the above process.

Figure 23:
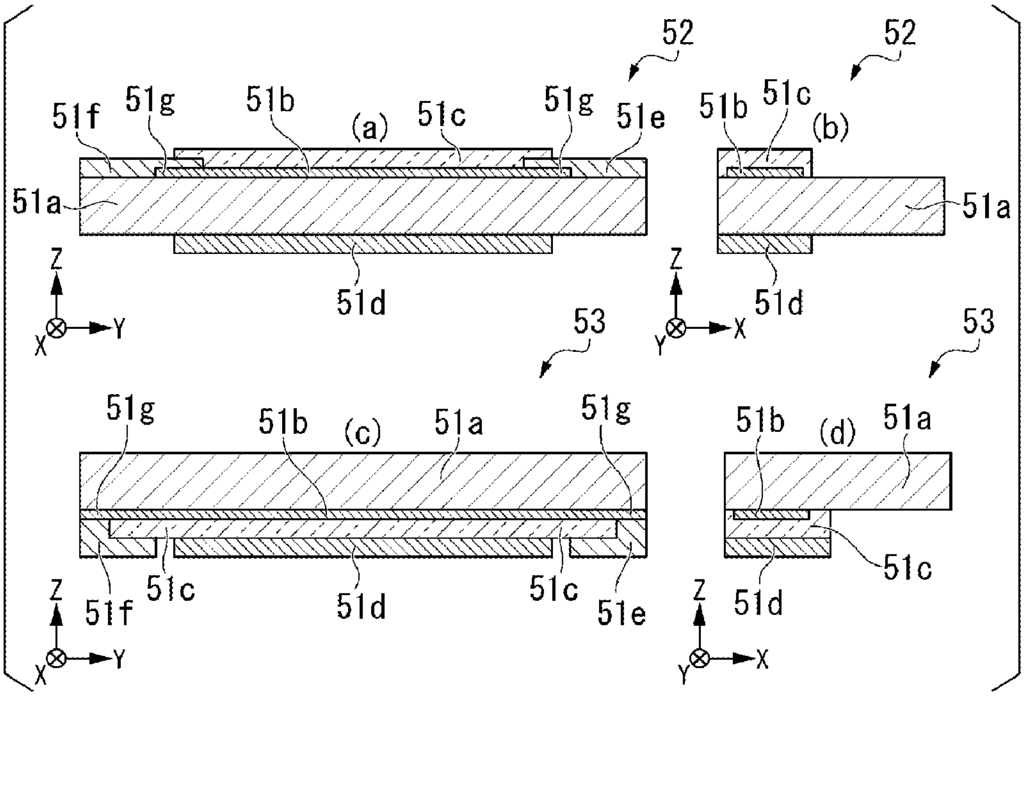
FIG. 23 is a drawing for describing another example of a heat generation member, FIG. 23(*a*) is a cross-section view of a heat generation member 52 looking from the X-direction, and FIG. 23(*b*) is a cross-section view of a center portion of the heat generation member 52 illustrated in FIG. 23(*a*) in the Y-direction looking from the Y-direction.

FIG. 23 is a drawing for describing another example of a heat generation member, FIG. 23(*a*) is a cross-section view of a heat generation member 52 looking from the X-direction, and FIG. 23(*b*) is a cross-section view of a center portion in the Y-direction of the heat generation member 52 illustrated in FIG. 23(*a*) looking from the Y-direction. FIG. 23(*c*) is a cross-section view of a heat generation member 53 looking from the X-direction, and FIG. 23(*d*) is a cross-section of a center portion in the Y-direction of the heat generation member 53 illustrated in FIG. 23(*c*) looking from the Y-direction.

In the protection element 300 of the present embodiment, the heat generation member 52 illustrated in FIG. 23(*a*) and FIG. 23(*b*) may be provided in place of the first heat generation member 51 (and/or the second heat generation member 56) illustrated in FIG. 22(*a*) to FIG. 22(*c*). In the heat generation member 52 illustrated in FIG. 23(*a*) and FIG. 23(*b*), the same members as the first heat generation member 51 illustrated in FIG. 22(*a*) to FIG. 22(*c*) are denoted by the same reference signs, and descriptions thereof are omitted. The planar disposal of each member in the heat generation member 52 illustrated in FIG. 23(*a*) and FIG. 23 is the same as the planar disposal of each member of the first heat generation member 51 illustrated in FIG. 22(*a*) to FIG. 22(*c*).

The heat generation member 52 illustrated in FIG. 23(*a*) and FIG. 23(*b*) has the insulated substrate 51*a*, the heat generation unit 51*b*, the insulating layer 51*c*, the element-connecting electrode 51*d*, and the power supply wire electrodes 51*e* and 51*f* in the same manner as the first heat generation member 51 illustrated in FIG. 22(*a*) to FIG. 22(*c*).

As illustrated in FIG. 23(*a*) and FIG. 23(*b*), the heat generation unit 51*b* is formed on a surface of an opposite side to a surface of the insulated substrate 51*a* facing the fuse element 2 (an upper surface in FIG. 23(*a*) and FIG. 23(*b*)).

As illustrated in FIG. 23(*a*) and FIG. 23(*b*), in the same manner as the first heat generation member 51 illustrated in FIG. 22(*a*) to FIG. 22(*c*), the power supply wire electrodes 51*e* and 51*f* are provided at an end portion of the insulated substrate 51*a* in the Y-direction, and one portion is provided at a position overlapping both end portions 51*g*, 51*g*, respectively, of the heat generation unit 51*b* in a plan view. The power supply wire electrodes 51*e* and 51*f* are respectively electrically connected to both end portions 51*g*, 51*g* of the heat generation unit 51*b*.

As illustrated in FIG. 23(*a*) and FIG. 23(*b*), the insulating layer 51*c* is provided on the heat generation unit 51*b*. The insulating layer 51*c* is provided at a center portion of the insulated substrate 51*a* in the Y-direction so as to cover the heat generation unit 51*b* and a connection portion between the heat generation unit 51*b* and the power supply wire electrodes 51*e* and 51*f*. The insulating layer 51*c* is not provided at an end portion of the insulated substrate 51*a* in the Y-direction. As a result, one portion of the power supply wire electrodes 51*e* and 51*f* is not covered by the insulating layer 51*c* and is exposed. The insulating layer 51*c* protects the heat generation unit 51*b*.

As illustrated in FIG. 23(*a*) and FIG. 23(*b*), the element-connecting electrode 51*d* on the heat generation member 52 is formed on a surface of an opposite side to a side whereon the heat generation unit 51*b* of the insulated substrate 51*a* is provided, which is different to the first heat generation member 51 illustrated in FIG. 22(*a*) to FIG. 22(*c*). Accordingly, the element-connecting electrode 51*d* is disposed facing the heat generation unit 51*b* via the insulated substrate 51*a*. The element-connecting electrode 51*d* is provided at a position whereat at least one portion is overlapping the heat generation unit 51*b*. Furthermore, the element-connecting electrode 51*d* is electrically connected to the fuse element 2 in the same manner as the first heat generation member 51 illustrated in FIG. 22(*a*) to FIG. 22(*c*).

In the protection element 300 of the present embodiment, the heat generation member 53 illustrated in FIG. 23(*c*) and FIG. 23(*d*) may be provided in place of the first heat generation member 51 (and/or the second heat generation member 56) illustrated in FIG. 22(*a*) to FIG. 22(*c*). In the heat generation member 53 illustrated in FIG. 23(*c*) and FIG. 23(*d*), the same members as the first heat generation member 51 illustrated in FIG. 22(*a*) and FIG. 22(*c*) are denoted by the same reference signs, and descriptions thereof are omitted. The disposal of each member in the cross section of the center portion of the heat generation member 53 in the Y-direction illustrated in FIG. 23(*c*) and FIG. 23(*d*) looking from the Y-direction is the same as that of each member of the first heat generation member 51 illustrated in FIG. 22(*a*) to FIG. 22(*c*).

The heat generation member 53 illustrated in FIG. 23(*c*) and FIG. 23(*d*) has the insulated substrate 51*a*, the heat generation unit 51*b*, the insulating layer 51*c*, the element-connecting electrode 51*d*, and the power supply wire electrodes 51*e* and 51*f* in the same manner as the first heat generation member 51 illustrated in FIG. 22(*a*) to FIG. 22(*c*).

As illustrated in FIG. 23(*c*), the heat generation unit 51*b* is formed on a surface of the insulated substrate 51*a* facing the fuse element 2 (a lower surface in FIG. 23(*c*) and FIG. 23(*d*)). As illustrated in FIG. 23(*c*), the heat generation unit 51*b* is provided in a belt shape extending in the Y-direction along one long side edge portion from one edge to another edge of the insulated substrate 51*a* that has a substantially rectangular shape in a plan view.

As illustrated in FIG. 23(*c*), the insulating layer 51*c* is provided on the heat generation unit 51*b*. The insulating layer 51*c* is provided at a center portion of the insulated substrate 51*a* in the Y-direction so as to cover a region excluding both end portions 51*g*, 51*g* of the heat generation unit 51*b*. Accordingly, both end portions 51*g*, 51*g* of the heat generation unit 51*b* are not covered by the insulating layer 51*c* and are exposed.

As illustrated in FIG. 23(*c*), the power supply wire electrodes 51*e* and 51*f* are provided at an end portion of the insulated substrate 51*a* in the Y-direction, and overlap with both end portions 51*g*, 51*g*, respectively, of the heat generation unit 51*b* in a plan view. As a result, the power supply wire electrodes 51*e* and 51*f* are electrically connected to the heat generation unit 51*b*.

As illustrated in FIG. 23(*c*), the element-connecting electrode 51*d* is provided at a region on the insulating layer 51*c* excluding a region whereon the power supply wire electrodes 51*e* and 51*f* are provided. As illustrated in FIG. 23(*c*), the element-connecting electrode 51*d* is disposed separated from the power supply wire electrodes 51*e* and 51*f*. The element-connecting electrode 51*d* is provided at a position on the insulating layer 51*c* whereat at least one portion is overlapping the heat generation unit 51*b*.

Figure 24:
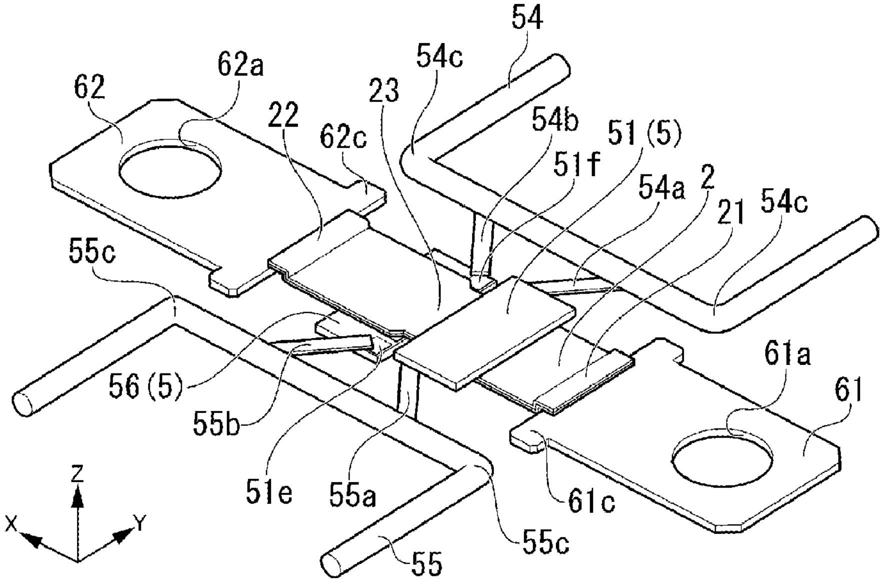
FIG. 24 is an enlarged drawing for describing one portion of the protection element 300 of the third embodiment, and is a perspective view illustrating a fuse element, a first terminal, a second terminal, the heat generation member, a power supply wire, and a power supply lead-out wire.

FIG. 24 is an enlarged drawing for describing one portion of the protection element 300 of the third embodiment, and is a perspective view illustrating the fuse element 2, a first terminal 61, a second terminal 62, the first heat generation member 51, the second heat generation member 56, the power supply wires 54*a*, 54*b*, 55*a*, and 55*b*, and the power supply lead-out wires 54 and 55.

As illustrated in FIG. 24, the first heat generation member 51 is electrically connected to the power supply wires 54*a* and 55*a*. Furthermore, the second heat generation member 56 is electrically connected to the power supply wires 54*b* and 55*b*. Furthermore, in the present embodiment, as illustrated in FIG. 24, the power supply wire 54*a* and the power supply wire 54*b* are electrically connected to the power supply lead-out wire 54, and the power supply wire 55*a* and the power supply wire 55*b* are electrically connected to the power supply lead-out wire 55.

In the present embodiment, a case where the power supply wire 54*a* and the power supply wire 54*b* are electrically connected to one power supply lead-out wire 54 is described as an example; however, the power supply wire 54*a* and the power supply wire 54*b* may each be connected to a separate power supply lead-out wire. Furthermore, a case where the power supply wire 55*a* and the power supply wire 55*b* are electrically connected to one power supply lead-out wire 55 is described as an example; however, the power supply wire 55*a* and the power supply wire 55*b* may be respectively connected to a separate power supply lead-out wire.

In the present embodiment, the power supply wires 54*a*, 54*b*, 55*a*, and 55*b* are belt-shaped, and each is installed in a side surface concave portion 77*a* serving as a side surface vent 77 by integrating the first case 6*a* and the second case 6*b* (see FIG. 19). The power supply wires 54*a*, 54*b*, 55*a*, and 55*b* may be formed of a known conductive wiring material. In the present embodiment, a case where the power supply wires 54*a*, 54*b*, 55*a*, and 55*b* are belt-shaped is given as an example; however, each power supply wire is not limited to being belt-shaped-they may be line-shaped.

Furthermore, the power supply lead-out wires 54 and 55 are formed of a conductive wiring material that is circular in a cross section view. The power supply lead-out wires 54 and 55 are disposed symmetrically with respect to the fuse element 2. The power supply lead-out wires 54 and 55 are respectively bent to bend in a U-shape in a plan view.

The two bent portions 54*c* and 55*c* included in the power supply lead-out wires 54 and 55 are respectively installed in the notch 76*b* provided at an edge portion along the first case 6*a* and the second case 6*b* in the X-direction (see FIG. 19). In the present embodiment, the power supply lead-out wires 54 and 55 have the bent portions 54*c* and 55*c*; therefore, even if external stress is applied to the power supply lead-out wires 54 and 55, the external stress is transmitted to the power supply wires 54*a*, 54*b*, 55*a*, and 55*b*, and it is possible to control a defect wherein the electrical connection between the first heat generation member 51 or the second heat generation member 56 and the power supply lines 54*a*, 54*b*, 55*a*, and 55*b* is broken.

The notch 76*b* is formed over an entire length (thickness) of an end member 72 in the X-direction.

Furthermore, each end portion side is exposed from the cover 4 beyond the bent portions 54*c* and 55*c* of the power supply lead-out wires 54 and 55 while in a state of being held in the lead-out wire groove 4*b* provided in the cover 4 (see FIG. 18 and FIG. 19). Two lead-out wire grooves 4*b* are formed, each at the respective opening portion on both sides of the cover 4 so as to face each other in a diametrical direction. A width of the lead-out wire groove 4*b* in a circumferential direction of the cover 4 may be determined as appropriate according to a diameter of the power supply lead-out wires 54 and 55.

Figure 25A:
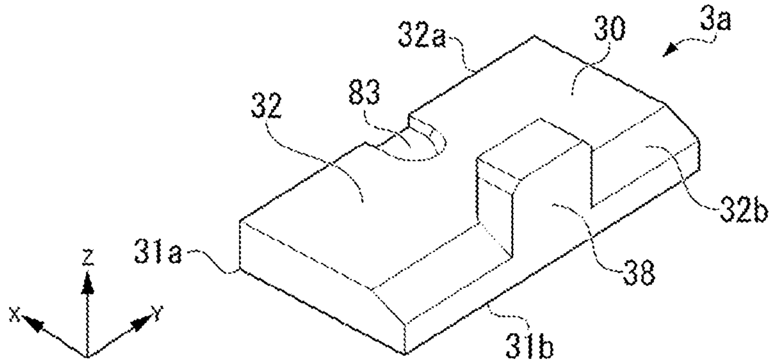
FIG. 25A is a drawing for describing a structure of a first shielding member 3*a* provided in the protection element 300 of the third embodiment, and is a perspective view looking from a housing portion side.
Figure 25B:
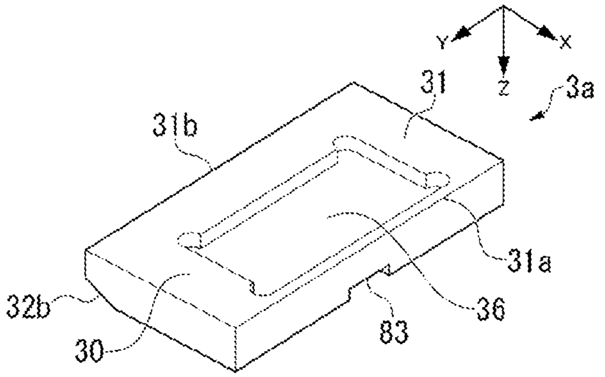
FIG. 25B is a drawing for describing the structure of the first shielding member 3*a* provided in the protection element 300 of the third embodiment, and is a perspective view looking from a fuse element side.

FIG. 25A to FIG. 25B are drawings for describing the structure of the first shielding member 3*a* provided in the protection element 300 of the third embodiment. FIG. 25A is a perspective view looking from the housing portion side, and FIG. 25B is a perspective view looking from the fuse element 2 side.

The first shielding member 3*a* provided in the protection element 300 of the third embodiment has a heat generation member housing concave portion 36 wherein the heat generation member 51 is housed. The heat generation member housing concave portion 36, as illustrated in FIG. 25B, is provided on the first surface 31 of the plate-shaped part 30 in proximity to a first end edge 31*a*.

The first shielding member 3*a* is interposed between the fuse element 2 and the first case 6*a* containing the housing portion 60. "Fuse element side" refers to a side of the first shielding member 3*a* whereon the fuse element 2 is disposed. "Housing portion side" refers to a side of the first shielding member 3*a* whereon the first case 6*a* containing the housing portion 60 is disposed.

A width of the heat generation member housing concave portion 36 in the X-direction is determined according to a width of the heat generation member 51 in the X-direction. Furthermore, a width of the heat generation member housing concave portion 36 in the Y-direction is determined according to a width of the heat generation member 51 in the Y-direction.

A depth (length in a Z-direction) of the heat generation member housing concave portion 36 is set to a depth wherein the top of the plate-shaped part 30 and the top of the heat generation member 51 are on the same plane in a state where the heat generation member 51 is installed in the heat generation member housing concave portion 36. In the protection element 300 of the third embodiment, as illustrated in FIG. 20, it is preferable that the first surface 31 of the plate-shaped part 30 and the heat generation member 51 are disposed in contact with the fuse element 2. As a result, the heat generation member 51 may efficiently heat the cut portion 23, and may interrupt the current path in a short time.

(Method of Manufacturing the Protection Element)

Next, a method of manufacturing the protection element 300 of the present embodiment will be described with reference to drawings.

First, a member wherein the fuse element 2 is integrated with the first terminal 61 and the second terminal 62 is created (see FIG. 7) to manufacture the protection element 300 of the present embodiment in the same manner as the protection element 100 according to the first embodiment.

Figure 26A:
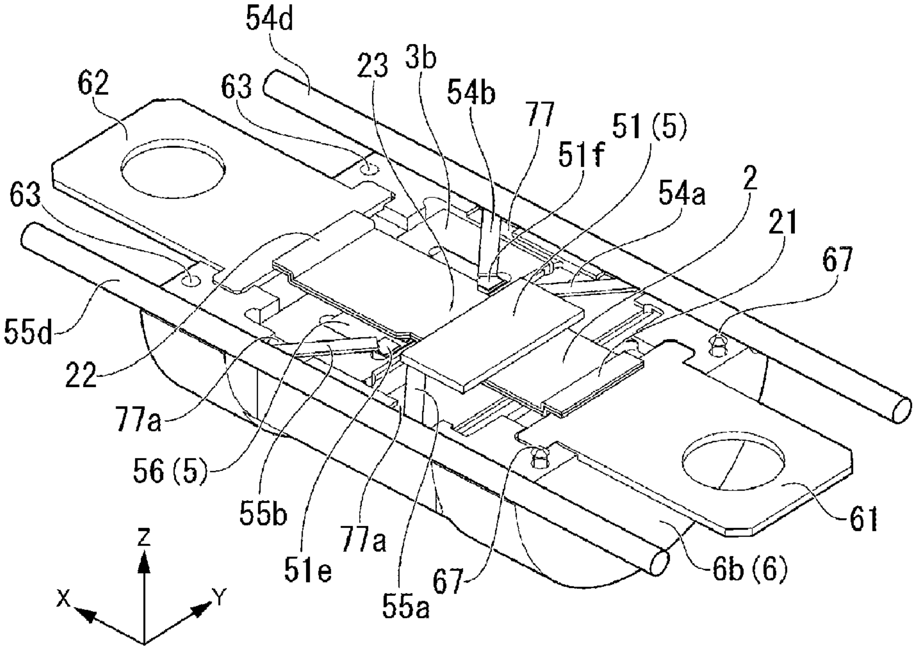
FIG. 26A is a drawing for describing a manufacturing process of the protection element 300 of the third embodiment, and is a perspective view illustrating a state wherein a member, wherein a fuse element 2, a first terminal 61, the second terminal 62, the first heat generation member 51, a second heat generation member 56, power supply wires 54*a*, 54*b*, 55*a*, and 55*b*, and conductive members 54*d* and 55*d* are integrated, is installed on a second case 6*b* wherein a second shielding member 3*b* is installed.

Furthermore, as illustrated in FIG. 26A, a linear conductive member 54*d* serving as the power supply lead-out wire 54 is prepared, and the power supply wires 54*a* and 54*b* are each connected by soldering. Furthermore, a linear conductive member 55*d* serving as the power supply lead-out wire 55 is prepared, and the power supply wires 55*a* and 55*b* are each connected by soldering.

Also, the power supply wire 55*a* is soldered to the power supply wire electrode 51*e* of the first heat generation member 51, and the power supply wire 54*a* is soldered to the power supply wire electrode 51*f*. Furthermore, as illustrated in FIG. 26A, the power supply wire 55*b* is soldered to the power supply wire electrode 51*e* of the second heat generation member 56, and the power supply wire 54*b* is soldered to the power supply wire electrode 51*f*.

Furthermore, the first shielding member 3*a* is installed inside the concave portion 68 of the first case 6*a*. Furthermore, the second shielding member 3*b* is installed inside the concave portion 68 of the second case 6*b*.

Thereafter, as illustrated in FIG. 26A, a member wherein the fuse element 2, the first terminal 61, the second terminal 62, the first heat generation member 51, the second heat generation member 56, the power supply wires 54*a*, 54*b*, 55*a*, and 55*b*, and the conductive members 54*d* and 55*d* are integrated is installed on the second case 6*b* wherein the second shielding member 3*b* is installed. During this, the second heat generation member 56 is housed in the heat generation member housing concave portion 36 of the second shielding member 3*b*.

Also, as illustrated in FIG. 26(*b*), the first case 6*a*, wherein the first shielding member 3*a* is installed, is installed on the second case 6*b*, wherein the foregoing integrated member is installed. During this, the fitting concave portion 63 included in the first case 6*a* and the fitting convex portion 67 included in the second case 6*b* are fitted together, and the fitting convex portion 67 included in the first case 6*a* and the fitting concave portion 63 included in the second case 6*b* are fitted together.

Figure 26B:
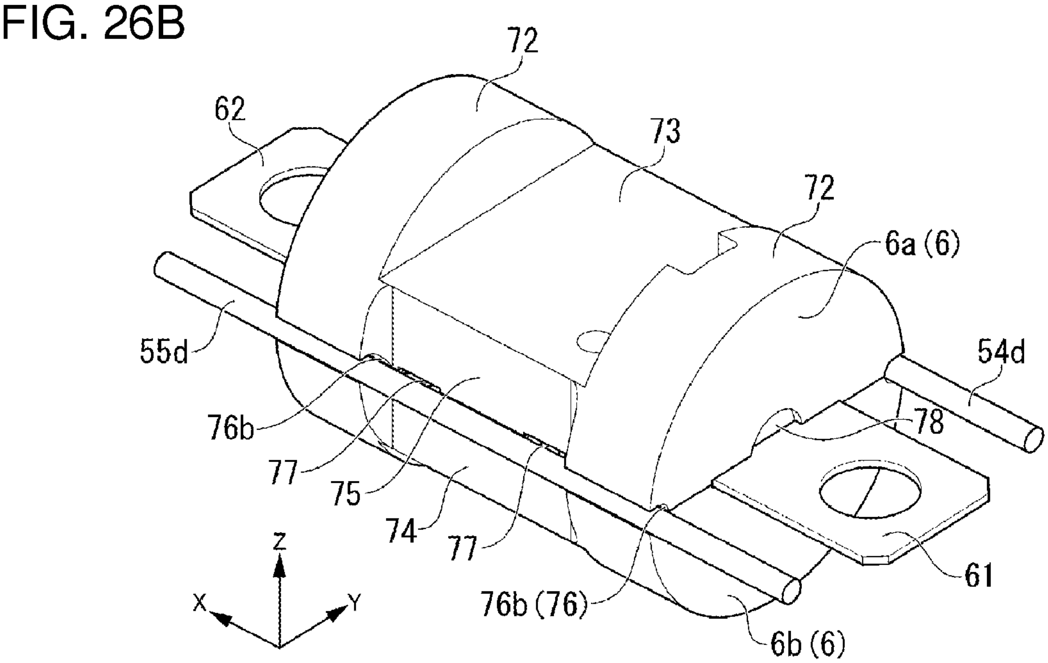
FIG. 26B is a drawing for describing the manufacturing process of the protection element 300 of the third embodiment, and is a perspective view illustrating a state wherein the first case 6*a* is installed on the second case 6*b* via the fuse element 2.

As illustrated in FIG. 26B, the first case 6*a* is installed on the second case 6*b*, forming a second buffer concave portion 75, the side surface vent 77, a first adhesive inlet 78, and a second adhesive inlet 76. As a result, the power supply wires 54*a*, 54*b*, 55*a*, and 55*b* are in a state passing through each side surface vent 77 and connected to the conductive members 54*d* and 55*d* disposed outside the case 6. Furthermore, as illustrated in FIG. 20, a state is formed where one insertion hole 64 houses a first end portion 21 of the fuse element 2, another insertion hole 64 houses a second end portion 22 of the fuse element 2, and one portion of the first terminal 61 and one portion of the second terminal 62 connected to the fuse element 2 are exposed to the outside of the case 6.

Next, the first case 6*a* and the second case 6*b* are housed in the cover 4 in an integrated state. As a result, the cover 4 covers the end member 72 forming a side surface along the case 6 in the X-direction, a first buffer concave portion 73, and the second buffer concave portion 75, and also fixes the first case 6*a* and the second case 6*b*.

Thereafter, the conductive members 54*d* and 55*d* are fitted into the respective lead-out wire grooves 4*b* provided in the cover 4 and bent outward at a substantial right angle. As a result, the two bent portions 54*c* and 55*c* (see FIG. 24) are formed in the respective conductive members 54*d* and 55*d* to form the power supply lead-out wires 54 and 55.

Thereafter, an adhesive is injected into an inclined surface 4*a* of the cover 4, the first adhesive inlet 78, and the second adhesive inlet 76, respectively. As a result, the inside of the cover 4 is sealed and an outer surface of the case 6 and an inner surface of the cover 4 seal a spatial region composed of the housing portion 60 and an internal pressure buffer space 71.

The protection element 300 of the present embodiment is obtained by the foregoing process.

(Operation of the Protection Element)

Next, the operation of the protection element 300 will be described in a case where a current exceeding a rated current flows through the fuse element 2 in the protective element 300 according to the third embodiment.

When a current exceeding a rated current flows through the fuse element 2 of the protection element 300 of the present embodiment, the fuse element 2 itself generates heat and the fuse element 2 is fused.

In the protection element 300 of the present embodiment, pressure elevation in the housing portion 60 due to an arc discharge generated when the fuse element 2 fuses causes, in the same manner as the protection element 200 according to the second embodiment, the first surface 31 on the plate-shaped part 30 included in the first shielding member 3*a* and the second shielding member 3*b* to be pressed, and, as illustrated in FIG. 21, a restoring force of a compressed spring 81 presses a second surface 32 of the plate-shaped part 30 and force is applied in a rotation direction of the first shielding member 3*a* and the second shielding member 3*b*. Thus, in the protection element 300 of the present embodiment, the first shielding member 3*a* and the second shielding member 3*b* rotate around a rotation axis 33. Also, the first end edge 31*a* is pressed onto the bottom surface of a shielding member housing groove 34 provided on an inner surface of the housing portion 60. Furthermore, a second end edge 31*b* is housed in the concave portion 68.

In the protection element 300 of the present embodiment, in the same manner as the protection element 200 according to the second embodiment, pressure elevation in the housing portion 60 due to an arc discharge generated when the fuse element 2 fuses causes the first surface 31 of the first shielding member 3*a* and the second shielding member 3*b* to be pressed, and the spring 81 presses the second surface 32 of the plate-shaped part 30 and force is applied in the rotation direction of the first shielding member 3*a* and the second shielding member 3*b*. Due to the synergistic effects thereof, as illustrated in FIG. 21, the first shielding member 3*a* and the second shielding member 3*b* each rotate around the rotation axis 33. As a result, the first shielding member 3*a* and the second shielding member 3*b* more reliably block and divide the inside of the housing portion 60 at two locations in the X-direction. Accordingly, in the protection element 300 of the present embodiment, an arc discharge generated when the fuse element 2 fuses is quickly suppressed (extinguished).

Furthermore, in the protection element 300 of the present embodiment, the first heat generation member 51 and the second heat generation member 56 for heating the fuse element 2 are disposed in contact with the cut portion 23 of the fuse element 2. Accordingly, when an abnormality occurs in an external circuit serving as an energizing path for the protection element 300 and the energizing path needs to be interrupted, the first heat generation member 51 and the second heat generation member 56 are energized by a current control element provided in the external circuit to generate heat, the cut portion 23 is efficiently heated, and the current path may be interrupted in a short time.

Furthermore, after the fuse element 2 is cut, the power supply wires 54*a*, 54*b*, 55*a*, and 55*b* are cut by the rotation of the first shielding member 3*a* and the second shielding member 3*b* and melting of a solder connection of the power supply wire electrodes 51*e* and 51*f* due to the heat generated by the first heat generation member 51 and the second heat generation member 56. As a result, a power supply to the first heat generation member 51 and the second heat generation member 56 is interrupted, and the heat generation of the first heat generation member 51 and the second heat generation member 56 is stopped. Thus, the protection element 300 of the present embodiment has excellent safety.

Other Example

The protection element of the present invention is not limited to the protection element of the first embodiment and the second embodiment described above.

For example, in the protection element 100 of the first embodiment and the protection element 200 of the second embodiment described above, a case where the cut portion 23 is disposed close to the center of the fuse element 2 in the X-direction, the first shielding member 3*a* and the second shielding member 3*b* have the same shape, and the first case 6*a* and the second case 6*b* have the same shape is described as an example; however, the position of the cut portion need not be close to the center of the fuse element in the X-direction. In this case, the first shielding member 3*a* and the second shielding member 3*b* have different lengths in the X-direction. Furthermore, the first case 6*a* has a housing portion shape corresponding to the shape of the first shielding member 3*a*, and the second case 6*b* has a housing portion shape corresponding to the shape of the second shielding member 3*b*.

REFERENCE SIGNS LIST

2 Fuse element, 3 Shielding member, 3*a* First shielding member, 3*b* Second shielding member, 4 Cover, 4*a* Inclined surface, 4*b* Lead-out wire groove, 5, 52, 53 Heat generation member, 6 Case, 6*a* First case, 6*b* Second case, 21 First end portion, 22 Second end portion, 23 Cut portion (constricted portion), 24*a* First bent portion, 24*b* Second bent portion, 25 First connecting unit, 26 Second connecting unit, 30 Plate-shaped part, 33*a* Contact position, 30*a* First area, 30*b* Second area, 31 First surface, 31*a*, 32*a* First end edge, 31*b* Second end edge, 32 Second surface, 32*b* Second end surface, 33 Rotation axis, 34 Shielding member housing groove, 35 Leak prevention groove, 36 Heat generation member housing concave portion, 38 Convex portion, 41 First end, 42 Second end, 51 First heat generation member, 51*a* Insulated substrate, 51*b* Heat generation unit, 51*c* Insulating layer, 51*d* Element-connecting electrode, 51*e*, 51*f* Power supply wire electrode, 56 Second heat generation member, 54, 55 Power supply lead-out wire, 54*a*, 54*b*, 55*a*, 55*b* Power supply wire, 60 Housing portion, 61 First terminal, 61*a*, 62*a* External terminal hole, 61*c*, 62*c* Flange portion, 62 Second terminal, 63 Fitting concave portion, 64 Insertion hole, 64*a* Insertion hole-forming surface, 64*b* Terminal-mounting surface, 65 Fuse element-mounting surface, 66 Guide hole, 67 Fitting convex portion, 68 Concave portion, 68*a* First wall surface, 68*b* Second wall surface, 68*c* First bottom surface, 68*d* Second bottom surface, 69 Bottom surface vent, 70 Joining surface, 71 Internal pressure buffer space, 72 End member, 73 First buffer concave portion, 74 Second concave portion, 75 Second buffer concave portion, 76 Second adhesive inlet, 76*a*, 76*b* Notch, 77 Side surface vent, 77*a* Side surface concave portion, 78 First adhesive inlet, 78*a* Notch, 81 Spring, 82 Spring guide hole, 83 Spring-receiving groove, 100, 200, 300 Protection element

The invention claimed is:

1. A protection element, comprising:

a fuse element configured to be energized in a first direction, which is a direction from a first end portion of the fuse element to a second end portion of the fuse element;

a shielding member composed of an insulating material, configured to rotate to a rotated position around a rotation axis extending in a second direction orthogonal to the first direction, and comprising a plate-shaped part which comprises a first surface and a second surface, the first surface facing the fuse element and a second surface being in contact with the rotation axis, wherein the plate-shaped part viewed from the fuse element is divided to a first portion and a second portion at a contact position between the plate-shaped part and the rotation axis, and an area of the first portion and an area of the second portion are different from each other; and a case composed of an insulating material, and having therein a housing portion in which the fuse element and the shielding member are stored, wherein pressure elevation in the housing portion due to an arc discharge generated when the fuse element fuses causes the first surface to be pressed so that the shielding member to rotate around the rotation axis and the shielding member divides the housing portion.

2. The protection element according to claim 1, wherein an inner surface of the case facing the fuse element has a shielding member housing groove in which a part of the shielding member is housed in the rotated position.

3. The protection element according to claim 1, wherein the fuse element further comprises a constricted portion between the first end portion and the second end portion, and a cross-sectional area of the constricted portion in the second direction is narrower than each of a cross-sectional area of the first end portion and a cross-sectional area of the second end portion in the second direction.

4. The protection element according to claim 3, wherein a width of the constricted portion in the second direction is narrower than each of a width of the first end portion and a width of the second end portion in the second direction.

5. The protection element according to claim 1, wherein the fuse element is composed of a laminated body in which an inner layer comprising a low-melting-point metal and an outer layer comprising a high-melting-point metal are laminated in a thickness direction of the laminated body.

6. The protection element according to claim 5, wherein the low-melting-point metal is Sn or a metal comprising Sn as a main component thereof, and the high-melting-point metal is Ag, Cu, or a metal comprising Ag or Cu as a main component thereof.

7. The protection element according to claim 1, wherein the fuse element comprises a bent portion bent along a direction intersecting the first direction.

8. The protection element according to claim 1, wherein at least one of the shielding member and the case is composed of a resin material which is a nylon-based resin, a fluorine-based resin, or a polyphthalamide resin.

9. The protection element according to claim 8, wherein the resin material has a tracking resistance index CTI of 600 V or more.

10. The protection element according to claim 8, wherein the nylon-based resin comprises no benzene ring.

11. The protection element according to claim 1, further comprising a first terminal and a second terminal, wherein the first end portion is electrically connected to the first terminal, the second end portion is electrically connected to the second terminal, and a portion of the first terminal and a portion of the second terminal are exposed from the case.

12. The protection element according to claim 1, wherein the second surface of the plate-shaped part is provided with a member having elasticity configured to apply force on the shielding member in a rotation direction.

13. The protection element according to claim 1, wherein the shielding member comprises: a first shielding member and a second shielding member having a same shape as the first shielding member; and the first shielding member and the second shielding member are disposed symmetrically in the first direction with respect to a center of the fuse element in the first direction.

14. The protection element according to claim 13, wherein the fuse element comprises a cut portion between the first end portion and the second end portion, the first shielding member and the second shielding member are disposed symmetrically in the first direction with respect to the cut portion, the second shielding member is disposed facing a surface of an opposite side to a surface of the fuse element facing the first shielding member, and a rotation direction of the first shielding member and a rotation direction of the second shielding member are opposite with respect to the fuse element.

15. The protection element according to claim 1, wherein the case comprises a first case and a second case having a same shape as the first case, and the first case and the second case are disposed facing each other with respect to the fuse element.

16. The protection element according to claim 1, further comprising a cover, wherein a part of the case is covered by the cover, the protection element is provided with an internal pressure buffer space surrounded by an outer surface of the case and an inner surface of the cover, the case has a vent passing through the case and communicating the housing portion and the internal pressure buffer space, and a volume of the internal pressure buffer space is equal to or greater than a volume of the fuse element.

17. The protection element according to claim 1, wherein the housing portion has a concave portion having a step which works as the rotation axis, and the first surface of the plate-shaped part has a first end edge and a second end edge, the first end edge being closer to the rotation axis than the second end edge in the first direction, and the shielding member rotates in a direction in which the second end edge moves away from the fuse element.

18. The protection element according to claim 1, further comprising a heat generation member configured to heat the fuse element is installed on the first surface of the plate-shaped part.

19. The protection element according to claim 18, wherein the heat generation member comprises an element-connecting electrode electrically connected to the fuse element.

20. The protection element according to claim 19, wherein the heat generation member further comprises:

a heat generation unit composed of a resistive material; and power supply wire electrodes each electrically connected to the heat generation unit at each end portion opposite to each other with respect to a center of the heat generation unit.

21. The protection element according to claim 20, wherein the heat generation member further comprises:

an insulated substrate on which the heat generation unit is provided; and an insulating layer provided on the heat generation unit, wherein the element-connecting electrode is provided at a position on the insulating layer where at least a part of the element-connecting electrode overlaps the heat generation unit.

22. The protection element according to claim 20, wherein the heat generation member further comprises:

an insulated substrate on which the heat generation unit is provided; and an insulating layer is provided on the heat generation unit, wherein the element-connecting electrode is provided on a surface of the insulated substrate, which is an opposite side to the heat generation unit, at a position where at least a part of the element-connecting electrode overlaps the heat generation unit.

* * * * *